(12) United States Patent
Takeda et al.

(10) Patent No.: US 9,039,789 B2
(45) Date of Patent: May 26, 2015

(54) METHOD FOR MANUFACTURING LITHIUM SECONDARY BATTERY, METHOD FOR MANUFACTURING STACKED BATTERY, AND METHOD FOR MANUFACTURING COMPOSITE BODY

(75) Inventors: Yasuo Takeda, Tsu (JP); Nobuyuki Imanishi, Tsu (JP); Takahito Itoh, Tsu (JP); Takahiro Uno, Tsu (JP); Akira Itsubo, Tsu (JP); Eiichi Nomura, Tsu (JP); Shigemitsu Katoh, Tsu (JP); Kiyotsugu Okuda, Tsu (JP)

(73) Assignee: Mie Industry and Enterprise Support Center, Tsu-shi (JP)

( * ) Notice: Subject to any disclaimer, the term of this patent is extended or adjusted under 35 U.S.C. 154(b) by 258 days.

(21) Appl. No.: 13/496,015

(22) PCT Filed: Dec. 7, 2011

(86) PCT No.: PCT/JP2011/078279
§ 371 (c)(1), (2), (4) Date: Mar. 14, 2012

(87) PCT Pub. No.: WO2012/077707
PCT Pub. Date: Jun. 14, 2012

(65) Prior Publication Data
US 2013/0000110 A1    Jan. 3, 2013

(30) Foreign Application Priority Data
Dec. 8, 2010    (JP) ................................ 2010-273541

(51) Int. Cl.
*H01M 10/0565* (2010.01)
*H01M 2/02* (2006.01)
(Continued)

(52) U.S. Cl.
CPC ...... *H01M 10/0565* (2013.01); *Y10T 29/49108* (2015.01); *H01M 2/021* (2013.01);
(Continued)

(58) Field of Classification Search
None
See application file for complete search history.

(56) References Cited

U.S. PATENT DOCUMENTS

| 6,277,516 B1 | 8/2001 | Sasaki et al. |
| 2005/0233210 A1 | 10/2005 | Horie et al. |

(Continued)

FOREIGN PATENT DOCUMENTS

| CN | 101320823 A | 12/2008 |
| CN | 201408817 Y | 2/2010 |

(Continued)

OTHER PUBLICATIONS

English translation of Morigaki JP 2002-008726 (from IDS).*

(Continued)

*Primary Examiner* — Sarah A Slifka
(74) *Attorney, Agent, or Firm* — Oblon, McClelland, Maier & Neustadt, L.L.P.

(57) ABSTRACT

The whole of a conductive material layer is formed on a bonding surface of an outer film having flexibility and barrier properties to prepare a composite body in which the conductive material layer is integrated with the outer film. A current collector is located within an application region, and at least a part of an electrode terminal is located outside the application region. A positive electrode active material precursor layer, an electrolyte precursor layer, and a negative electrode active material precursor layer are added to the composite body with plane positions thereof aligned with that of the current collector. These precursor layers are subjected to a crosslinking process. The application regions are applied, and the outer films are bonded, to seal a cell. The crosslinking process may be omitted.

11 Claims, 63 Drawing Sheets

(51) Int. Cl.
  *H01M 2/06* (2006.01)
  *H01M 4/139* (2010.01)
  *H01M 4/70* (2006.01)
  *H01M 10/052* (2010.01)
  *H01M 10/0583* (2010.01)
  *H01M 10/0585* (2010.01)

(52) U.S. Cl.
  CPC .......... *H01M 2/0212* (2013.01); *H01M 2/0275* (2013.01); *H01M 2/0287* (2013.01); *H01M 2/06* (2013.01); *H01M 4/139* (2013.01); *H01M 4/70* (2013.01); *H01M 10/052* (2013.01); *H01M 10/0583* (2013.01); *H01M 10/0585* (2013.01); *Y02E 60/122* (2013.01)

(56) References Cited

U.S. PATENT DOCUMENTS

| | | |
|---|---|---|
| 2008/0305394 A1 | 12/2008 | Hisamitsu et al. |
| 2013/0248106 A1 | 9/2013 | Hisamitsu et al. |

FOREIGN PATENT DOCUMENTS

| | | |
|---|---|---|
| JP | 3 272562 | 12/1991 |
| JP | 6 60859 | 3/1994 |
| JP | 11 97070 | 4/1999 |
| JP | 11 312514 | 11/1999 |
| JP | 2002 8726 | 1/2002 |
| JP | 2005 183113 | 7/2005 |
| JP | 2006 40679 | 2/2006 |
| JP | 2006 54152 | 2/2006 |
| JP | 2006 313655 | 11/2006 |
| JP | 2008 53125 | 3/2008 |
| JP | 4316689 | 8/2009 |

OTHER PUBLICATIONS

English translation of Kagawa et al JP 06-060859 (from IDS).*
Combined Taiwanese Office Action and Search Report issued Jan. 24, 2014 in Patent Application No. 100145392 (with Japanese language translation, and English language translation based on Japanese translation).
Chinese Office Action issued Apr. 3, 2014, in China Patent Application No. 201180003896.3 (with English translation).
International Search Report Issued Mar. 13, 2012 in PCT/JP11/78279 Filed Dec. 7, 2011.
International Preliminary Report on Patentability issued Jun. 20, 2013 in PCT/JP2011/078279 filed on Dec. 7, 2011(English translation only).
Written Opinion issued Mar. 13, 2012 in PCT/JP2011/078279 filed on Dec. 7, 2011 (with English translation).
Japanese Office Action issued Aug. 13, 2013 in Patent Application No. 2012-507206 with Partial English Translation.
Chinese Office Action issued Nov. 3, 2014 in Patent Application No. 201180003896.3 (with English and Japanese Translation).
Taiwanese Office Action issued Oct. 13, 2014, in Taiwan Patent Application No. 100145392 (with English translation).

* cited by examiner

F I G . 7
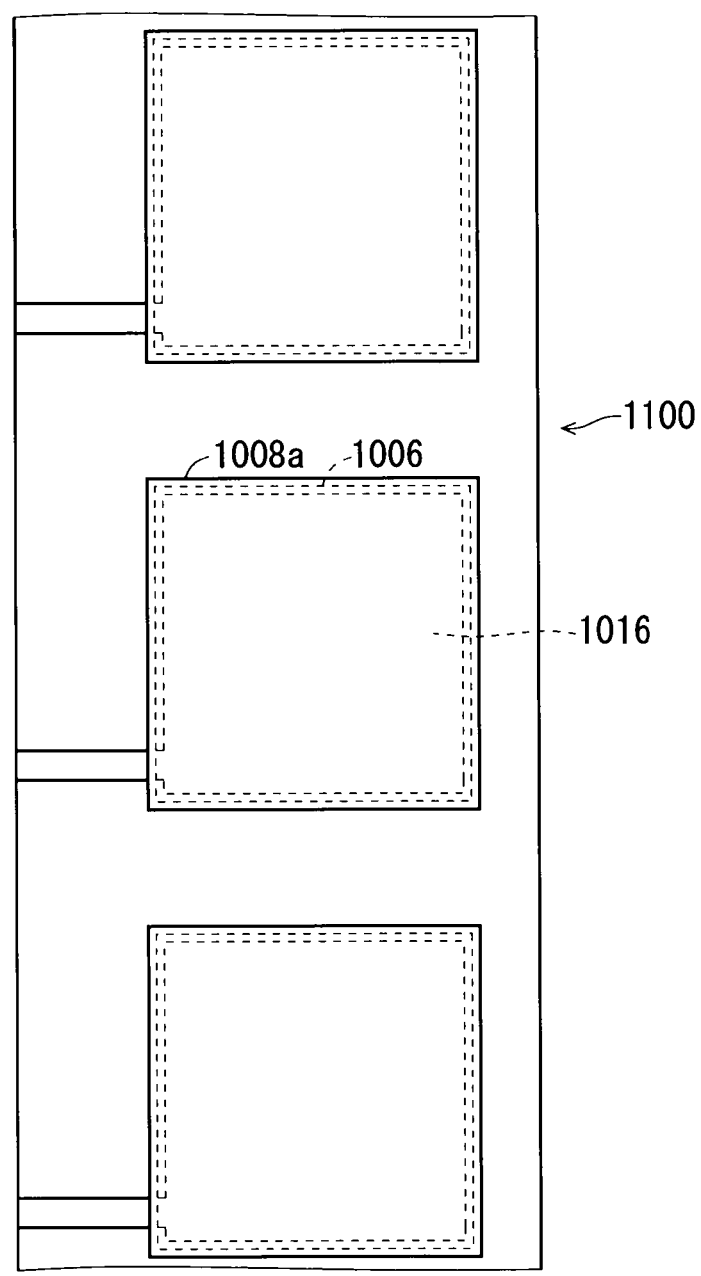

D-D

F I G . 5 8
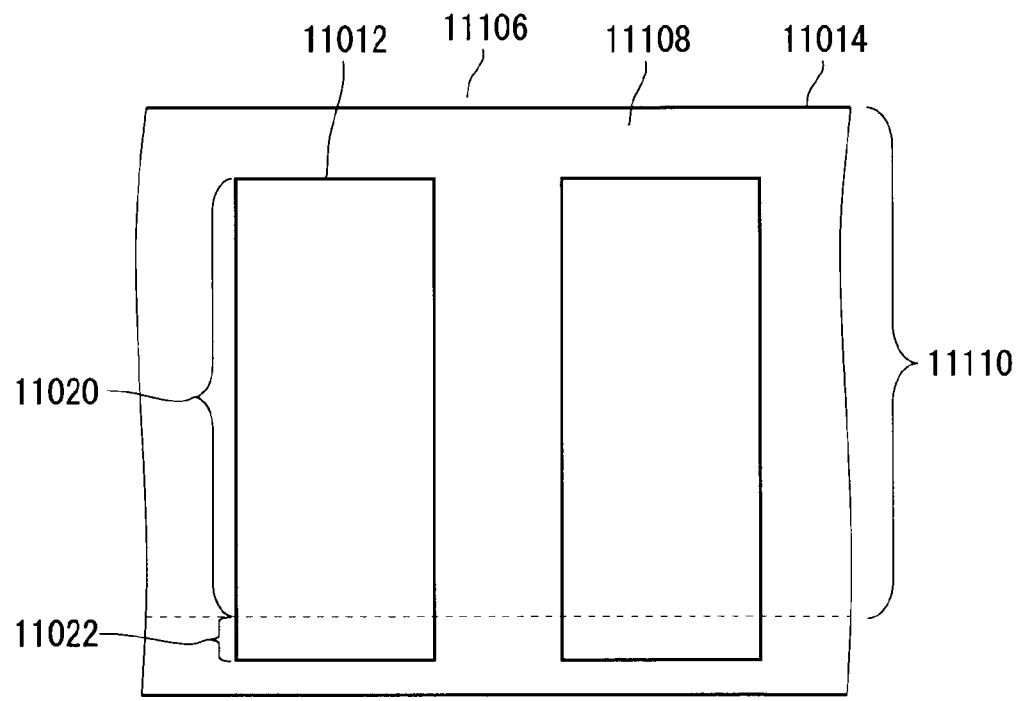
F I G . 5 9
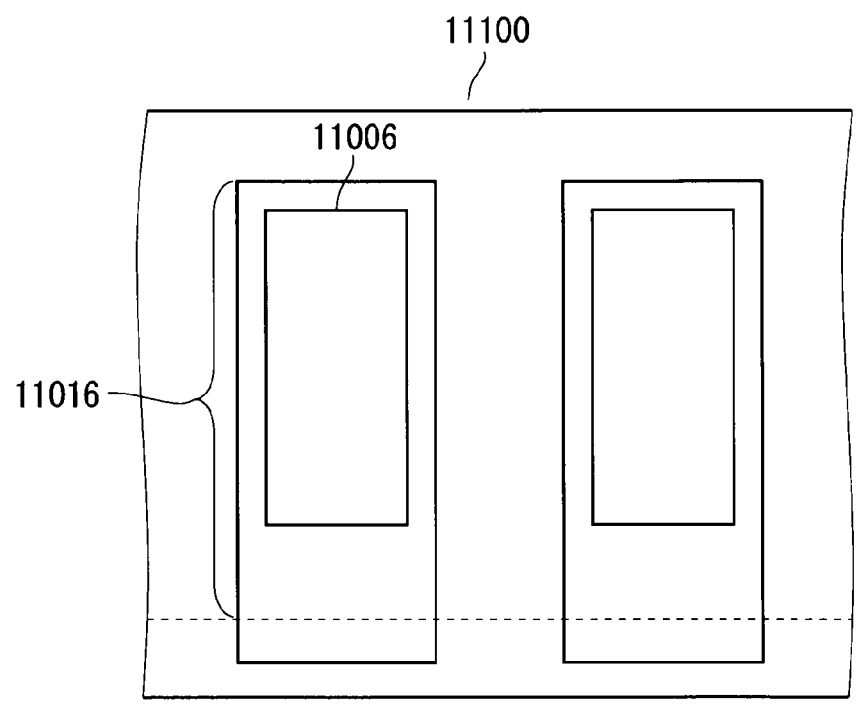

F I G. 6 4
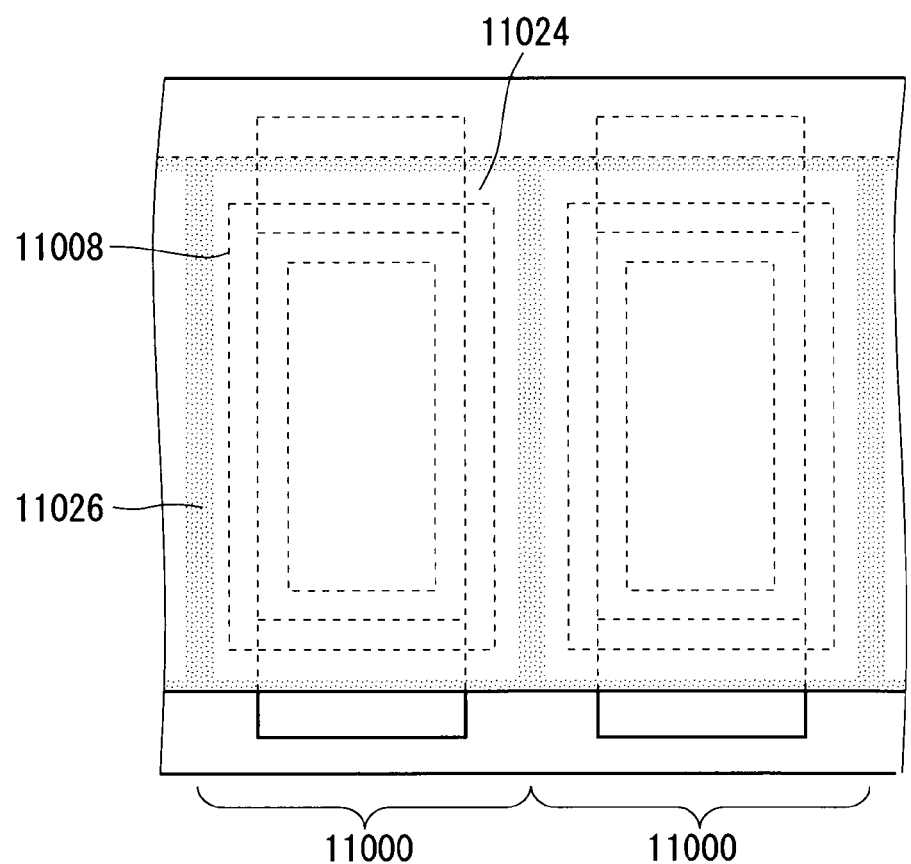

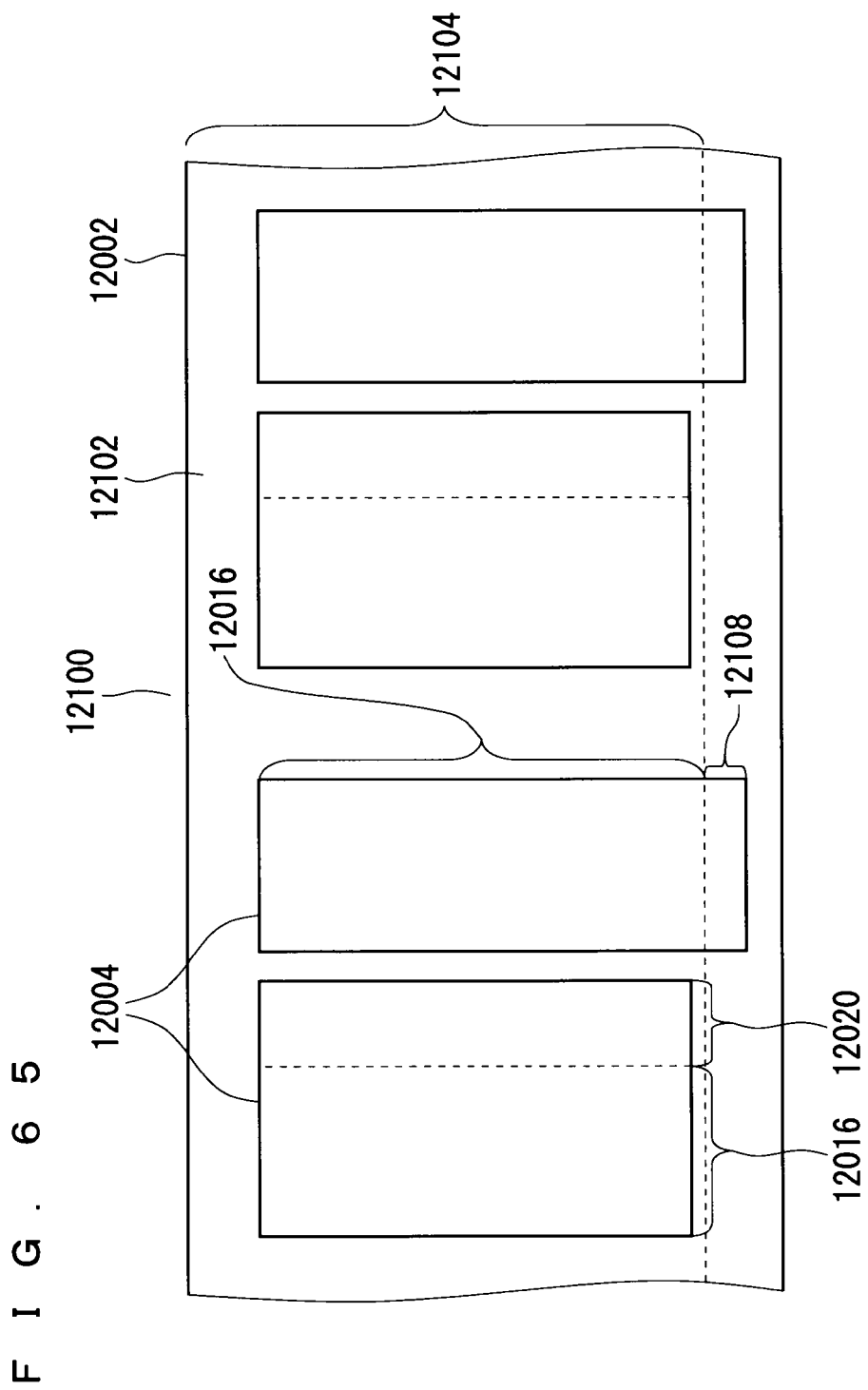

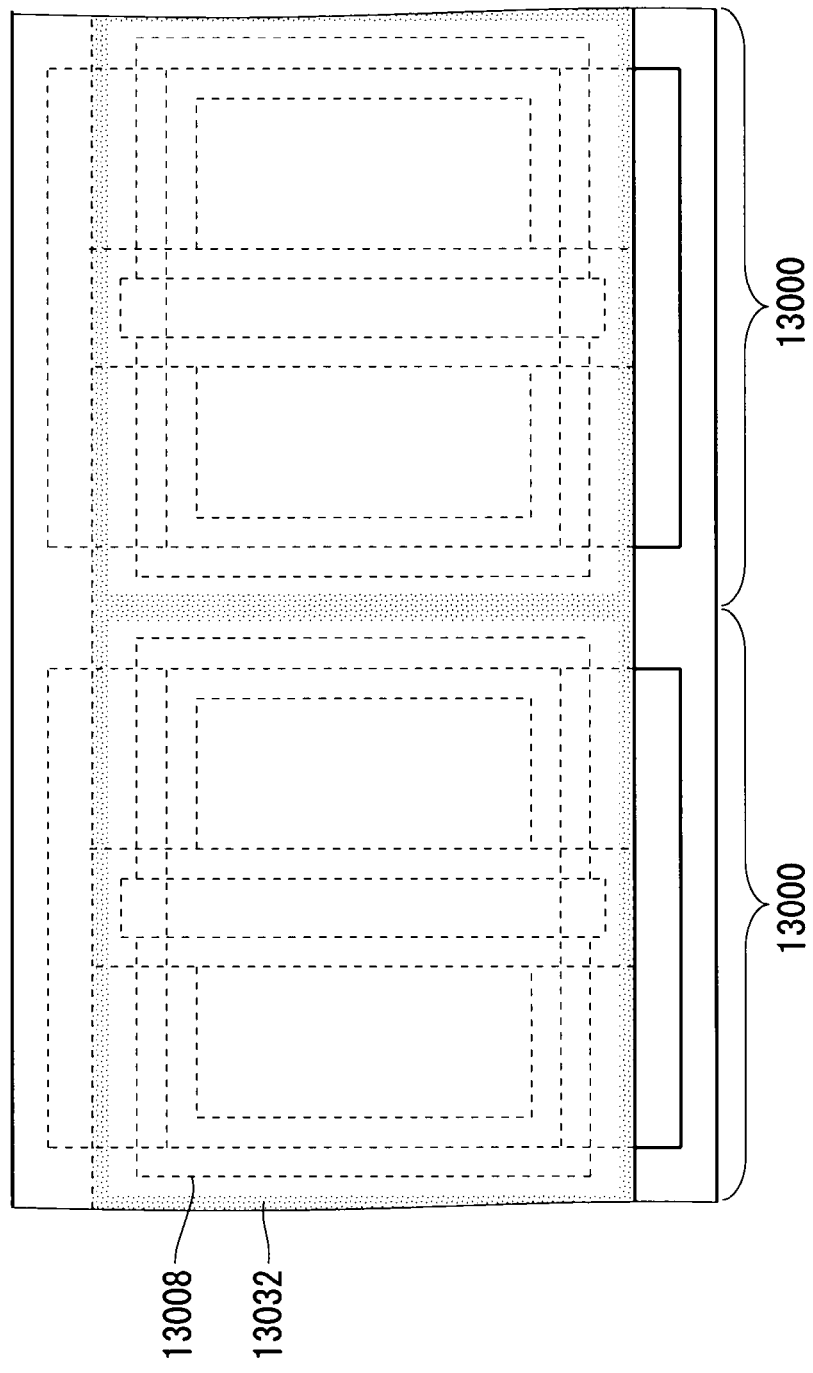

METHOD FOR MANUFACTURING LITHIUM SECONDARY BATTERY, METHOD FOR MANUFACTURING STACKED BATTERY, AND METHOD FOR MANUFACTURING COMPOSITE BODY

TECHNICAL FIELD

The present invention relates to a method for manufacturing a lithium secondary battery including one or more cells, a method for manufacturing a stacked battery in which two or more lithium secondary batteries are combined, and a method for manufacturing a composite body in which a current collector, an electrode terminal, and an outer film are integrated with one another.

BACKGROUND ART

There is a lithium secondary battery in which a cell is sealed with an outer film. In such a lithium secondary battery, a positive electrode current collector, a positive electrode active material layer, an electrolyte layer, a negative electrode active material layer, and a negative electrode current collector are stacked to form a cell, and the cell is sealed with an outer film. In the lithium secondary battery, a positive electrode terminal and a negative electrode terminal that are exposed to the outside are provided.

For example, in a lithium secondary battery (polymer lithium ion secondary battery) according to Japanese Patent Application Laid-Open No. 11-312514 (1999), a positive electrode active material layer and a negative electrode active material layer are formed on a surface of a positive electrode current collector and a surface of a negative electrode current collector, respectively, to prepare a positive electrode side composite body in which the positive electrode current collector is integrated with the positive electrode active material layer and a negative electrode side composite body in which the negative electrode current collector is integrated with the negative electrode active material layer (paragraph 0007). A positive electrode terminal and a negative electrode terminal (leads) are connected to the positive electrode current collector and the negative electrode current collector, respectively (paragraph 0008). An electrolyte layer is arranged between the positive electrode side composite body and the negative electrode side composite body (paragraph 0008). A stack of the positive electrode current collector, the positive electrode active material layer, the electrolyte layer, the negative electrode active material layer, and the negative electrode current collector is sealed with an outer film (laminated film) (paragraph 0008).

In a lithium secondary battery according to Japanese Patent Application Laid-Open No. 11-97070 (1999), a positive electrode active material layer and a negative electrode active material layer are formed on a surface of a positive electrode current collector and a surface of a negative electrode current collector, respectively, to prepare a positive electrode side composite body (positive electrode) in which the positive electrode current collector is integrated with the positive electrode active material layer and a negative electrode side composite body (negative electrode) in which the negative electrode current collector is integrated with the negative electrode active material layer (paragraph 0044). A positive electrode terminal (positive electrode lead) and a negative electrode terminal (negative electrode lead) are connected to the positive electrode current collector and the negative electrode current collector, respectively (paragraph 0048). An electrolyte layer is arranged between the positive electrode side composite body and the negative electrode side composite body (paragraph 0048). A stack of the positive electrode current collector, the positive electrode active material layer, the electrolyte layer, the negative electrode active material layer, and the negative electrode current collector is sealed with a two-folded outer film (composite film) (paragraph 0049).

SUMMARY OF THE INVENTION

Problems to be Solved by the Invention

In the lithium secondary batteries according to Japanese Patent Application Laid-Open No. 11-312514 (1999) and Japanese Patent Application Laid-Open No. 11-97070 (1999), if the positive electrode current collector, the negative electrode current collector, the positive electrode terminal, and the negative electrode terminal do not have a sufficient strength, they are easily damaged during manufacture of the lithium secondary battery. Therefore, it is difficult to reduce the thickness and weight of them. Particularly, the positive electrode terminal and the negative electrode terminal are likely to be damaged, even after the manufacture of the lithium secondary battery. It is difficult to reduce the thickness of the positive electrode terminal and the negative electrode terminal without a reinforcement using a reinforcing material such as a conductive foil, a conductive plate, or a plastic sheet. Accordingly, in the lithium secondary batteries according to the Japanese Patent Application Laid-Open No. 11-312514 (1999) and Japanese Patent Application Laid-Open No. 11-97070 (1999), it is difficult to improve the volume energy density and the weight energy density.

Moreover, in the lithium secondary batteries according to Japanese Patent Application Laid-Open No. 11-312514 (1999) and Japanese Patent Application Laid-Open No. 11-97070 (1999), it is also difficult to improve the productivity, because a stack of the positive electrode current collector, the positive electrode active material layer, the electrolyte layer, the negative electrode active material layer, and the negative electrode current collector is individually sealed.

The present invention is made to solve these problems. An object of the present invention is to provide a method for manufacturing a lithium secondary battery capable of improving the volume energy density and the weight energy density of the lithium secondary battery. Desirably, an object of the present invention is to improve the productivity of the lithium secondary battery.

Means for Solving the Problems

First to fourteenth aspects of the present invention are directed to a method for manufacturing a lithium secondary battery including one or more cells.

(1) In a first aspect of the present invention, the whole of a first conductive material layer is formed on a first bonding surface of a first outer film to prepare a first composite body in which the first conductive material layer is integrated with the first outer film. A first-pole active material substance and an electrolyte substance are sequentially printed with plane positions thereof being aligned with that of a first-pole current collector, so that a first-pole active material precursor layer and an electrolyte precursor layer are sequentially added to the first composite body. The first-pole active material precursor layer and the electrolyte precursor layer are simultaneously or separately subjected to a crosslinking process, so that the first-pole active material precursor layer and the electrolyte precursor layer are transformed into a first-pole active material layer and a electrolyte layer, respectively.

Separately from this, the whole of a second conductive material layer is formed on a second bonding surface of a second outer film to prepare a second composite body in which the second conductive material layer is integrated with the second outer film. A second-pole active material substance is printed with a plane position thereof being aligned with that of a second-pole current collector, so that a second-pole active material precursor layer is added to the second composite body. Simultaneously with or separately from the crosslinking process on the first-pole active material precursor layer and the electrolyte precursor layer, the second-pole active material precursor layer is subjected to a crosslinking process, and thereby the second-pole active material precursor layer is transformed into a second-pole active material layer.

Subsequently, the first bonding surface and the second bonding surface are placed face to face with each other, and then a first application region and a second application region are applied to each other. The first outer film and the second outer film are bonded to each other, to seal a cell. The first application region and the second application region are applied to each other while aligning plane positions of the first-pole current collector, the first-pole active material layer, the electrolyte layer, the second-pole active material layer, and the second-pole current collector.

The first conductive material layer includes a first-pole current collector of the cell, and a first-pole electrode terminal that is electrically connected to the first-pole current collector. The second conductive material layer includes a second-pole current collector of the cell, and a second-pole electrode terminal that is electrically connected to the second-pole current collector. The first-pole current collector is located within the first application region, and at least a part of the first-pole electrode terminal is located outside the first application region. The second-pole current collector is located within the second application region, and at least a part of the second-pole electrode terminal is located outside the second application region. The first outer film and the second outer film have flexibility and barrier properties.

In the first-pole active material substance, a pre-crosslinked precursor of a lithium-ion-conducting polymer electrolyte and a first-pole active material are mixed. In the second-pole active material substance, a pre-crosslinked precursor of a lithium-ion-conducting polymer electrolyte and a second-pole active material are mixed. The electrolyte substance contains a pre-crosslinked precursor of a lithium-ion-conducting polymer electrolyte.

(2) In a second aspect of the present invention, in the first aspect of the present invention, a second electrolyte precursor layer and a second electrolyte layer are formed in addition to the electrolyte precursor layer (first electrolyte precursor layer) and the electrolyte layer (first electrolyte layer) mentioned above. That is, after the second-pole active material precursor layer is added to the second composite body, an electrolyte substance is printed with a plane position thereof being aligned with that of the second-pole current collector, so that the second electrolyte precursor layer is added to the second composite body. The second-pole active material precursor layer and the second electrolyte precursor layer are simultaneously or separately subjected to a crosslinking process, and thereby the second-pole active material precursor layer and the second electrolyte precursor layer are transformed into the second-pole active material layer and the second electrolyte layer, respectively.

(3) In a third aspect of the present invention, in the first or second aspect of the present invention, the lithium secondary battery includes two or more cells or two or more parallel cell groups. The first conductive material layer and the second conductive material layer further include a first series wiring and a second series wiring, respectively. The first series wiring and the second series wiring connect the two or more cells or the two or more parallel cell groups in series with each other.

(4) In a fourth aspect of the present invention, in the first or second aspect of the present invention, the lithium secondary battery includes two or more cells or two or more series cell groups. The first conductive material layer and the second conductive material layer further include a first parallel wiring and a second parallel wiring, respectively. The first parallel wiring and the second parallel wiring connect the two or more cells or the two or more series cell groups in parallel with each other.

(5) In a fifth aspect of the present invention, in any of the first to fourth aspects of the present invention, the first outer film and the second outer film are cut before the first application region and the second application region are applied to each other. A part of the first outer film located outside the first application region is removed from the first composite body while a portion where the first-pole electrode terminal overlaps the first outer film is left. A part of the second outer film located outside the second application region is removed from the second composite body while a portion where the second-pole electrode terminal overlaps the second outer film is left. The first outer film is cut, before or after the first-pole active material layer and the electrolyte layer are formed. The second outer film is cut, before or after the second-pole active material layer is formed.

(6) In a sixth aspect of the present invention, in any of the first to fifth aspects of the present invention, a paste containing a dispersion of conductor particles is printed on the first bonding surface and the second bonding surface, and thereby the first conductive material layer and the second conductive material layer are formed.

(7) In a seventh aspect of the present invention, in any of the first to sixth aspects of the present invention, the first outer film and the second outer film are webs, and the first conductive material layer and the second conductive material layer are repeatedly formed respectively on the first outer film and the second outer film that are traveling in a direction of extension.

(8) In an eighth aspect of the present invention, the whole of a first conductive material layer is formed in a first conductive material layer formation region of a bonding surface of an outer film and the whole of a second conductive material layer is formed in a second conductive material layer formation region of the bonding surface to prepare a composite body in which the first conductive material layer, the second conductive material layer, and the outer film are integrated with one another. A first-pole active material substance is printed with a plane position thereof being aligned with that of a first-pole current collector, so that a first-pole active material precursor layer is added to the composite body. An electrolyte substance is printed with a plane position thereof being aligned with that of the first-pole current collector, so that an electrolyte precursor layer is added to the composite body. A second-pole active material substance is printed with a plane position thereof being aligned with that of a second-pole current collector, so that a second-pole active material precursor layer is added to the composite body. The first-pole active material precursor layer, the electrolyte precursor layer, and the second-pole active material precursor layer are simultaneously or separately subjected to a crosslinking process, and thereby the first-pole active material precursor layer, the electrolyte precursor layer, and the second-pole active material precursor layer are transformed into a first-pole active material layer, an electrolyte layer, and a second-pole active material layer, respectively. In the first-pole active material substance, a pre-crosslinked precursor of a lithium-ion-conducting polymer electrolyte and a first-pole active material are mixed. In the second-pole active material substance, a pre-crosslinked precursor of a lithium-ion-conducting polymer electrolyte and a second-pole active material are mixed. The electrolyte substance contains a pre-crosslinked precursor of a lithium-ion-conducting polymer electrolyte.

Subsequently, the outer film is folded, with the bonding surface on the inside, at a position of a line that partitions the first conductive material layer formation region and the second conductive material layer formation region from each other, and then a first application region and a second application region are applied to each other. The outer film is bonded, to seal a cell. The first application region and the second application region are applied to each other while aligning plane positions of the first-pole current collector, the first-pole active material layer, the electrolyte layer, the second-pole active material layer, and the second-pole current collector.

The first conductive material layer includes a first-pole current collector of the cell, and a first-pole electrode terminal that is electrically connected to the first-pole current collector. The first-pole current collector is located within the first application region, and at least a part of the first-pole electrode terminal is located outside the first application region. The second conductive material layer includes a second-pole current collector of the cell, and a second-pole electrode terminal that is electrically connected to the second-pole current collector. The second-pole current collector is located within the second application region, and at least a part of the second-pole electrode terminal is located outside the second application region. The outer film has flexibility and barrier properties.

(9) In a ninth aspect of the present invention, in the eighth aspect of the present invention, a second electrolyte precursor layer and a second electrolyte layer are formed in addition to the electrolyte precursor layer (first electrolyte precursor layer) and the electrolyte layer (first electrolyte layer) mentioned above. That is, after the second-pole active material precursor layer is added to the composite body, an electrolyte substance is printed with a plane position thereof being aligned with that of the second-pole current collector, so that the second electrolyte precursor layer is added to the composite body. The first-pole active material precursor layer, the first electrolyte precursor layer, the second-pole active material precursor layer, and the second electrolyte precursor layer are simultaneously or separately subjected to a crosslinking process, and thereby the first-pole active material precursor layer, the first electrolyte precursor layer, the second-pole active material precursor layer, and the second electrolyte precursor layer are transformed into the first-pole active material layer, the first electrolyte layer, the second-pole active material layer, and the second electrolyte layer, respectively.

(10) In a tenth aspect of the present invention, in the eighth or ninth aspect of the present invention, the lithium secondary battery includes two or more cells or two or more parallel cell groups. The first conductive material layer and the second conductive material layer further include a first series wiring and a second series wiring, respectively. The first series wiring and the second series wiring connect the two or more cells or the two or more parallel cell groups in series with each other.

(11) In an eleventh aspect of the present invention, in the eighth or ninth aspect of the present invention, the lithium secondary battery includes two or more cells or two or more series cell groups. The first conductive material layer and the second conductive material layer further include a first parallel wiring and a second parallel wiring, respectively. The first parallel wiring and the second parallel wiring connect the two or more cells or the two or more series cell groups in parallel with each other.

(12) In a twelfth aspect of the present invention, in any of the eighth to eleventh aspects of the present invention, the outer film is cut before the first application region and the second application region are applied to each other. A part of the outer film located outside the first application region and the second application region is removed from the composite body while a portion where the first-pole electrode terminal overlaps the outer film and a portion where the second-pole electrode terminal overlaps the outer film are left. The outer film is cut, before or after the first-pole active material layer, the electrolyte layer, and the second-pole active material layer are formed.

(13) In a thirteenth aspect of the present invention, in any of the eighth to twelfth aspects of the present invention, a paste containing a dispersion of conductor particles is printed on the bonding surface, and thereby the first conductive material layer and the second conductive material layer are formed.

(14) In a fourteenth aspect of the present invention, in any of the eighth to thirteenth aspects of the present invention, the outer film is a web, and the first conductive material layer and the second conductive material layer are repeatedly formed on the outer film that is traveling in a direction of extension.

Fifteenth and sixteenth aspects of the present invention are directed to a method for manufacturing a stacked battery in which two or more lithium secondary batteries are combined.

(15) In a fifteenth aspect of the present invention, two or more separated lithium secondary batteries are manufactured by the method for manufacturing the lithium secondary battery according to any of the first to fourteenth aspects of the present invention. The two or more lithium secondary batteries are stacked, and sealed with an outermost film.

(16) In a sixteenth aspect of the present invention, two or more continuous lithium secondary batteries are manufactured by the method for manufacturing the lithium secondary battery according to any of the first to fourteenth aspects of the present invention. The two or more lithium secondary batteries are stacked by being folded in a zigzag shape, and sealed with an outermost film.

A seventeenth aspect of the present invention relates to a method for manufacturing a composite body in which a current collector, an electrode terminal, and an outer film are integrated with one another.

(17) In a seventeenth aspect of the present invention, the whole of a conductive material layer is formed on a bonding surface of an outer film, and the conductive material layer is integrated with the outer film. The conductive material layer includes a current collector of a cell, and an electrode terminal that is electrically connected to the current collector. The current collector is located within an application region, and at least a part of the electrode terminal is located outside the application region. The outer film is cut, so that a part of the outer film located outside the application region is removed from the composite body while a portion where the electrode terminal overlaps the outer film is left. The outer film has flexibility and barrier properties.

(18) In an eighteenth aspect of the present invention, the whole of a first conductive material layer is formed on a first bonding surface of a first outer film to prepare a first composite body in which the first conductive material layer is integrated with the first outer film. A first-pole active material substance and an electrolyte substance are sequentially printed with plane positions thereof being aligned with that of a first-pole current collector, so that a first-pole active material layer and an electrolyte layer are sequentially added to the first composite body.

Separately from this, the whole of a second conductive material layer is formed on a second bonding surface of a second outer film to prepare a second composite body in which the second conductive material layer is integrated with the second outer film. A second-pole active material substance is printed with a plane position thereof being aligned with that of a second-pole current collector, so that a second-pole active material layer is added to the second composite body.

Subsequently, the first bonding surface and the second bonding surface are placed face to face with each other, and then a first application region and a second application region are applied to each other. The first outer film and the second outer film are bonded to each other, to seal a cell. The first application region and the second application region are applied to each other while aligning plane positions of the first-pole current collector, the first-pole active material layer, the electrolyte layer, the second-pole active material layer, and the second-pole current collector.

The first conductive material layer includes a first-pole current collector of the cell, and a first-pole electrode terminal that is electrically connected to the first-pole current collector. The second conductive material layer includes a second-pole current collector of the cell, and a second-pole electrode terminal that is electrically connected to the second-pole current collector. The first-pole current collector is located within the first application region, and at least a part of the first-pole electrode terminal is located outside the first application region. The second-pole current collector is located within the second application region, and at least a part of the second-pole electrode terminal is located outside the second application region. The first outer film and the second outer film have flexibility and barrier properties.

In the first-pole active material substance, a lithium-ion-conducting polymer electrolyte and a first-pole active material are mixed. In the second-pole active material substance, a lithium-ion-conducting polymer electrolyte and a second-pole active material are mixed. The electrolyte substance contains a lithium-ion-conducting polymer electrolyte.

(19) In a nineteenth aspect of the present invention, the whole of a first conductive material layer is formed in a first conductive material layer formation region of a bonding surface of an outer film and the whole of a second conductive material layer is formed in a second conductive material layer formation region of the bonding surface to prepare a composite body in which the first conductive material layer, the second conductive material layer, and the outer film are integrated with one another. A first-pole active material substance is printed with a plane position thereof being aligned with that of a first-pole current collector, so that a first-pole active material layer is added to the composite body. An electrolyte substance is printed with a plane position thereof being aligned with that of the first-pole current collector, so that an electrolyte layer is added to the composite body. A second-pole active material substance is printed with a plane position thereof being aligned with that of a second-pole current collector, so that a second-pole active material layer is added to the composite body. In the first-pole active material substance, a lithium-ion-conducting polymer electrolyte and a first-pole active material are mixed. In the second-pole active material substance, a lithium-ion-conducting polymer electrolyte and a second-pole active material are mixed. The electrolyte substance contains a lithium-ion-conducting polymer electrolyte.

Subsequently, the outer film is folded, with the bonding surface on the inside, at a position of a line that partitions the first conductive material layer formation region and the second conductive material layer formation region from each other, and then a first application region and a second application region are applied to each other. The outer film is bonded, to seal a cell. The first application region and the second application region are applied to each other while aligning plane positions of the first-pole current collector, the first-pole active material layer, the electrolyte layer, the second-pole active material layer, and the second-pole current collector.

The first conductive material layer includes a first-pole current collector of the cell, and a first-pole electrode terminal that is electrically connected to the first-pole current collector. The first-pole current collector is located within the first application region, and at least a part of the first-pole electrode terminal is located outside the first application region. The second conductive material layer includes a second-pole current collector of the cell, and a second-pole electrode terminal that is electrically connected to the second-pole current collector. The second-pole current collector is located within the second application region, and at least a part of the second-pole electrode terminal is located outside the second application region. The outer film has flexibility and barrier properties.

Effects of the Invention

In the first aspect of the present invention, the first conductive material layer overlaps the first outer film, and the second conductive material layer overlaps the second outer film. Thus, the first-pole current collector, the first-pole electrode terminal, the second-pole current collector, and the second-pole electrode terminal are not easily damaged, even if the thickness thereof is small. This can reduce the size and weight of the lithium secondary battery. As a result, the volume energy density and the weight energy density of the lithium secondary battery are improved. Additionally, since the first-pole active material layer, the electrolyte layer, and the second-pole active material layer are formed by printing, the productivity of the lithium secondary battery is improved.

In the eighth aspect of the present invention, the first conductive material layer and the second conductive material layer overlap the outer film. Thus, the first-pole current collector, the first-pole electrode terminal, the second-pole current collector, and the second-pole electrode terminal are not easily damaged, even if the thickness thereof is small. This can reduce the size and weight of the lithium secondary battery. As a result, the volume energy density and the weight energy density of the lithium secondary battery are improved. Additionally, since the first-pole active material layer, the electrolyte layer, and the second-pole active material layer are formed by printing, the productivity of the lithium secondary battery is improved.

In the second or ninth aspect of the present invention, when the first application region and the second application region are applied to each other, the first electrolyte layer and the second electrolyte layer that are made of the same material are surely bonded to each other. As a result, an influence of occurrence of an interface that would be caused by uncertain bonding is suppressed, thus achieving uniform characteristics of the cells.

In the third or tenth aspect of the present invention, two or more cells or two or more parallel cell groups are connected in series without hindering the downsizing and weight reduction of the lithium secondary battery.

In the fourth or eleventh aspect of the present invention, two or more cells or two or more series cell groups are connected in parallel without hindering the downsizing and weight reduction of the lithium secondary battery.

In the sixth or thirteenth aspect of the present invention, many first conductive material layers and many second conductive material layers are successively formed. Thus, a roll-to-roll process is applicable, so that the productivity of the lithium secondary battery is improved.

In the seventh or fourteenth aspect of the present invention, the first conductive material layers are simultaneously formed, and the second conductive material layers are simultaneously formed. Thus, the productivity of the lithium secondary battery is improved.

In the fifteenth or sixteenth aspect of the present invention, the cell is double-sealed. Thus, the sealing performance is improved.

In the seventeenth aspect of the present invention, the conductive material layer overlaps the outer film. Thus, the current collector and the electrode terminal are not easily damaged, even if the thickness thereof is small. This can reduce the thickness and weight of the composite body.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 A plan view showing the method for manufacturing the lithium secondary battery according to the first embodiment.

FIG. 58 A plan view showing the modification of the method for manufacturing the lithium secondary battery according to the first embodiment.

FIG. 59 A plan view showing the modification of the method for manufacturing the lithium secondary battery according to the first embodiment.

FIG. 64 A plan view showing the modification of the method for manufacturing the lithium secondary battery according to the first embodiment.

FIG. 65 A plan view showing a modification of the method for manufacturing the lithium secondary battery according to the second embodiment.

FIG. 80 A plan view showing the modification of the method for manufacturing the lithium secondary battery according to the third embodiment.

EMBODIMENT FOR CARRYING OUT THE INVENTION

In first to fifth embodiments, a description will be given to a lithium secondary battery including one or more cells, and to a manufacturing method thereof. In sixth and seventh embodiments, a description will be given to a stacked battery in which two or more lithium secondary batteries are combined, and to a manufacturing method thereof. In an eighth embodiment, a description will be given to a positive electrode active material layer, an electrolyte layer, and a negative electrode active material layer according to the first to fifth embodiments, and also to a method for forming them. In a ninth embodiment, a description will be given to a method for forming an electrolyte layer, as an alternative to the method for forming the electrolyte layer according to the eighth embodiment. In a tenth embodiment, a description will be given to a positive electrode side conductive material layer and a negative electrode side conductive material layer according to the first to fifth embodiments, and also to a method for forming them. In an eleventh embodiment, a description will be given to a barrier film used for a positive electrode side outer film and a negative electrode side outer film according to the first to fourth embodiments, for an outer film according to the fifth embodiment, and for an upper outermost film and a lower outermost film according to the sixth and seventh embodiments.

First Embodiment

The first embodiment relates to a lithium secondary battery including one cell, and to a manufacturing method thereof.

(Structure of Lithium Secondary Battery)

Figure 1:
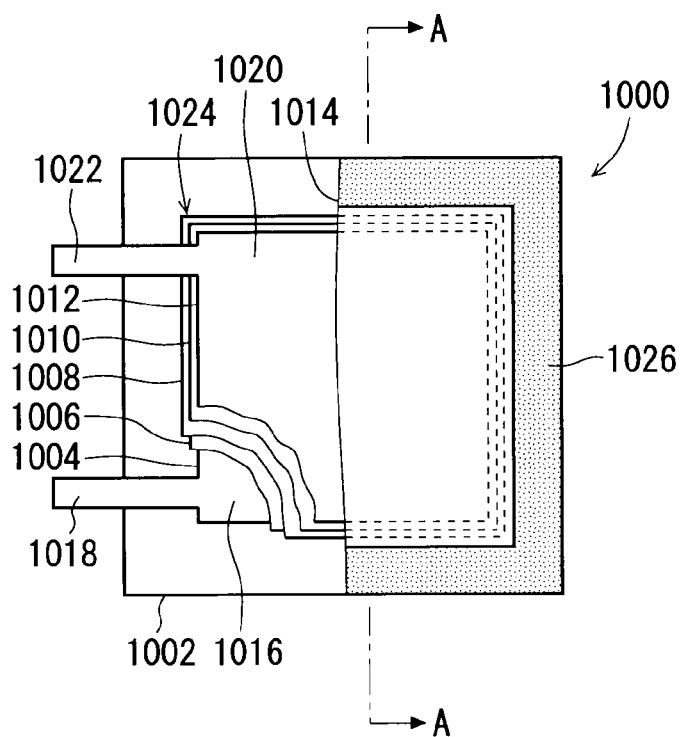
FIG. 1 A plan view of a lithium secondary battery according to a first embodiment.
Figure 2:
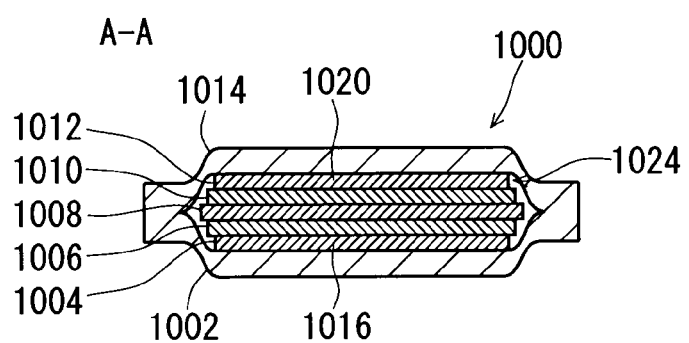
FIG. 2 A cross-sectional view of the lithium secondary battery according to the first embodiment.

FIGS. 1 and 2 are diagrams schematically showing the lithium secondary battery according to the first embodiment. FIG. 1 is a plan view, and FIG. 2 is a cross-sectional view as taken along the line A-A of FIG. 1. In FIG. 1, parts of upper component materials defined by cut-away lines are removed, in order to show component materials located under the upper component materials.

As shown in FIGS. 1 and 2, a lithium secondary battery 1000 includes a positive electrode side outer film 1002, a positive electrode side conductive material layer 1004, a positive electrode active material layer 1006, an electrolyte layer 1008, a negative electrode active material layer 1010, a negative electrode side conductive material layer 1012, and a negative electrode side outer film 1014. The positive electrode side conductive material layer 1004 has a positive electrode current collector 1016 and a positive electrode terminal 1018. The negative electrode side conductive material layer 1012 has a negative electrode current collector 1020 and a negative electrode terminal 1022. The positive electrode terminal 1018 is also called a positive electrode tab, a positive electrode tag, a positive electrode lead, or the like. The negative electrode terminal 1022 is also called a negative electrode tab, a negative electrode tag, a negative electrode lead, or the like.

It is desirable that each of the positive electrode side conductive material layer 1004 and the negative electrode side conductive material layer 1012 is a continuous layer. That is, the positive electrode current collector 1016 and the positive electrode terminal 1018 do not overlap each other, and no interface exists at a connection portion therebetween. The negative electrode current collector 1020 and the negative electrode terminal 1022 do not overlap each other, and no interface exists at a connection portion therebetween. In a case where a slight reduction in the productivity of the lithium secondary battery 1000 is allowable, the positive electrode side conductive material layer 1004 and the negative electrode side conductive material layer 1012 may not be continuous layers.

The positive electrode current collector 1016, the positive electrode active material layer 1006, the electrolyte layer 1008, the negative electrode active material layer 1010, and the negative electrode current collector 1020 are stacked in the same plane position, and form a cell (power generating element) 1024.

The positive electrode side outer film 1002 and the negative electrode side outer film 1014 are bonded to each other in a bonding region 1026 that surrounds the cell 1024. The cell 1024 is sealed with the positive electrode side outer film 1002 and the negative electrode side outer film 1014. Here, the term "bond" means coupling one bonding object and the other bonding object to each other and fix the one bonding object to the other bonding object. The meaning of "bonding" includes both of the meanings: coupling one bonding object and the other bonding object to each other in a state where the one bonding object and the other bonding object are in direct contact; and coupling one bonding object and the other bonding object to each other in a state where the one bonding object and the other bonding object are in indirect contact with interposition of a bonding medium.

One end of the positive electrode terminal 1018 and one end of the negative electrode terminal 1022 are electrically connected to the positive electrode current collector 1016 and the negative electrode current collector 1020, respectively. The other end of the positive electrode terminal 1018 and the other end of the negative electrode terminal 1022 are exposed to the outside of the lithium secondary battery 1000. The cell 1024 is charged and discharged through the positive electrode terminal 1018 and the negative electrode terminal 1022.

(Manufacture of Lithium Secondary Battery)

FIGS. 3 to 12 are diagrams schematically showing a flow of manufacture of the lithium secondary battery according to the first embodiment. FIGS. 3 to 12 are plan views.

(Preparation of Positive Electrode Side Composite Body)

Figure 3:
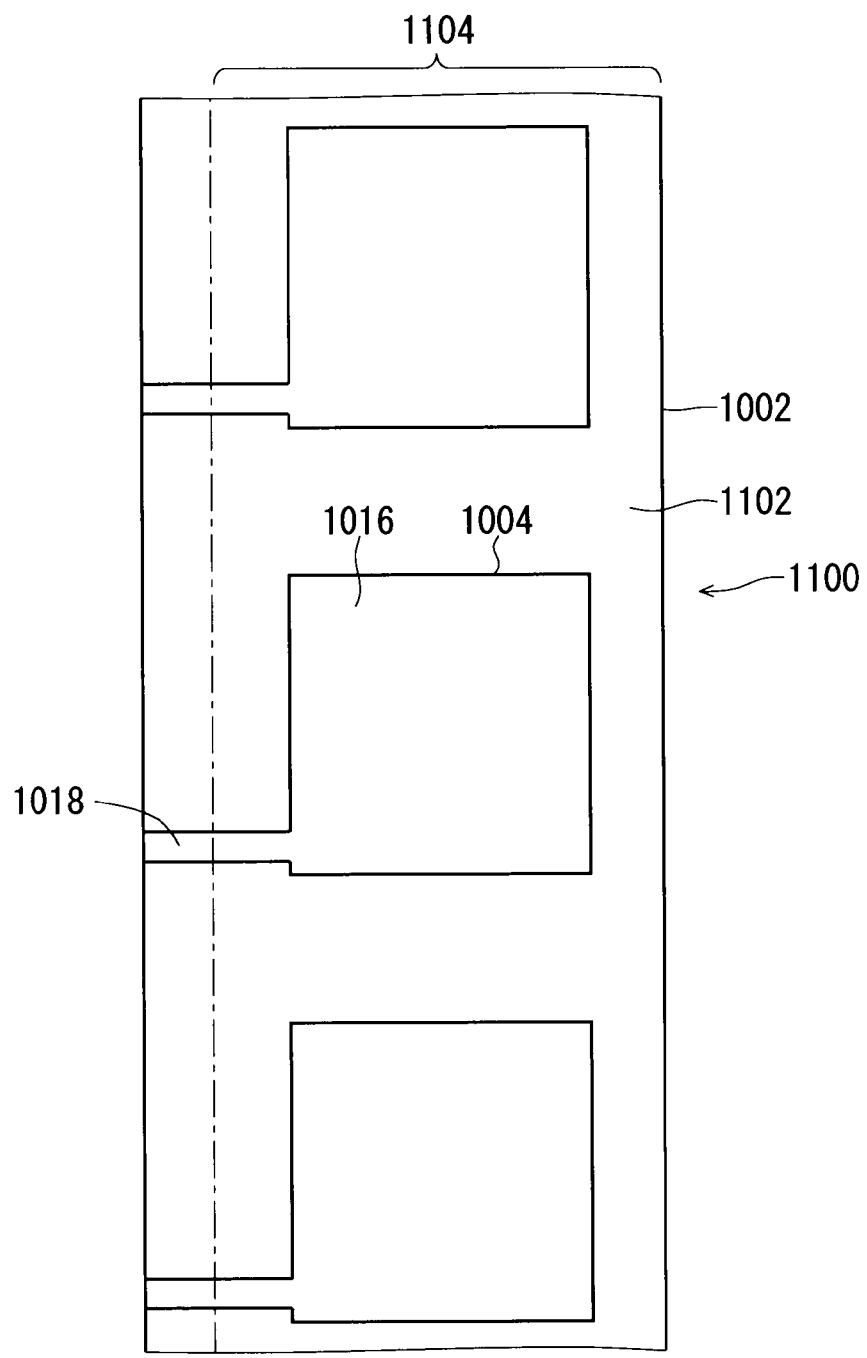
FIG. 3 A plan view showing a method for manufacturing the lithium secondary battery according to the first embodiment.

In the manufacture of the lithium secondary battery 1000, as shown in FIG. 3, the whole of the positive electrode side conductive material layer 1004 is formed on a positive electrode side bonding surface 1102 of the positive electrode side outer film 1002 to prepare a positive electrode side composite body 1100 in which the positive electrode side conductive material layer 1004 is integrated with the positive electrode side outer film 1002. The whole of the positive electrode side conductive material layer 1004 is supported on the positive electrode side outer film 1002. As a result, the positive electrode side conductive material layer 1004 is not easily damaged, even if the thickness thereof is small.

The positive electrode current collector 1016 is located within a positive electrode side application region 1104. At least a part of the positive electrode terminal 1018 is located outside the positive electrode side application region 1104. As a result, when the cell 1024 is sealed, the positive electrode terminal 1018 is exposed to the outside of the lithium secondary battery 1000.

(Preparation of Negative Electrode Side Composite Body)

Figure 4:
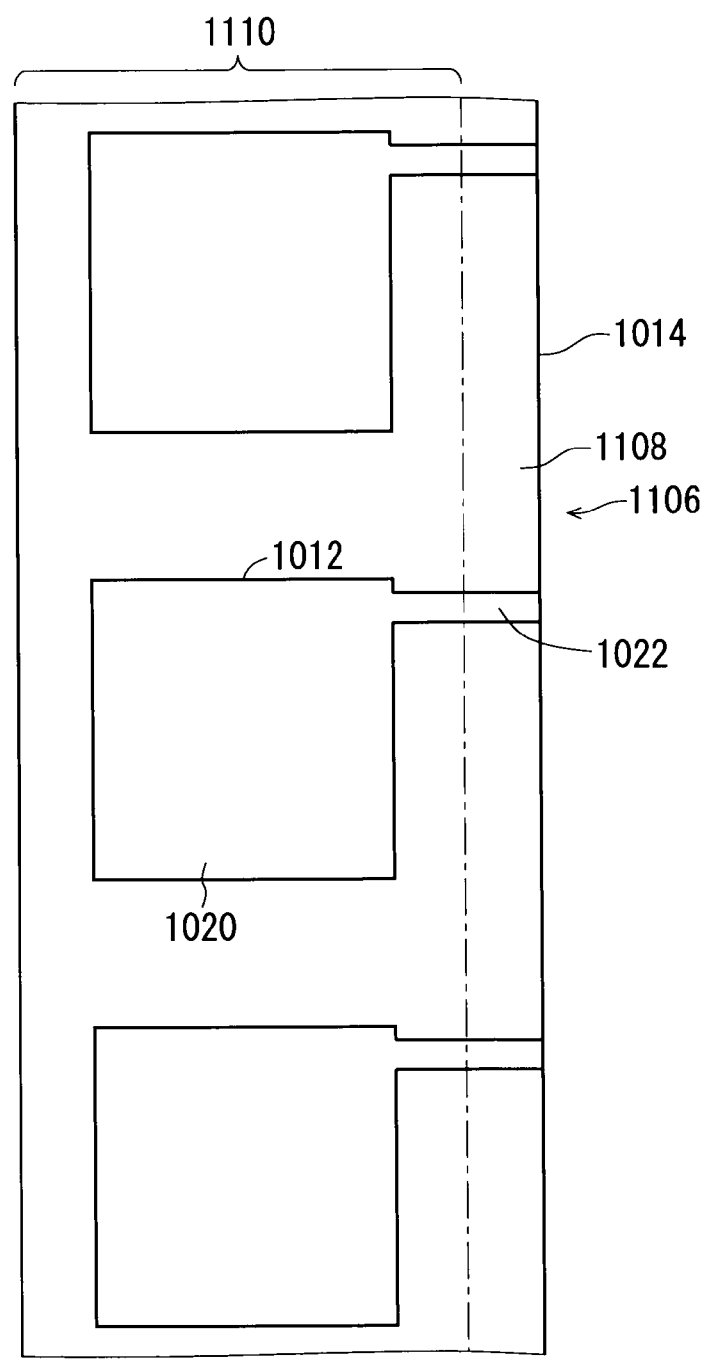
FIG. 4 A plan view showing the method for manufacturing the lithium secondary battery according to the first embodiment.

Separately from the preparation of the positive electrode side composite body 1100, as shown in FIG. 4, the whole of the negative electrode side conductive material layer 1012 is formed on a negative electrode side bonding surface to prepare a negative electrode side composite body 1106 in which the negative electrode side conductive material layer 1012 is integrated with the negative electrode side outer film 1014. The whole of the negative electrode side conductive material layer 1012 is supported on the negative electrode side outer film 1014. As a result, the negative electrode side conductive material layer 1012 is not easily damaged, even if the thickness thereof is small.

The negative electrode current collector 1020 is located within a negative electrode side application region 1110. At least a part of the negative electrode terminal 1022 is located outside the negative electrode side application region 1110. As a result, when the cell 1024 is sealed, the negative electrode terminal 1022 is exposed to the outside of the lithium secondary battery 1000.

(Positional Relationship)

The positive electrode side application region 1104 and the negative electrode side application region 1110 are applied to each other in a subsequent step. The plane positions of the positive electrode terminal 1018 and the negative electrode terminal 1022 are determined in such a manner that the positive electrode terminal 1018 and the negative electrode terminal 1022 cannot overlap each other at a time of aligning the plane positions of the positive electrode current collector 1016 and the negative electrode current collector 1020 during the application.

(Configuration of Positive Electrode Side Outer Film and Negative Electrode Side Outer Film)

As shown in FIGS. 3 and 4, the positive electrode side outer film 1002 and the negative electrode side outer film 1014 are webs having constant widths. In the positive electrode side outer film 1002 and the negative electrode side outer film 1014 that are traveling in a direction of extension, the positive electrode side conductive material layer 1004 and the negative electrode side conductive material layer 1012 are repeatedly formed, respectively. Thereby, many positive electrode side conductive material layers 1004 and many negative electrode side conductive material layers 1012 are formed at a high speed, while being arranged in the traveling direction of the positive electrode side outer film 1002 and the negative electrode side outer film 1014. Thus, a roll-to-roll process is applicable, so that the productivity of the lithium secondary battery 1000 is improved. However, it may be also possible that the positive electrode side conductive material layer 1004 and the negative electrode side conductive material layer 1012 are formed respectively on a positive electrode side outer film and a negative electrode side outer film that have been prepared as separate sheets corresponding to each lithium secondary battery 1000.

(Addition of Positive Electrode Active Material Layer, Electrolyte Layer, and Negative Electrode Active Material Layer)

Figure 5:
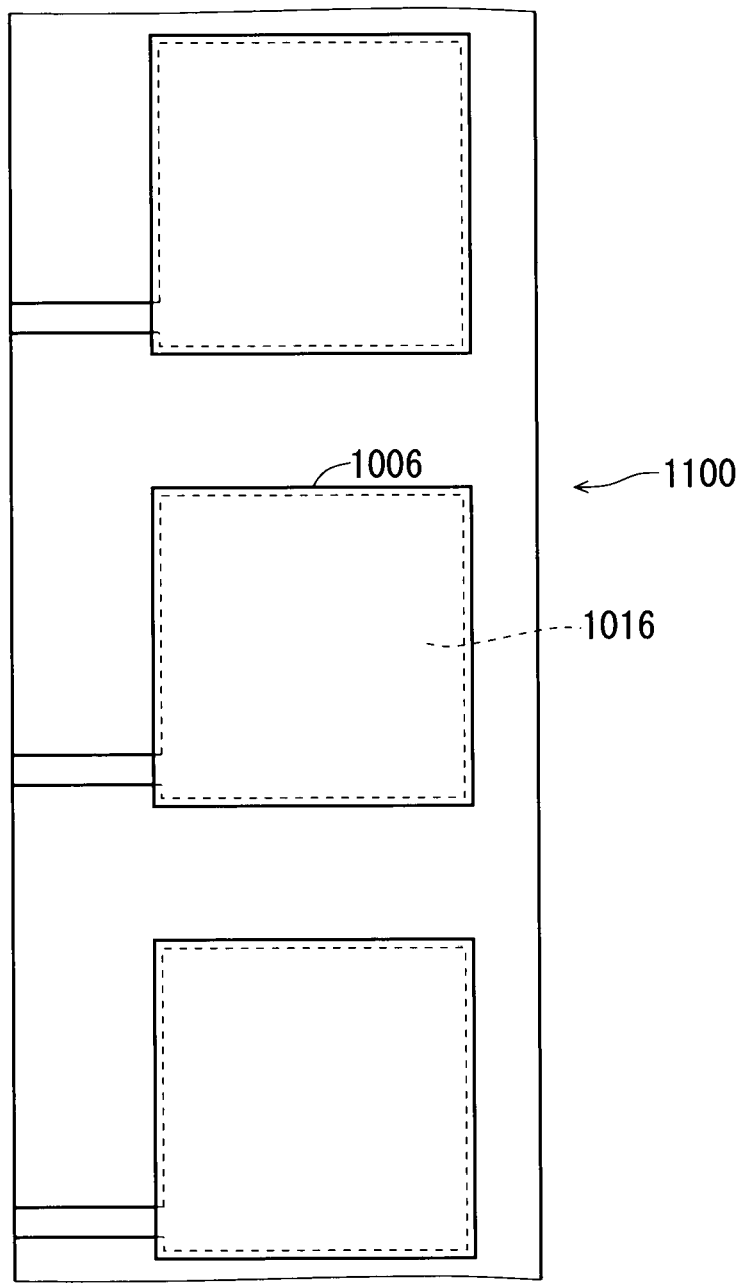
FIG. 5 A plan view showing the method for manufacturing the lithium secondary battery according to the first embodiment.
Figure 6:
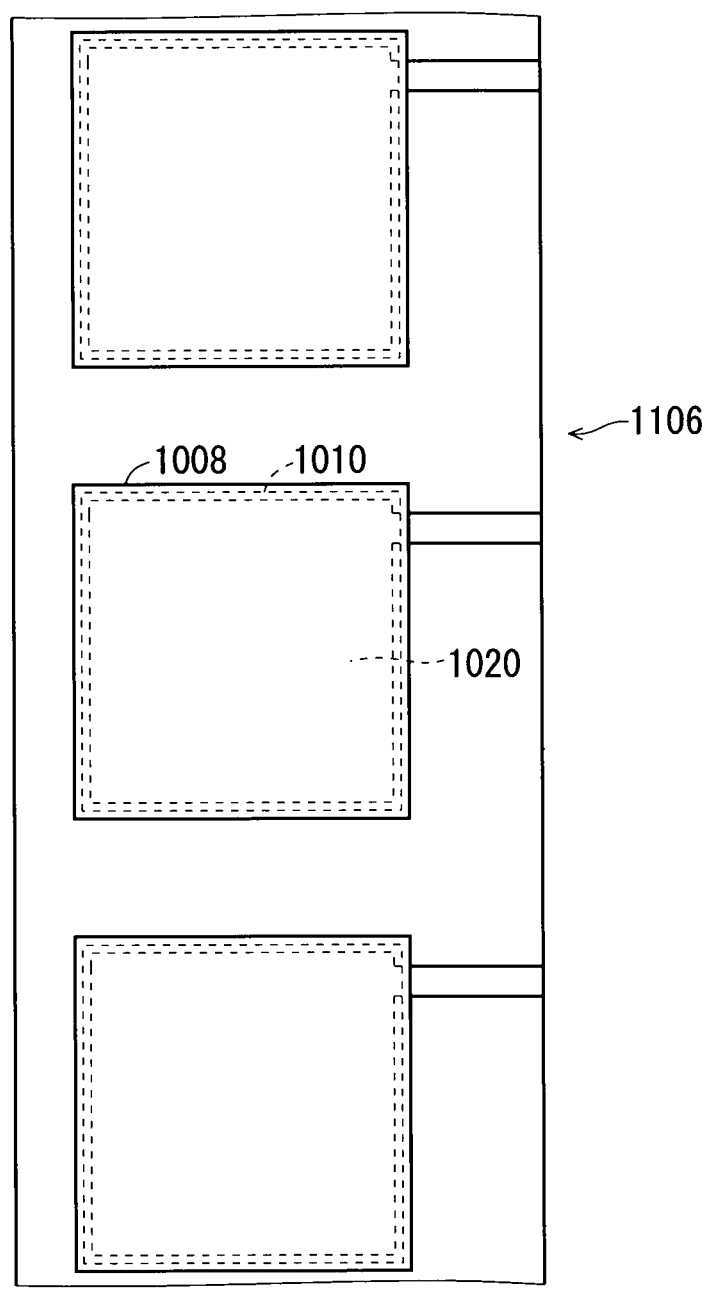
FIG. 6 A plan view showing the method for manufacturing the lithium secondary battery according to the first embodiment.

After the preparation of the positive electrode side composite body 1100, as shown in FIG. 5, the positive electrode active material layer 1006 is added to the positive electrode side composite body 1100 with the plane position thereof being aligned with that of the positive electrode current collector 1016. After the preparation of the negative electrode side composite body 1106, as shown in FIG. 6, the negative electrode active material layer 1010 and the electrolyte layer 1008 are sequentially added to the negative electrode side composite body 1106 with the plane positions thereof being aligned with that of the negative electrode current collector 1020.

The electrolyte layer 1008 may be added to the positive electrode side composite body 1100. In this case, the positive electrode active material layer 1006 and the electrolyte layer 1008 are sequentially added to the positive electrode side composite body 1100 with the plane positions thereof being aligned with that of the positive electrode current collector 1016. Moreover, the negative electrode active material layer 1010 is added to the negative electrode side composite body 1106 with the plane position thereof being aligned with that of the negative electrode current collector 1020.

Figure 8:
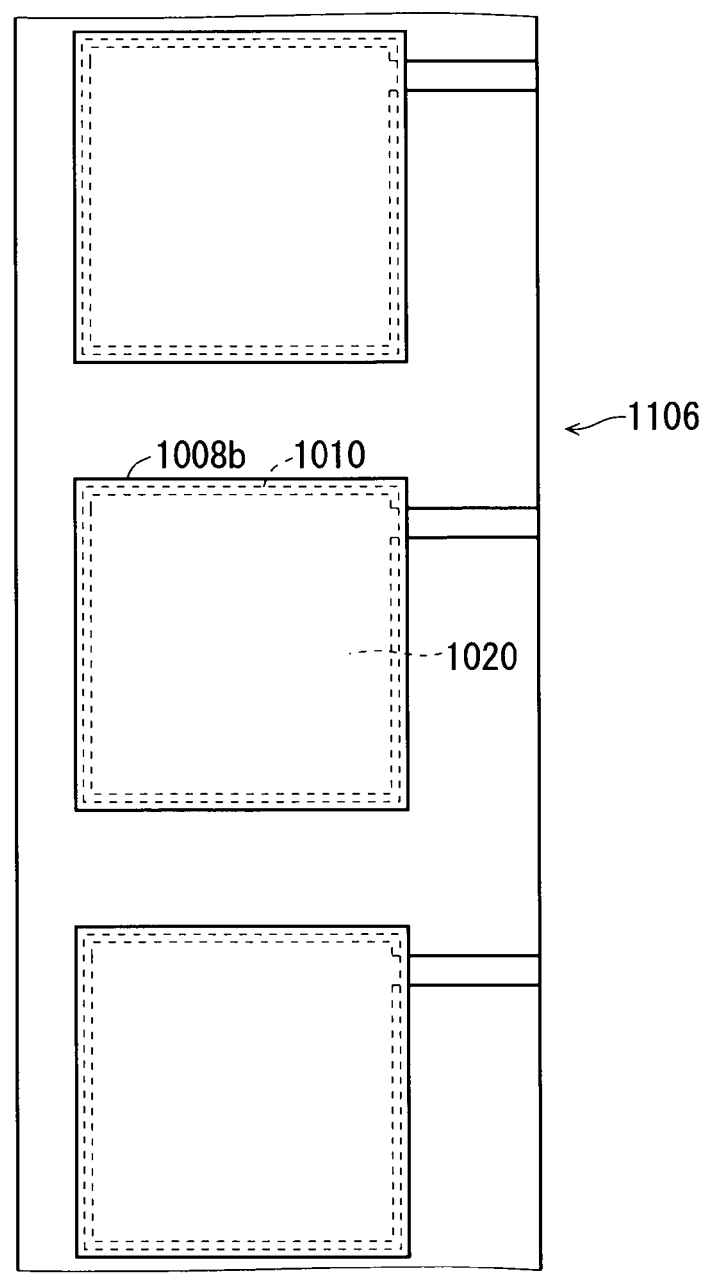
FIG. 8 A plan view showing the method for manufacturing the lithium secondary battery according to the first embodiment.

As shown in FIGS. 7 and 8, a positive electrode side electrolyte layer 1008a and a negative electrode side electrolyte layer 1008b may be added to the positive electrode side composite body 1100 and the negative electrode side composite body 1106, respectively. In this case, the positive electrode active material layer 1006 and the positive electrode side electrolyte layer 1008a are sequentially added to the positive electrode side composite body 1100 with the plane positions thereof being aligned with that of the positive electrode current collector 1016. Moreover, the negative electrode active material layer 1010 and the negative electrode side electrolyte layer 1008b are sequentially added to the negative electrode side composite body 1106 with the plane positions thereof being aligned with that of the negative electrode current collector 1020. When the positive electrode side application region 1104 and the negative electrode side application region 1110 are applied to each other, the positive electrode side electrolyte layer 1008a and the negative electrode side electrolyte layer 1008b are bonded to each other to form a single electrolyte layer 1008. Therefore, when the positive electrode side application region 1104 and the negative electrode side application region 1110 are applied to each other, the positive electrode side electrolyte layer 1008a and the negative electrode side electrolyte layer 1008b made of the same material are surely bonded to each other. As a result, an influence of occurrence of an interface that would be caused by uncertain bonding is suppressed, thus achieving uniform characteristics of the cells 1024.

(Removal of Positive Electrode Side Outer Film)

Figure 9:
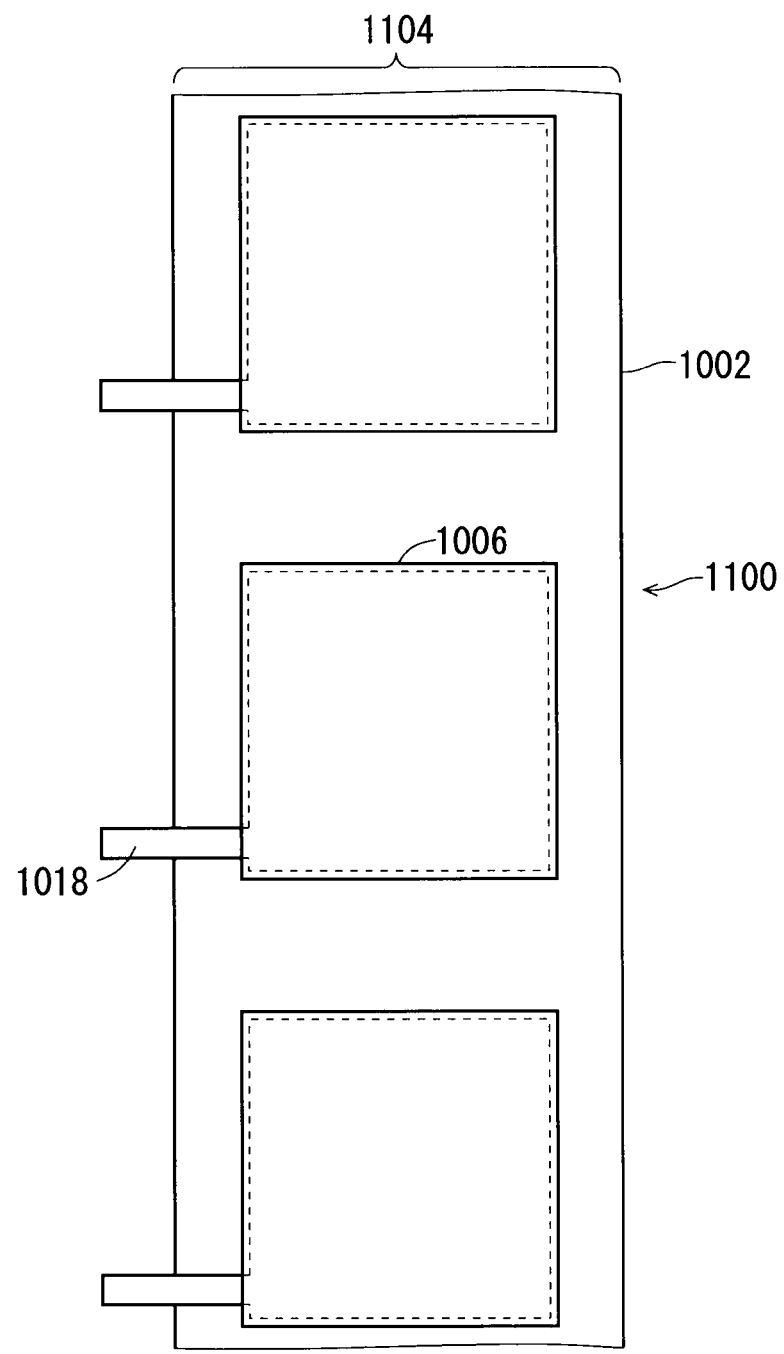
FIG. 9 A plan view showing the method for manufacturing the lithium secondary battery according to the first embodiment.

After the addition of the positive electrode active material layer 1006, as shown in FIG. 9, the positive electrode side outer film 1002 is cut. A part of the positive electrode side outer film 1002 located outside the positive electrode side application region 1104 is removed from the positive electrode side composite body 1100, while a portion where the positive electrode terminal 1018 overlaps the positive electrode side outer film 1002 is left. Although it is desirable that the positive electrode side outer film 1002 is cut after the addition of the positive electrode active material layer 1006, it may be cut before the addition of the positive electrode active material layer 1006. In a case where the positive electrode side outer film 1002 having a planar shape shown in FIG. 9 is prepared in advance, the cutting of the positive electrode side outer film 1002 is omitted.

(Removal of Negative Electrode Side Outer Film)

Figure 10:
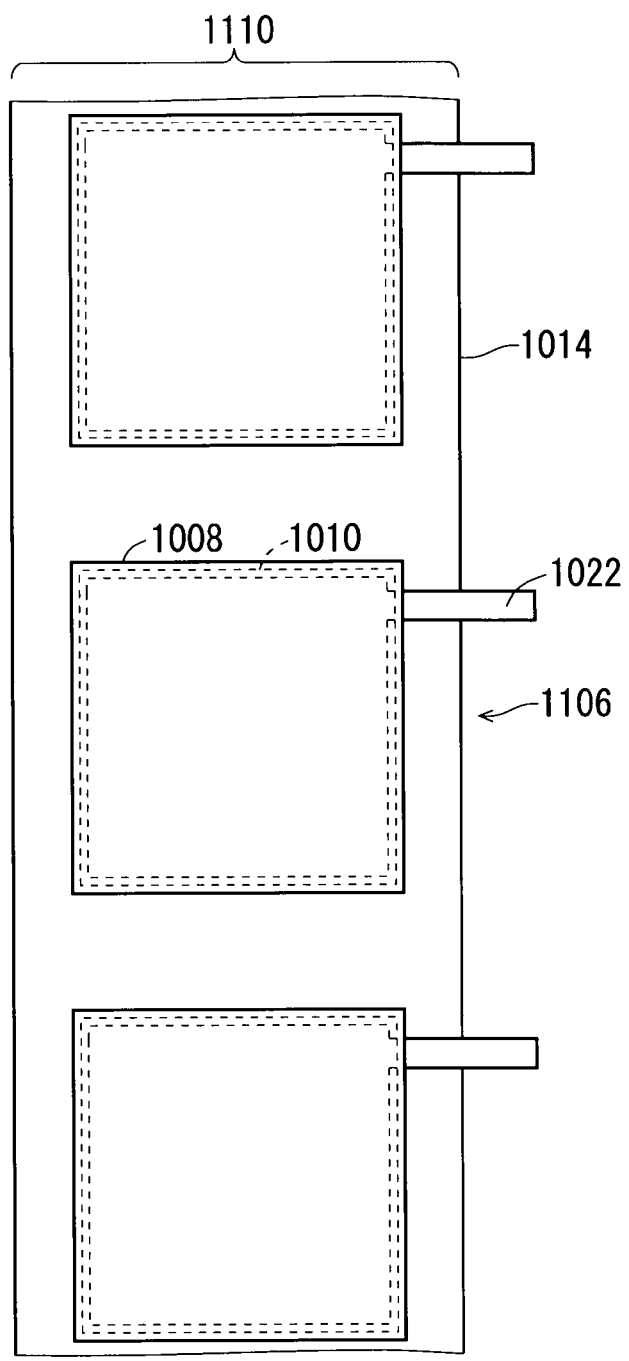
FIG. 10 A plan view showing the method for manufacturing the lithium secondary battery according to the first embodiment.

After the addition of the negative electrode active material layer 1010 and the electrolyte layer 1008, as shown in FIG. 10, the negative electrode side outer film 1014 is cut. A part of the negative electrode side outer film 1014 located outside the negative electrode side application region 1110 is removed from the negative electrode side composite body 1106, while a portion where the negative electrode terminal 1022 overlaps the negative electrode side outer film 1014 is left. Although it is desirable that the negative electrode side outer film 1014 is cut after the addition of the negative electrode active material layer 1010 and the electrolyte layer 1008, it may be cut before the addition of the negative electrode active material layer 1010 and the electrolyte layer 1008. In a case where the negative electrode side outer film 1014 having a planar shape shown in FIG. 10 is prepared in advance, the cutting of the negative electrode side outer film 1014 is omitted.

(Application of Positive Electrode Side Application Region to Negative Electrode Side Application Region)

Figure 11:
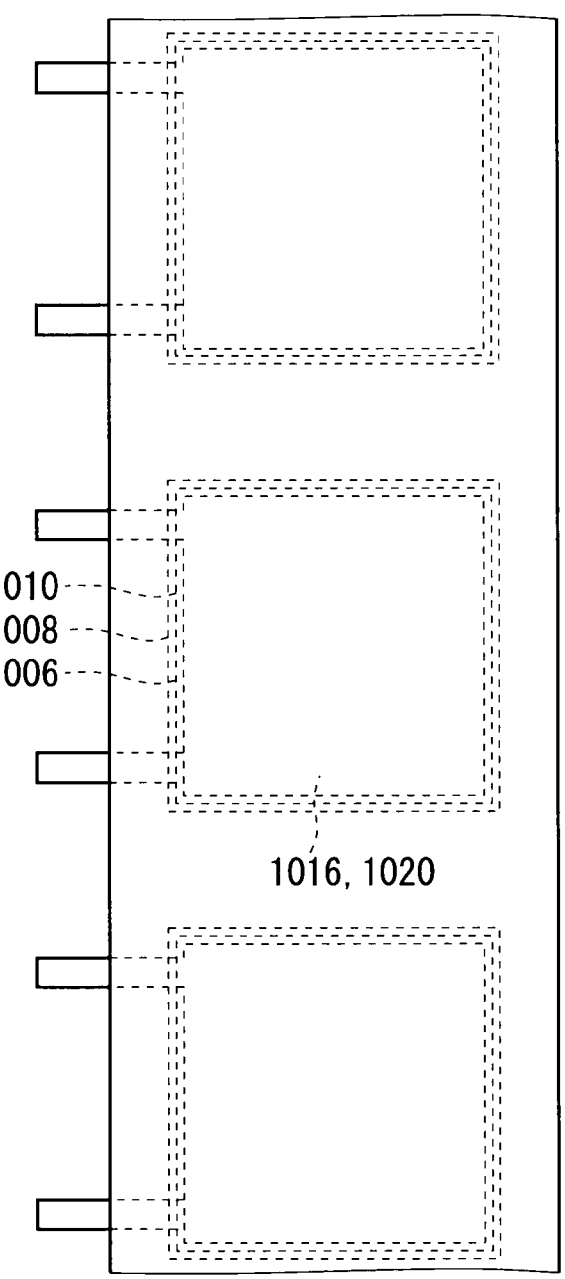
FIG. 11 A plan view showing the method for manufacturing the lithium secondary battery according to the first embodiment.

After the positive electrode active material layer 1006, the electrolyte layer 1008, and the negative electrode active material layer 1010 are added to the positive electrode side composite body 1100 or the negative electrode side composite body 1106, and unnecessary parts of the positive electrode side outer film 1002 and the negative electrode side outer film 1014 are removed, as shown in FIG. 11, the positive electrode side bonding surface 1102 and the negative electrode side bonding surface 1108 are placed face to face with each other. Then, the positive electrode side application region 1104 and the negative electrode side application region 1110 are applied to each other. At this time, the plane positions of the positive electrode current collector 1016, the positive electrode active material layer 1006, the electrolyte layer 1008, the negative electrode active material layer 1010, and the negative electrode current collector 1020 are aligned with one another.

The application is performed by surface-pressing or roll-pressing (line-pressing). The pressing may be performed at a normal temperature, or may be performed with heating.

(Bonding)

Figure 12:
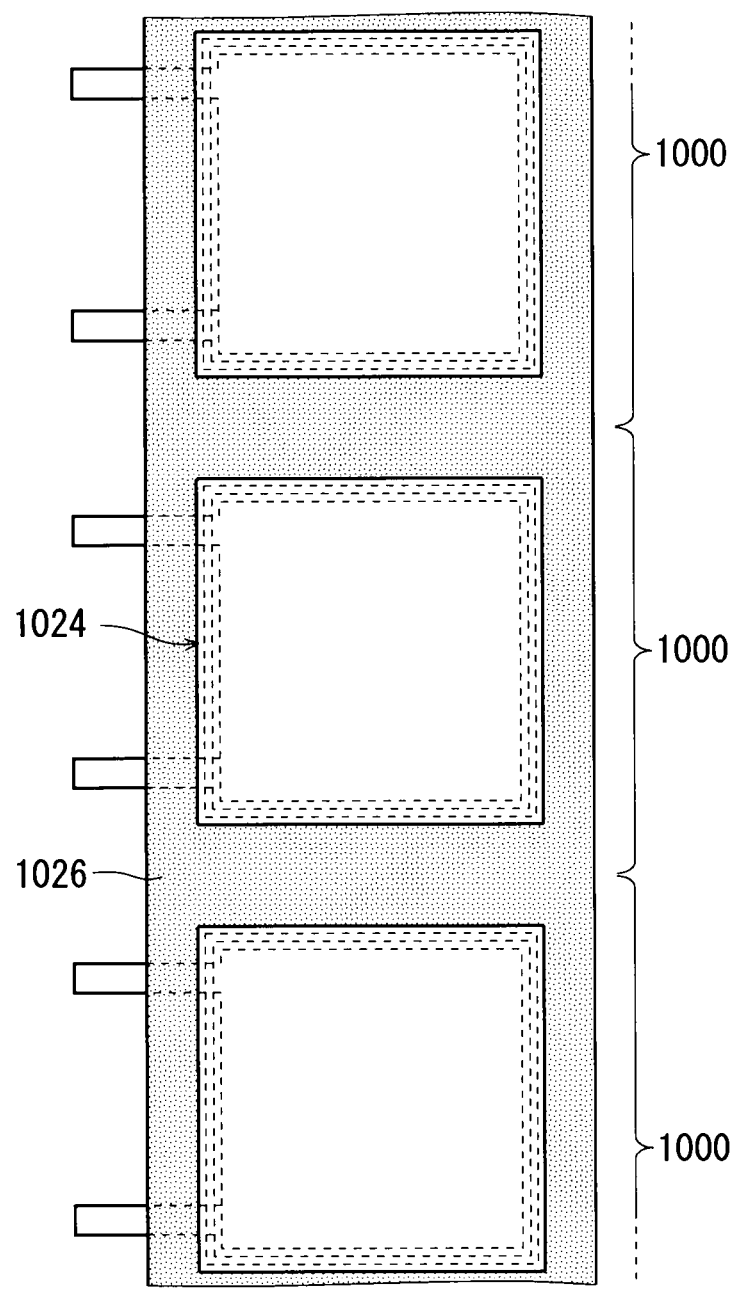
FIG. 12 A plan view showing the method for manufacturing the lithium secondary battery according to the first embodiment.

After the application of the positive electrode side application region 1104 to the negative electrode side application region 1110, as shown in FIG. 12, the positive electrode side outer film 1002 and the negative electrode side outer film 1014 are bonded to each other in the bonding region 1026 that extends from an edge of each lithium secondary battery 1000 to the vicinity of an edge of the electrolyte layer 1008. Thus, the cell 1024 is sealed. The bonding region 1026 may be reduced to the extent that does not cause insufficient sealing of the cell 1024. For example, the bonding region 1026 may be formed only near the edge of each lithium secondary battery 1000.

The positive electrode side outer film 1002 and the negative electrode side outer film 1014 may be bonded to each other by welding, or may be bonded to each other with interposition of a bonding medium.

In a case where the positive electrode side outer film 1002 and the negative electrode side outer film 1014 are bonded to each other by welding, for example, the positive electrode side bonding surface 1102 of the positive electrode side outer film 1002 at the side where a welding layer is formed may be welded to the negative electrode side bonding surface 1108 of the negative electrode side outer film 1014 at the side where a welding layer is formed by hot-welding (hot-pressing), laser-welding, or the like. Alternatively, a plasma-treated positive electrode side bonding surface 1102 of the positive electrode side outer film 1002 may be hot-welded (hot-pressed) to a plasma-treated negative electrode side bonding surface 1108 of the negative electrode side outer film 1014.

In a case where the positive electrode side outer film 1002 and the negative electrode side outer film 1014 are bonded to each other with interposition of a bonding medium, for example, before the application of the positive electrode side application region 1104 to the negative electrode side application region 1110, an adhesive is applied to both or one of the positive electrode side bonding surface 1102 of the positive electrode side outer film 1002 and the negative electrode side bonding surface 1108 of the negative electrode side outer film 1014. Then, after the application of the positive electrode side application region 1104 to the negative electrode side application region 1110, pressing, hot-pressing, laser beam radiation, or the like, is performed to cure the adhesive.

In a case where the planar shape of the application region of the lithium secondary battery 1000 is quadrangular, the bonding region 1026 extends along the four sides of this quadrangular shape. Although it is desirable that portions extending along the four sides are simultaneously bonded, they may be separately bonded. It may be acceptable that portions extending along three sides are bonded, then the cell 1024 is vacuum-dried, and then, after the cell 1024 is vacuum-dried, a portion extending along the remaining one side is bonded.

In a case where the positive electrode side bonding surface 1102 and the negative electrode side bonding surface 1108 are hot-welded (heat-sealed) to each other, it is desirable to perform the heat-sealing under vacuum. In a case where the positive electrode side bonding surface 1102 of the positive electrode side outer film 1002 at the side where the welding layer is formed is heat-sealed to the negative electrode side bonding surface 1108 of the negative electrode side outer film 1014 at the side where the welding layer is formed, heat-sealing conditions such as the temperature, the pressure, and the like, are determined in accordance with the material, the thickness, and the like, of the welding layer, in such a manner that wrinkle, entry of air, and the like, cannot occur. In a case where the plasma-treated positive electrode side bonding surface 1102 of the positive electrode side outer film 1002 is heat-sealed to the plasma-treated negative electrode side bonding surface 1108 of the negative electrode side outer film 1014, the heat-sealing conditions such as the temperature, the pressure, and the like, are determined in accordance with the material of the positive electrode side outer film 1002, the material of the negative electrode side outer film 1014, plasma-treatment conditions, and the like, in such a manner that wrinkle, entry of air, and the like, cannot occur.

(Separation of Lithium Secondary Battery)

After the positive electrode side outer film 1002 and the negative electrode side outer film 1014 are bonded to each other, the continuous lithium secondary batteries 1000 are separated from one another. Thus, the lithium secondary battery 1000 shown in FIGS. 1 and 2 is completed. In a case of using the continuous lithium secondary batteries 1000, the separation of the lithium secondary batteries 1000 is omitted.

(Advantages)

In the first embodiment, the positive electrode side conductive material layer 1004 overlaps the positive electrode side outer film 1002, and the negative electrode side conductive material layer 1012 overlaps the negative electrode side outer film 1014. Even though the positive electrode current collector 1016, the positive electrode terminal 1018, the negative electrode current collector 1020, and the negative electrode terminal 1022 have a reduced thickness, they are not easily damaged. This can reduce the thickness and weight of each of the positive electrode side conductive material layer 1004 and the negative electrode side conductive material layer 1012, thus reducing the size and weight of the lithium secondary battery 1000. As a result, the volume energy density and the weight energy density of the lithium secondary battery 1000 are improved.

Second Embodiment

A second embodiment relates to a lithium secondary battery having two or more cells connected in series, and to a manufacturing method thereof.

(Structure of Lithium Secondary Battery)

Figure 13:
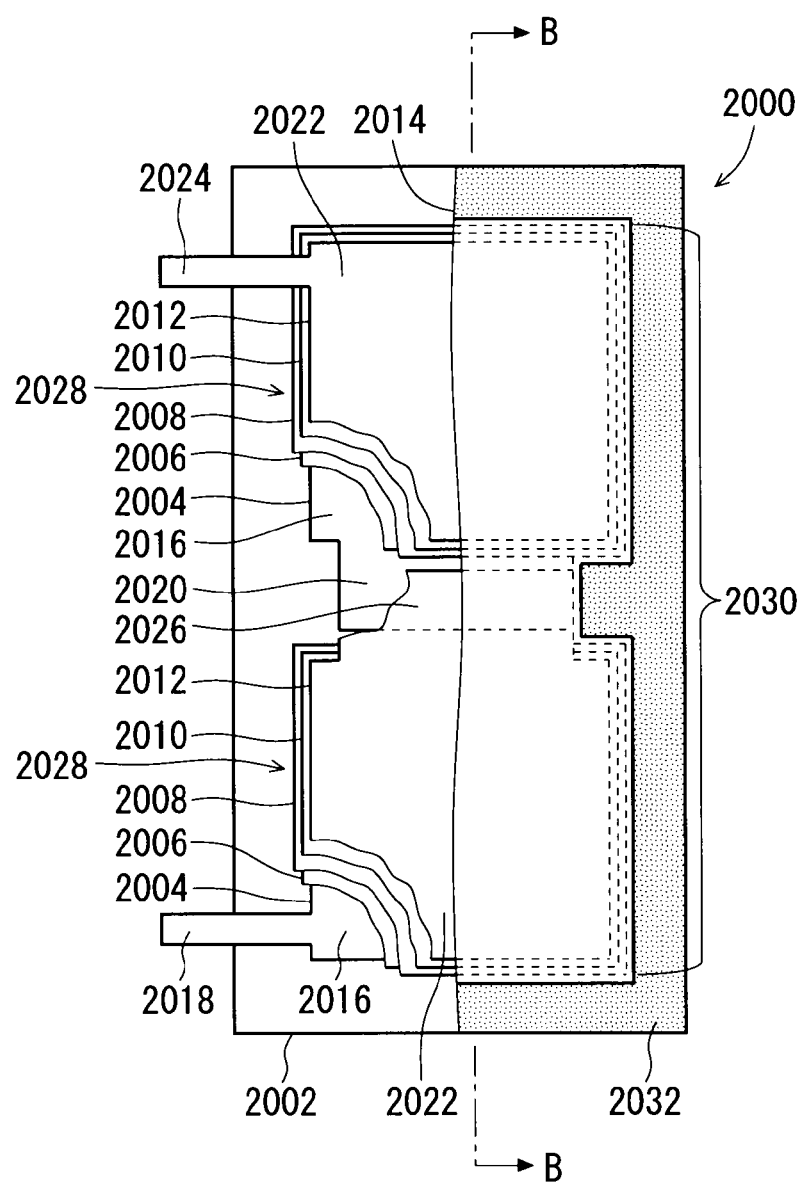
FIG. 13 A plan view of a lithium secondary battery according to a second embodiment.
Figure 14:
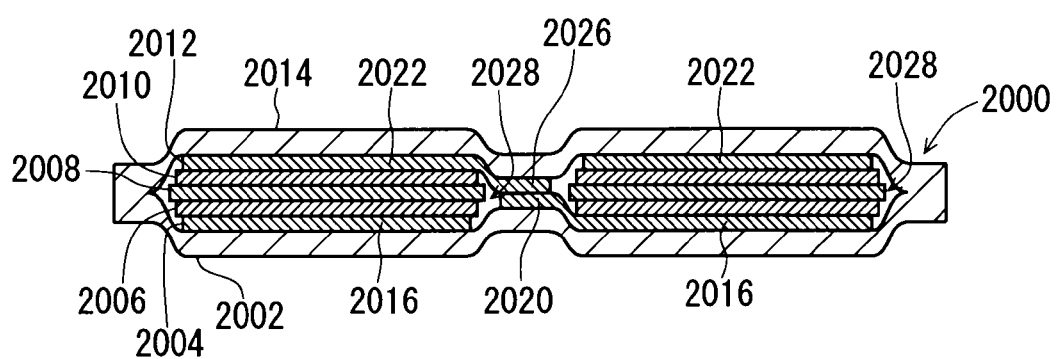
FIG. 14 A cross-sectional view of the lithium secondary battery according to the second embodiment.

FIGS. 13 and 14 are diagrams schematically showing the lithium secondary battery according to the second embodiment. FIG. 13 is a plan view, and FIG. 14 is a cross-sectional view as taken along the line B-B of FIG. 13. FIGS. 13 and 14 illustrate a case where two cells are connected in series. In FIG. 13, parts of upper component materials defined by cutaway lines are removed, in order to show component materials located under the upper component materials.

As shown in FIGS. 13 and 14, a lithium secondary battery 2000 includes a positive electrode side outer film 2002, a positive electrode side conductive material layer 2004, a positive electrode active material layer 2006, an electrolyte layer 2008, a negative electrode active material layer 2010, a negative electrode side conductive material layer 2012, and a negative electrode side outer film 2014. The positive electrode side conductive material layer 2004 has a positive electrode current collector 2016, a positive electrode terminal 2018, and a positive electrode side series wiring 2020. The negative electrode side conductive material layer 2012 has a negative electrode current collector 2022, a negative electrode terminal 2024, and a negative electrode side series wiring 2026.

It is desirable that each of the positive electrode side conductive material layer 2004 and the negative electrode side conductive material layer 2012 is a continuous layer. That is, the positive electrode current collector 2016, the positive electrode terminal 2018, and the positive electrode side series wiring 2020 do not overlap one another, and no interface exists at a connection portion thereamong. The negative electrode current collector 2022, the negative electrode terminal 2024, and the negative electrode side series wiring 2026 do not overlap each other, and no interface exists at a connection portion thereamong.

The positive electrode current collector 2016, the positive electrode active material layer 2006, the electrolyte layer 2008, the negative electrode active material layer 2010, and the negative electrode current collector 2022 are provided with respect to each cell 2028, and stacked in the same plane position, to form the cell 2028. The positive electrode side series wiring 2020 and the negative electrode side series wiring 2026 are electrically connected to each other, and connect the cells 2028 in series to thereby form a series cell group 2030.

The positive electrode side outer film 2002 and the negative electrode side outer film 2014 are bonded to each other in a bonding region 2032 that surrounds the series cell group 2030. The series cell group 2030 is sealed with the positive electrode side outer film 2002 and the negative electrode side outer film 2014.

One end of the positive electrode terminal 2018 is electrically connected to the positive electrode current collector 2016 of the cell 2028 located at the most positive electrode side in the series-connected body 2030, and one end of the negative electrode terminal 2024 is electrically connected to the negative electrode current collector 2022 of the cell 2028 located at the most negative electrode side in the series-connected body 2030. The other end of the positive electrode terminal 2018 and the other end of the negative electrode terminal 2024 are exposed to the outside of the lithium secondary battery 2000. The series cell group 2030 is charged and discharged through the positive electrode terminal 2018 and the negative electrode terminal 2024

The positive electrode side series wiring 2020 is electrically connected to the positive electrode current collector 2016 of the second cell 2028, and the negative electrode side series wiring 2026 is electrically connected to the negative electrode current collector 2022 of the first cell 2028.

(Manufacture of Lithium Secondary Battery)

FIGS. 15 to 18 are diagrams showing a flow of manufacture of the lithium secondary battery according to the second embodiment. FIGS. 15 to 18 are plan views.

(Preparation of Positive Electrode Side Composite Body)

Figure 15:
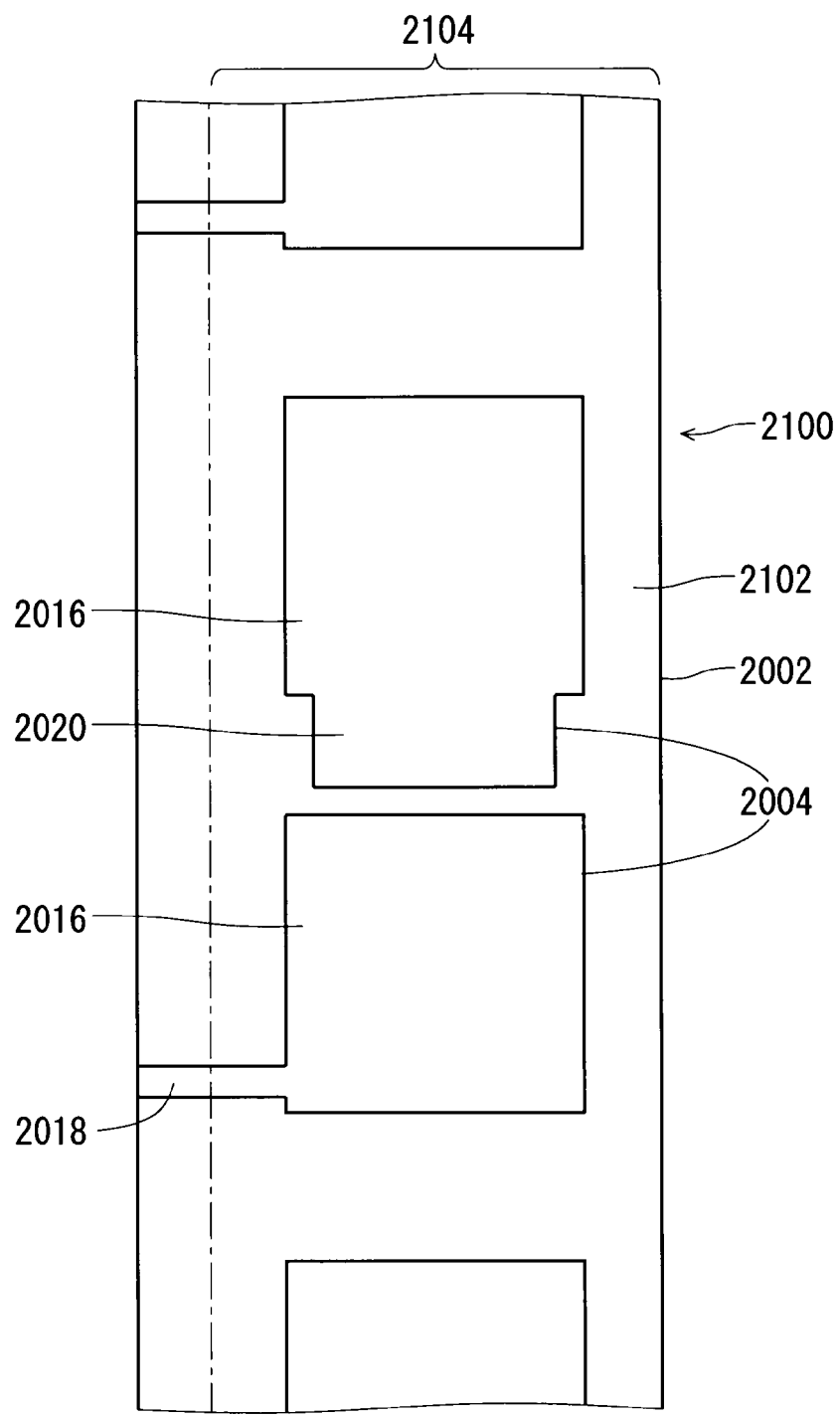
FIG. 15 A plan view showing a method for manufacturing the lithium secondary battery according to the second embodiment.

In the manufacture of the lithium secondary battery 2000, as shown in FIG. 15, the whole of the positive electrode side conductive material layer 2004 is formed on a positive electrode side bonding surface 2102 of the positive electrode side outer film 2002 to prepare a positive electrode side composite body 2100 in which the positive electrode side outer film 2002 is integrated with the positive electrode side conductive material layer 2004. The whole of the positive electrode side conductive material layer 2004 is supported on the positive electrode side outer film 2002. As a result, the positive electrode side conductive material layer 2004 is not easily damaged, even if the thickness thereof is small.

The positive electrode current collector 2016 and the positive electrode side series wiring 2020 are located within a positive electrode side application region 2104. At least a part of the positive electrode terminal 2018 is located outside the positive electrode side application region 2104. As a result, when the cell 2028 is sealed, the positive electrode terminal 2018 is exposed to the outside of the lithium secondary battery 2000.

(Preparation of Negative Electrode Side Composite Body)

Figure 16:
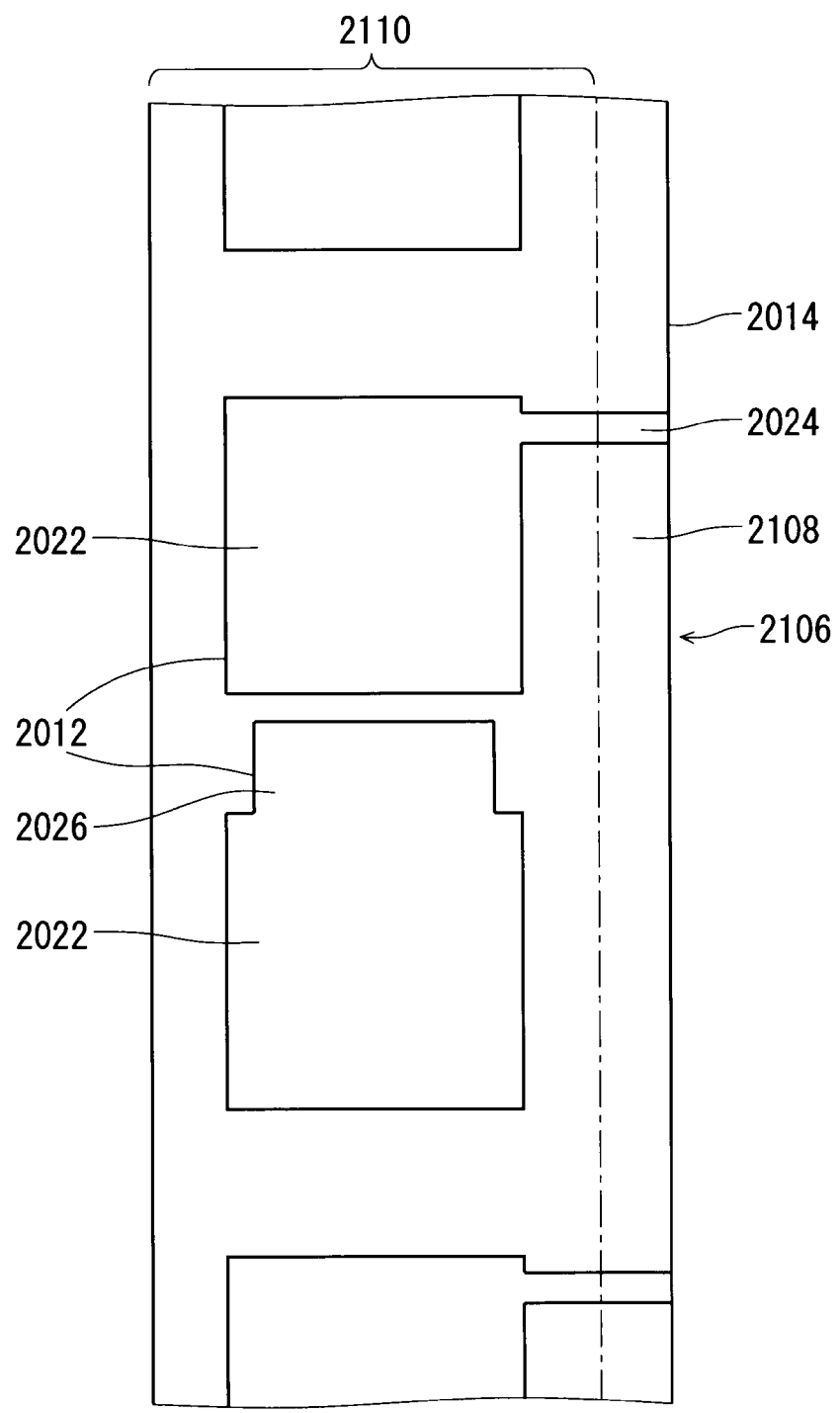
FIG. 16 A plan view showing the method for manufacturing the lithium secondary battery according to the second embodiment.

Separately from the preparation of the positive electrode side composite body 2100, as shown in FIG. 16, the whole of the negative electrode side conductive material layer 2012 is formed on a negative electrode side bonding surface 2108 of the negative electrode side outer film 2014 to prepare a negative electrode side composite body 2106 in which the negative electrode side conductive material layer 2012 is integrated with the negative electrode side outer film 2014. The whole of the negative electrode side conductive material layer 2012 is supported on the negative electrode side outer film 2014. As a result, the negative electrode side conductive material layer 2012 is not easily damaged, even if the thickness thereof is small.

The negative electrode current collector 2022 and the negative electrode side series wiring 2026 are located within a negative electrode side application region 2110. At least a part of the negative electrode terminal 2024 is located outside the negative electrode side application region 2110. As a result, when the cell 2028 is sealed, the negative electrode terminal 2024 is exposed to the outside of the lithium secondary battery 2000.

(Positional Relationship)

The positive electrode side application region 2104 and the negative electrode side application region 2110 are applied to each other in a subsequent step.

The plane positions of the positive electrode terminal 2018 and the negative electrode terminal 2024 are determined in such a manner that the positive electrode terminal 2018 and the negative electrode terminal 2024 cannot overlap each other at a time of aligning the plane positions of the positive electrode current collector 2016 and the negative electrode current collector 2022 during the application.

The plane positions of the positive electrode side series wiring 2020 and the negative electrode side series wiring 2026 are determined in such a manner that the positive electrode side series wiring 2020 and the negative electrode side series wiring 2026 can overlap each other at the time of aligning the plane positions of the positive electrode current collector 2016 and the negative electrode current collector 2022 during the application. Thus, the positive electrode side series wiring 2020 and the negative electrode side series wiring 2026 are electrically connected to each other.

(Configuration of Positive Electrode Side Outer Film and Negative Electrode Side Outer Film)

As shown in FIGS. 15 and 16, the positive electrode side outer film 2002 and the negative electrode side outer film 2014 are webs having constant widths. In the positive electrode side outer film 2002 and the negative electrode side outer film 2014 that are traveling in a direction of extension, the positive electrode side conductive material layer 2004 and the negative electrode side conductive material layer 2012 are repeatedly formed, respectively. Thereby, many positive electrode side conductive material layers 2004 and many negative electrode side conductive material layers 2012 are formed at a high speed, while being arranged in the traveling direction of the positive electrode side outer film 2002 and the negative electrode side outer film 2014. Thus, a roll-to-roll process is applicable, so that the productivity of the lithium secondary battery 2000 is improved. However, it may be also possible that the positive electrode side conductive material layer 2004 and the negative electrode side conductive material layer 2012 are formed respectively on a positive electrode side outer film and a negative electrode side outer film that have been prepared as separate sheets corresponding to each lithium secondary battery 2000.

(Completion of Lithium Secondary Battery)

Figure 17:
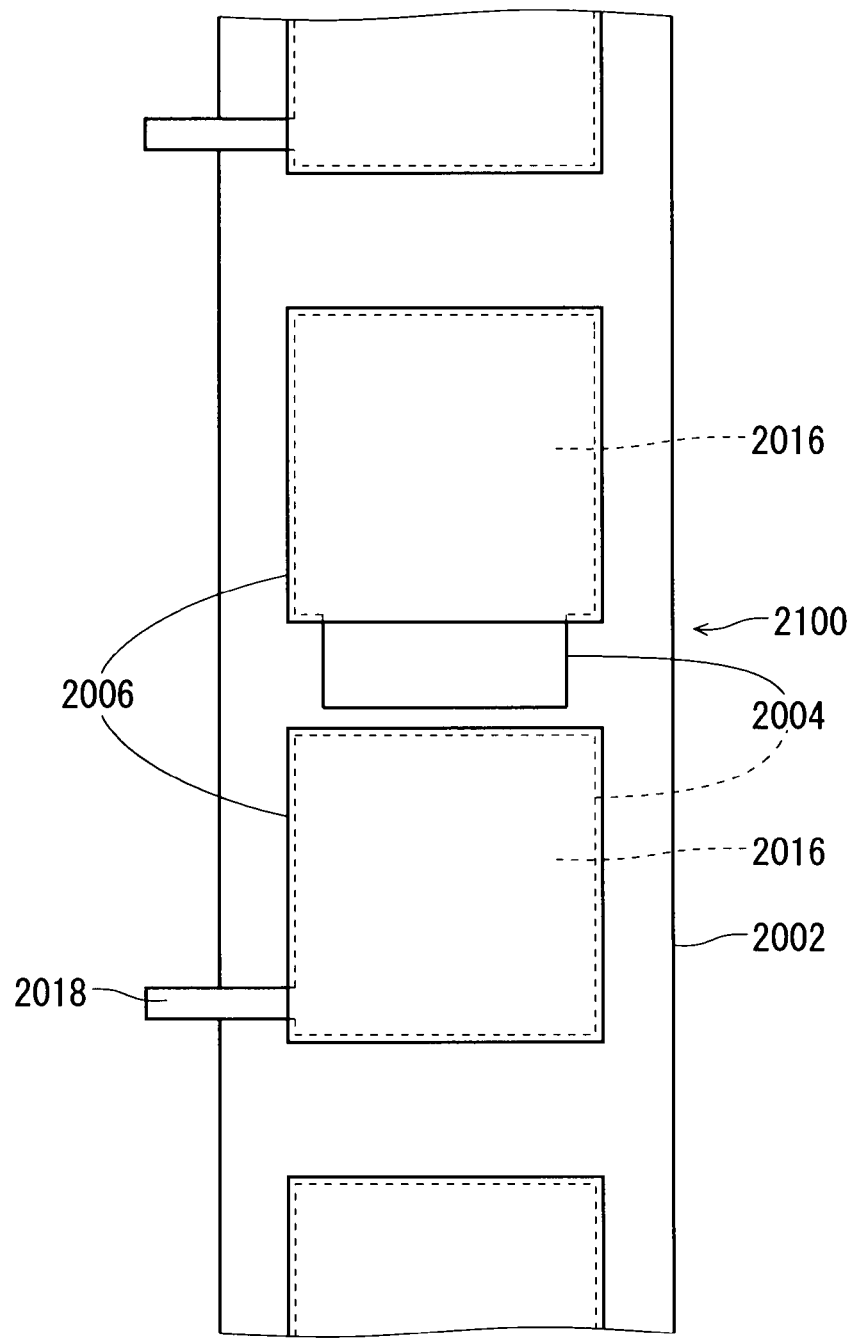
FIG. 17 A plan view showing the method for manufacturing the lithium secondary battery according to the second embodiment.
Figure 18:
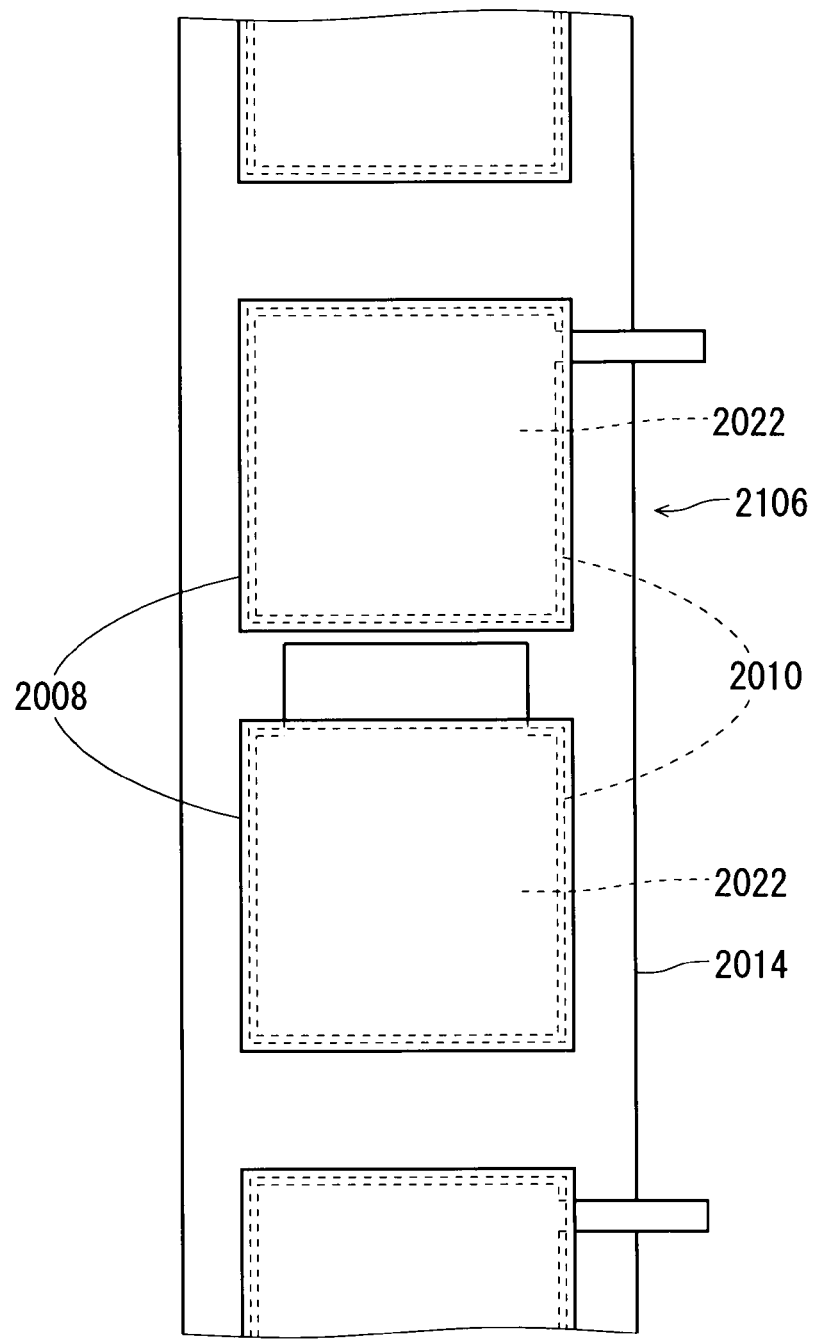
FIG. 18 A plan view showing the method for manufacturing the lithium secondary battery according to the second embodiment.

After the preparation of the positive electrode side composite body 2100 and the negative electrode side composite body 2106, similarly to the first embodiment, the positive electrode active material layer 2006 is added to the positive electrode side composite body 2100 with the plane position thereof being aligned with that of the positive electrode current collector 2016, and the negative electrode active material layer 2010 and the electrolyte layer 2008 are added to the negative electrode side composite body 2106 with the plane positions thereof being aligned with that of the negative electrode current collector 2022. Here, a positive electrode side electrolyte layer and a negative electrode side electrolyte layer may be added to the positive electrode side composite body 2100 and the negative electrode side composite body 2106, respectively. Moreover, a part of the positive electrode side outer film 2002 located outside the positive electrode side application region 2104 is removed from the positive electrode side composite body 2100, while a portion where the positive electrode terminal 2018 overlaps the positive electrode side outer film 2002 is left. A part of the negative electrode side outer film 2014 located outside the negative electrode side application region 2110 is removed from the negative electrode side composite body 2106, while a portion where the negative electrode terminal 2024 overlaps the negative electrode side outer film 2014 is left. Furthermore, the positive electrode side bonding surface 2102 and the negative electrode side bonding surface 2108 are placed face to face with each other. Then, the positive electrode side application region 2104 and the negative electrode side application region 2110 are applied to each other. At this time, the plane positions of the positive electrode current collector 2016, the positive electrode active material layer 2006, the electrolyte layer 2008, the negative electrode active material layer 2010, and the negative electrode current collector 2022 of each cell 2028 are aligned with one another. FIGS. 17 and 18 are diagrams schematically showing the positive electrode side composite body 2100 and the negative electrode side composite body 2106, respectively, immediately before the application is performed. FIGS. 17 and 18 are plan views.

Subsequently, the positive electrode side outer film 2002 and the negative electrode side outer film 2014 are bonded to each other in the bonding region 2032 that extends from an edge of each lithium secondary battery 2000 to the vicinity of an edge of the electrolyte layer 2008 and the like. Then, the continuous lithium secondary batteries 2000 are separated from one another, as needed. Thus, the lithium secondary battery 2000 shown in FIGS. 13 and 14 is completed.

(Improvement of In-Plane Uniformity of Electrical Connection)

Figure 19:
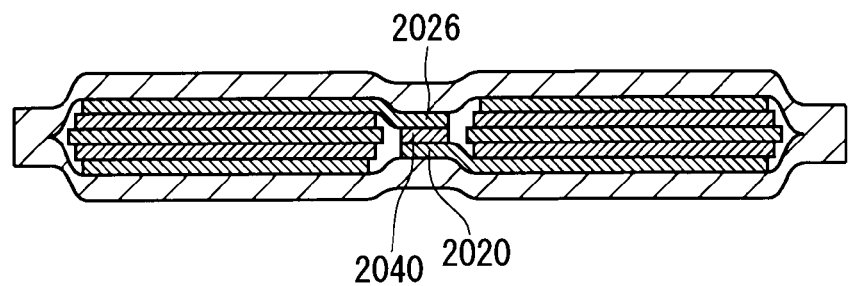
FIG. 19 A cross-sectional view of the lithium secondary battery according to the second embodiment.

In order to improve the in-plane uniformity of the electrical connection between the positive electrode side series wiring 2020 and the negative electrode side series wiring 2026, as shown in FIG. 19, the positive electrode side series wiring 2020 and the negative electrode side series wiring 2026 may be in contact with interposition of a conductive bonding medium 2040, instead of the direct contact between the positive electrode side series wiring 2020 and the negative electrode side series wiring 2026 as shown in FIG. 14. The conductive bonding medium 2040 is a cured conductive adhesive, a double-coated conductive adhesive sheet, and the like.

In a case where the conductive bonding medium 2040 is a cured conductive adhesive, before the application of the positive electrode side application region 2104 to the negative electrode side application region 2110, a conductive adhesive is applied to both or one of the positive electrode side series wiring 2020 and the negative electrode side series wiring 2026. Then, after the application of the positive electrode side application region 2104 to the negative electrode side application region 2110, the conductive adhesive is cured.

In a case where the conductive bonding medium 2040 is a double-coated conductive adhesive sheet or the like, before the application of the positive electrode side application region 2104 to the negative electrode side application region 2110, a double-coated conductive adhesive sheet is attached to the positive electrode side series wiring 2020 or the negative electrode side series wiring 2026.

In general, the conductive bonding medium is provided between a wiring of the positive electrode side composite body and a wiring of the negative electrode side composite body that are electrically connected to each other, and contributes to improvement of the in-plane uniformity of the electrical connection between the wiring of the positive electrode side composite body and the wiring of the negative electrode side composite body. That is, the conductive bonding medium is sometimes provided in a portion other than the portion between the positive electrode side series wiring 2020 and the negative electrode side series wiring 2026.

(Advantages)

In the second embodiment, the positive electrode side conductive material layer 2004 overlaps the positive electrode side outer film 2002, and the negative electrode side conductive material layer 2012 overlaps the negative electrode side outer film 2014. Even though the positive electrode current collector 2016, the positive electrode terminal 2018, the positive electrode side series wiring 2020, the negative electrode current collector 2022, the negative electrode terminal 2024, and the negative electrode side series wiring 2026 have a reduced thickness, they are not easily damaged. This can reduce the thickness and weight of each of the positive electrode side conductive material layer 2004 and the negative electrode side conductive material layer 2012, thus reducing the size and weight of the lithium secondary battery 2000. As a result, the volume energy density and the weight energy density of the lithium secondary battery 2000 are improved. Additionally, two or more cells 2028 are connected in series without hindering the downsizing and weight reduction of the lithium secondary battery 2000. This advantage is unique to the horizontal-type lithium secondary battery 2000 in which the cells 2028 are arranged in a plane.

Third Embodiment

A third embodiment relates to a lithium secondary battery having two or more cells connected in parallel, and to a manufacturing method thereof.

(Structure of Lithium Secondary Battery)

Figure 20:
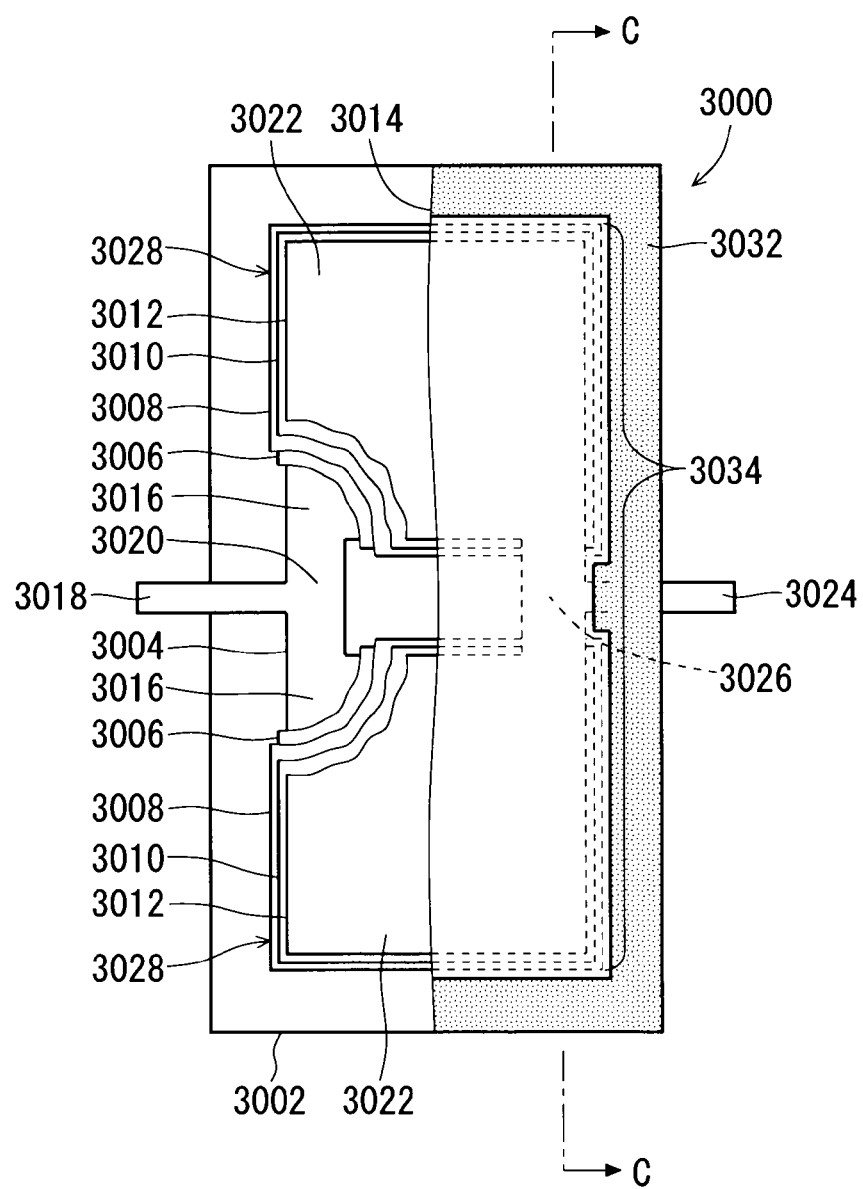
FIG. 20 A plan view of a lithium secondary battery according to a third embodiment.
Figure 21:
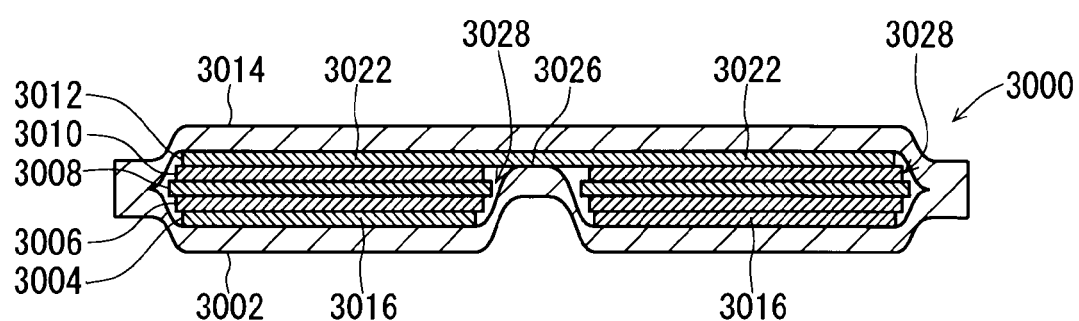
FIG. 21 A cross-sectional view of the lithium secondary battery according to the third embodiment.

FIGS. 20 and 21 are diagrams schematically showing the lithium secondary battery according to the third embodiment. FIG. 20 is a plan view, and FIG. 21 is a cross-sectional view as taken along the line C-C of FIG. 20. FIGS. 20 and 21 illustrate a case where two cells are connected in parallel. In FIG. 20, parts of upper component materials defined by cut-away lines are removed, in order to show component materials located under the upper component materials.

As shown in FIGS. 20 and 21, a lithium secondary battery 3000 includes a positive electrode side outer film 3002, a positive electrode side conductive material layer 3004, a positive electrode active material layer 3006, an electrolyte layer 3008, a negative electrode active material layer 3010, a negative electrode side conductive material layer 3012, and a negative electrode side outer film 3014. The positive electrode side conductive material layer 3004 has a positive electrode current collector 3016, a positive electrode terminal 3018, and a positive electrode side parallel wiring 3020. The negative electrode side conductive material layer 3012 has a negative electrode current collector 3022, a negative electrode terminal 3024, and a negative electrode side parallel wiring 3026.

It is desirable that each of the positive electrode side conductive material layer 3004 and the negative electrode side conductive material layer 3012 is a continuous layer. That is, the positive electrode current collector 3016, the positive electrode terminal 3018, and the positive electrode side parallel wiring 3020 do not overlap one another, and no interface exists at a connection portion thereamong. The negative electrode current collector 3022, the negative electrode terminal 3024, and the negative electrode side parallel wiring 3026 do not overlap each other, and no interface exists at a connection portion thereamong.

The positive electrode current collector 3016, the positive electrode active material layer 3006, the electrolyte layer 3008, the negative electrode active material layer 3010, and the negative electrode current collector 3022 are provided with respect to each cell 3028, and stacked in the same plane position, to form the cell 3028. The positive electrode side parallel wiring 3020 and the negative electrode side parallel wiring 3026 connect the cells 3028 in parallel to there form a parallel cell group 3034.

The positive electrode side outer film 3002 and the negative electrode side outer film 3014 are bonded to each other in a heat sheet region 3032 that surrounds the parallel cell group 3034. The parallel cell group 3034 is sealed with the positive electrode side outer film 3002 and the negative electrode side outer film 3014.

One end of the positive electrode terminal 3018 and one end of the negative electrode terminal 3024 are electrically connected respectively to the positive electrode current collectors 3016 and the negative electrode current collectors 3022 of all the cells 3028 in the parallel-connected body 3024. The other end of the positive electrode terminal 3018 and the other end of the negative electrode terminal 3024 are exposed to the outside of the lithium secondary battery 3000. The parallel cell group 3028 is charged and discharged through the positive electrode terminal 3018 and the negative electrode terminal 3024. The positive electrode terminal 3018 and the negative electrode terminal 3024 are connected to the positive electrode current collector 3016 and the negative electrode current collector 3022 through the positive electrode side parallel wiring 3020 and the negative electrode side parallel wiring 3026, respectively, but instead, may be connected directly to the positive electrode current collector 3016 and the negative electrode current collector 3022, respectively.

The positive electrode side parallel wiring 3022 is electrically connected to the positive electrode current collectors 3016 of all the cells 3028 in the parallel cell group 3034. The negative electrode side parallel wiring 3026 is electrically connected to the negative electrode current collectors 3022 of all the cells 3028 in the parallel cell group 3034.

(Manufacture of Lithium Secondary Battery)

FIGS. 22 to 25 are diagrams showing a flow of manufacture of the lithium secondary battery according to the third embodiment. FIGS. 22 to 25 are plan views.

(Preparation of Positive Electrode Side Composite Body)

Figure 22:
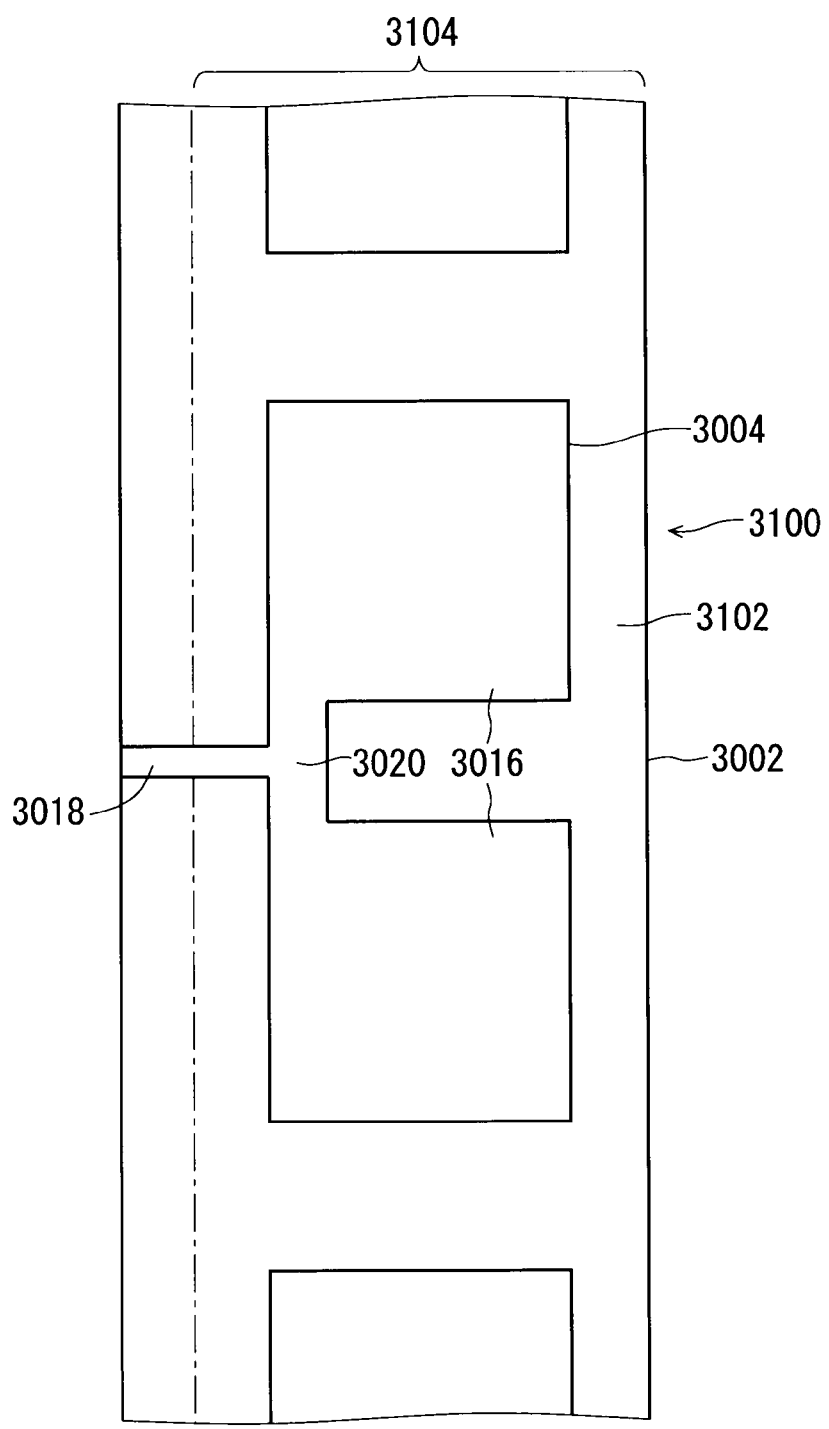
FIG. 22 A plan view showing a method for manufacturing the lithium secondary battery according to the third embodiment.

In the manufacture of the lithium secondary battery 3000, as shown in FIG. 22, the whole of the positive electrode side conductive material layer 3004 is formed on a positive electrode side bonding surface 3102 of the positive electrode side outer film 3002 to prepare a positive electrode side composite body 3100 in which the positive electrode side conductive material layer 3004 is integrated with the positive electrode side outer film 3002. The whole of the positive electrode side conductive material layer 3004 is supported on the positive electrode side outer film 3002. As a result, the positive electrode side conductive material layer 3004 is not easily damaged, even if the thickness thereof is small.

The positive electrode current collector 3016 and the positive electrode side parallel wiring 3020 are located within a positive electrode side application region 3104. At least a part of the positive electrode terminal 3018 is located outside the positive electrode side application region 3104. As a result, when the cell 3028 is sealed, the positive electrode terminal 3018 is exposed to the outside of the lithium secondary battery 3000.

(Preparation of Negative Electrode Side Composite Body)

Figure 23:
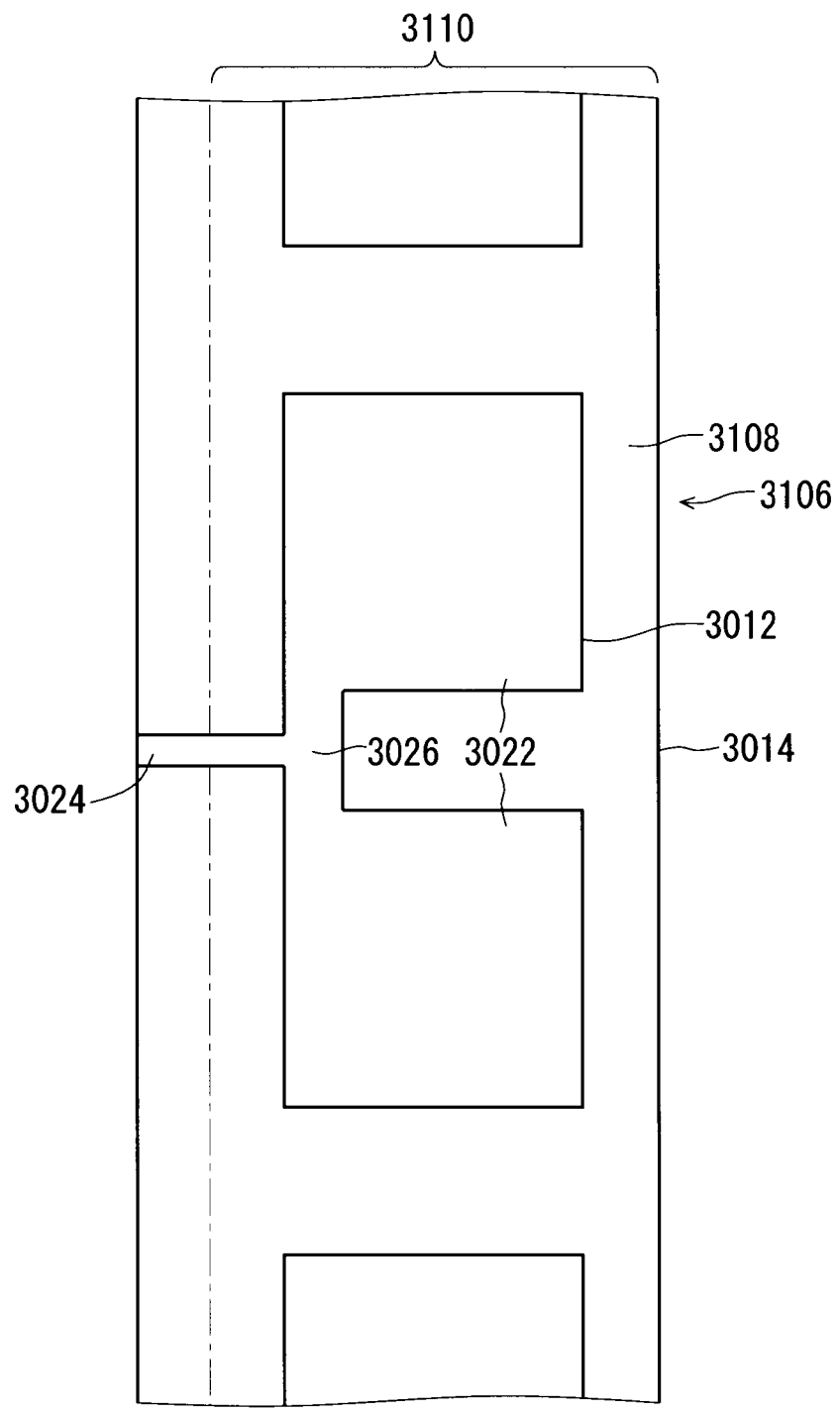
FIG. 23 A plan view showing the method for manufacturing the lithium secondary battery according to the third embodiment.

Separately from the preparation of the positive electrode side composite body 3100, as shown in FIG. 23, the whole of the negative electrode side conductive material layer 3012 is formed on a negative electrode side bonding surface 3108 of the negative electrode side outer film 3014 to prepare a negative electrode side composite body 3106 in which the negative electrode side conductive material layer 3012 is integrated with the negative electrode side outer film 3014. The whole of the negative electrode side conductive material layer 3012 is supported on the negative electrode side outer film 3014. As a result, the negative electrode side conductive material layer 3012 is not easily damaged, even if the thickness thereof is small.

The negative electrode current collector 3022 and the negative electrode side parallel wiring 3026 are located within a negative electrode side application region 3110. At least a part of the negative electrode terminal 3024 is located outside the negative electrode side application region 3110. As a result, when the cell 3028 is sealed, the negative electrode terminal 3024 is exposed to the outside of the lithium secondary battery 3000.

(Positional Relationship)

The positive electrode side application region 3104 and the negative electrode side application region 3110 are applied to each other in a subsequent step.

The plane positions of the positive electrode terminal 3018 and the negative electrode terminal 3024 are determined in such a manner that the positive electrode terminal 3018 and the negative electrode terminal 3024 cannot overlap each other at a time of aligning the plane positions of the positive electrode current collector 3016 and the negative electrode current collector 3022 during the application.

The plane positions of the positive electrode side parallel wiring 3020 and the negative electrode side parallel wiring 3026 are determined in such a manner that the positive electrode side parallel wiring 3020 and the negative electrode side parallel wiring 3026 cannot overlap each other at a time of aligning the plane positions of the positive electrode current collector 3016 and the negative electrode current collector 3022 during the application.

(Configuration of Positive Electrode Side Outer Film and Negative Electrode Side Outer Film)

As shown in FIGS. 22 and 23, it is desirable that the positive electrode side outer film 3002 and the negative electrode side outer film 3014 are webs having constant widths. In the positive electrode side outer film 3002 and the negative electrode side outer film 3014 that are traveling in a direction of extension, the positive electrode side conductive material layer 3004 and the negative electrode side conductive material layer 3012 are repeatedly formed, respectively. Thereby, many positive electrode side conductive material layers 3004 and many negative electrode side conductive material layers 3012 are formed at a high speed, while being arranged in the traveling direction of the positive electrode side outer film 3002 and the negative electrode side outer film 3014. Thus, a roll-to-roll process is applicable, so that the productivity of the lithium secondary battery 3000 is improved. However, it may be also possible that the positive electrode side conductive material layer 3004 and the negative electrode side conductive material layer 3012 are formed respectively on a positive electrode side outer film and a negative electrode side outer film that have been prepared as separate sheets corresponding to each lithium secondary battery 3000.

(Completion of Lithium Secondary Battery)

Figure 24:
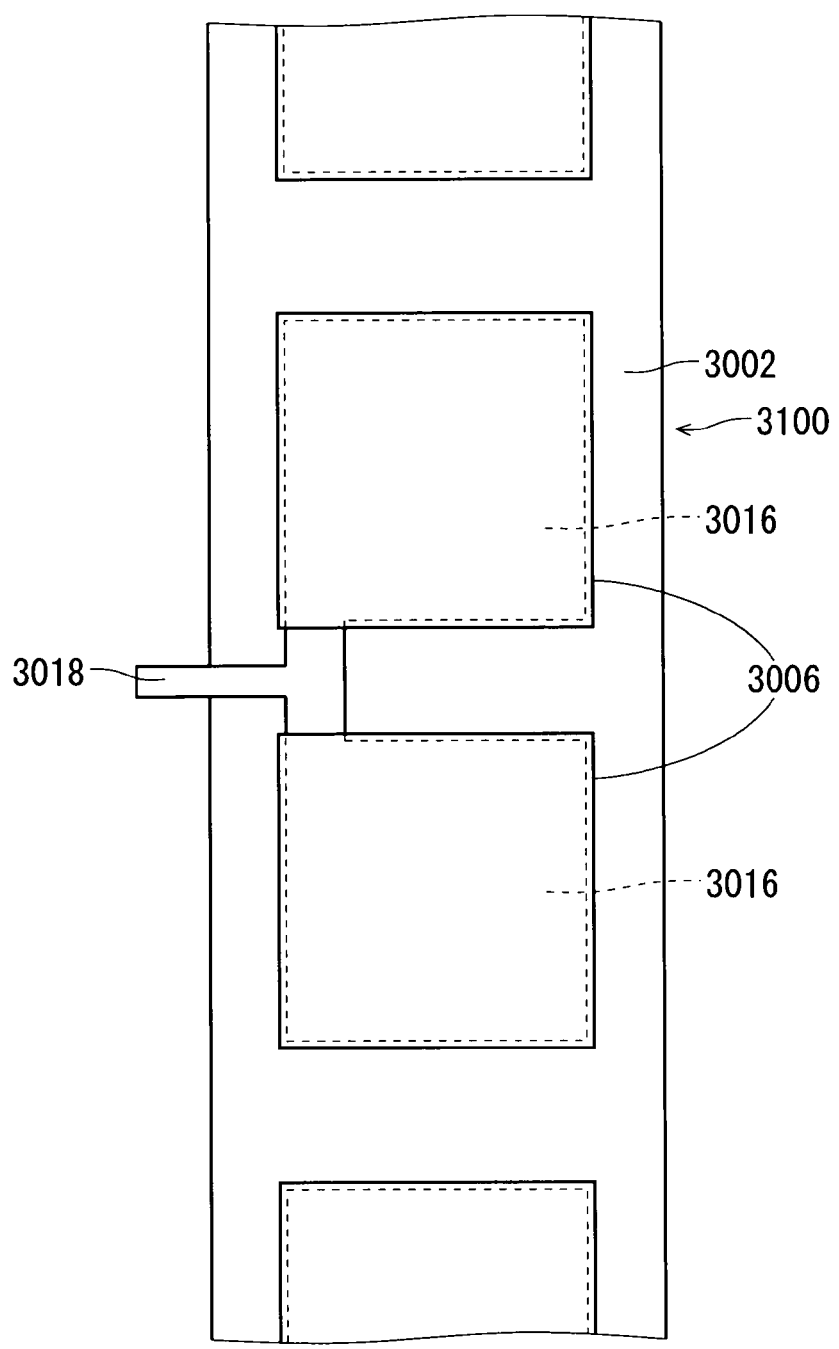
FIG. 24 A plan view showing the method for manufacturing the lithium secondary battery according to the third embodiment.
Figure 25:
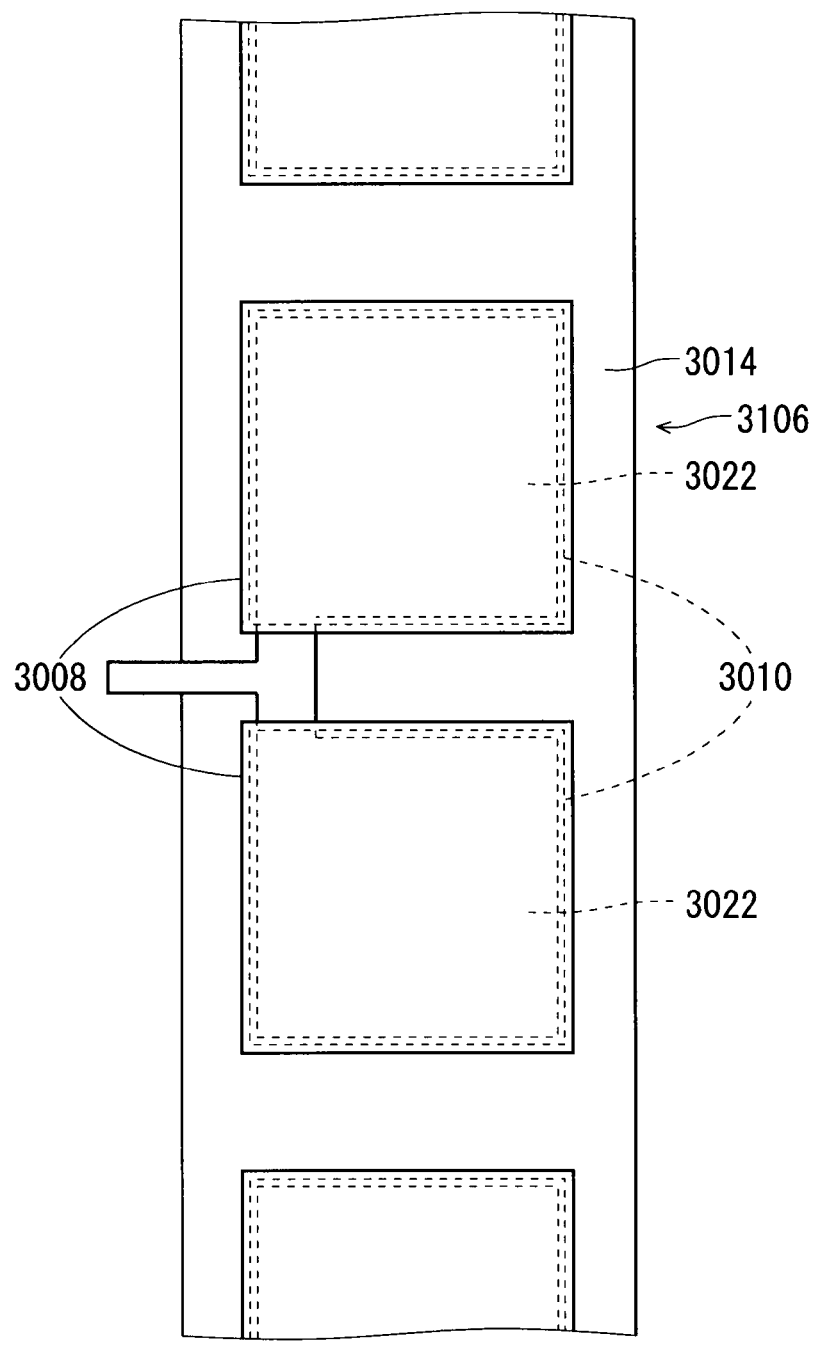
FIG. 25 A plan view showing the method for manufacturing the lithium secondary battery according to the third embodiment.

After the preparation of the positive electrode side composite body 3100 and the negative electrode side composite body 3106, similarly to the first embodiment, the positive electrode active material layer 3006 is added to the positive electrode side composite body 3100 with the plane position thereof being aligned with that of the positive electrode current collector 3016, and the negative electrode active material layer 3010 and the electrolyte layer 3008 are added to the negative electrode side composite body 3106 with the plane positions thereof being aligned with that of the negative electrode current collector 3022. Here, a positive electrode side electrolyte layer and a negative electrode side electrolyte layer may be added to the positive electrode side composite body 3100 and the negative electrode side composite body 3106, respectively. Moreover, a part of the positive electrode side outer film 3002 located outside the positive electrode side application region 3104 is removed from the positive electrode side composite body 3100, while a portion where the positive electrode terminal 3018 overlaps the positive electrode side outer film 3002 is left. A part of the negative electrode side outer film 3014 located outside the negative electrode side application region 3110 is removed from the negative electrode side composite body 3106, while a portion where the negative electrode terminal 3024 overlaps the negative electrode side outer film 3014 is left. Furthermore, the positive electrode side bonding surface 3102 and the negative electrode side bonding surface 3108 are placed face to face with each other. Then, the positive electrode side application region 3104 and the negative electrode side application region 3110 are applied to each other. At this time, the plane positions of the positive electrode current collector 3016, the positive electrode active material layer 3006, the electrolyte layer 3008, the negative electrode active material layer 3010, and the negative electrode current collector 3022 of each cell 3028 are aligned with one another. FIGS. 24 and 25 are diagrams schematically showing the positive electrode side composite body 3100 and the negative electrode side composite body 3106, respectively, immediately before the application is performed. FIGS. 24 and 25 are plan views.

Subsequently, the positive electrode side outer film 3002 and the negative electrode side outer film 3014 are bonded to each other in the bonding region 3032 that extends from an edge of each lithium secondary battery 3000 to the vicinity of an edge of the electrolyte layer 3008 and the like. Then, the continuous lithium secondary batteries 3000 are separated from one another, as needed. Thus, the lithium secondary battery 3000 shown in FIGS. 20 and 21 is completed.

(Advantages)

In the third embodiment, the positive electrode side conductive material layer 3004 overlaps the positive electrode side outer film 3002, and the negative electrode side conductive material layer 3012 overlaps the negative electrode side outer film 3014. Even though the positive electrode current collector 3016, the positive electrode terminal 3018, the positive electrode side parallel wiring 3020, the negative electrode current collector 3022, the negative electrode terminal 3024, and the negative electrode side parallel wiring 3026 have a reduced thickness, they are not easily damaged. This can reduce the thickness and weight of each of the positive electrode side conductive material layer 3004 and the negative electrode side conductive material layer 3012, thus reducing the size and weight of the lithium secondary battery 3000. As a result, the volume energy density and the weight energy density of the lithium secondary battery 3000 are improved. Additionally, two or more cells 3028 are connected in parallel without hindering the downsizing and weight reduction of the lithium secondary battery 3000. This advantage is unique to the horizontal-type lithium secondary battery 3000 in which the cells 3028 are arranged in a plane.

Fourth Embodiment

A fourth embodiment relates to a lithium secondary battery that includes a series cell group having two or more cells connected in series and that has two or more series cell groups connected in parallel, and to a manufacturing method thereof.

(Structure of Lithium Secondary Battery)

Figure 26:
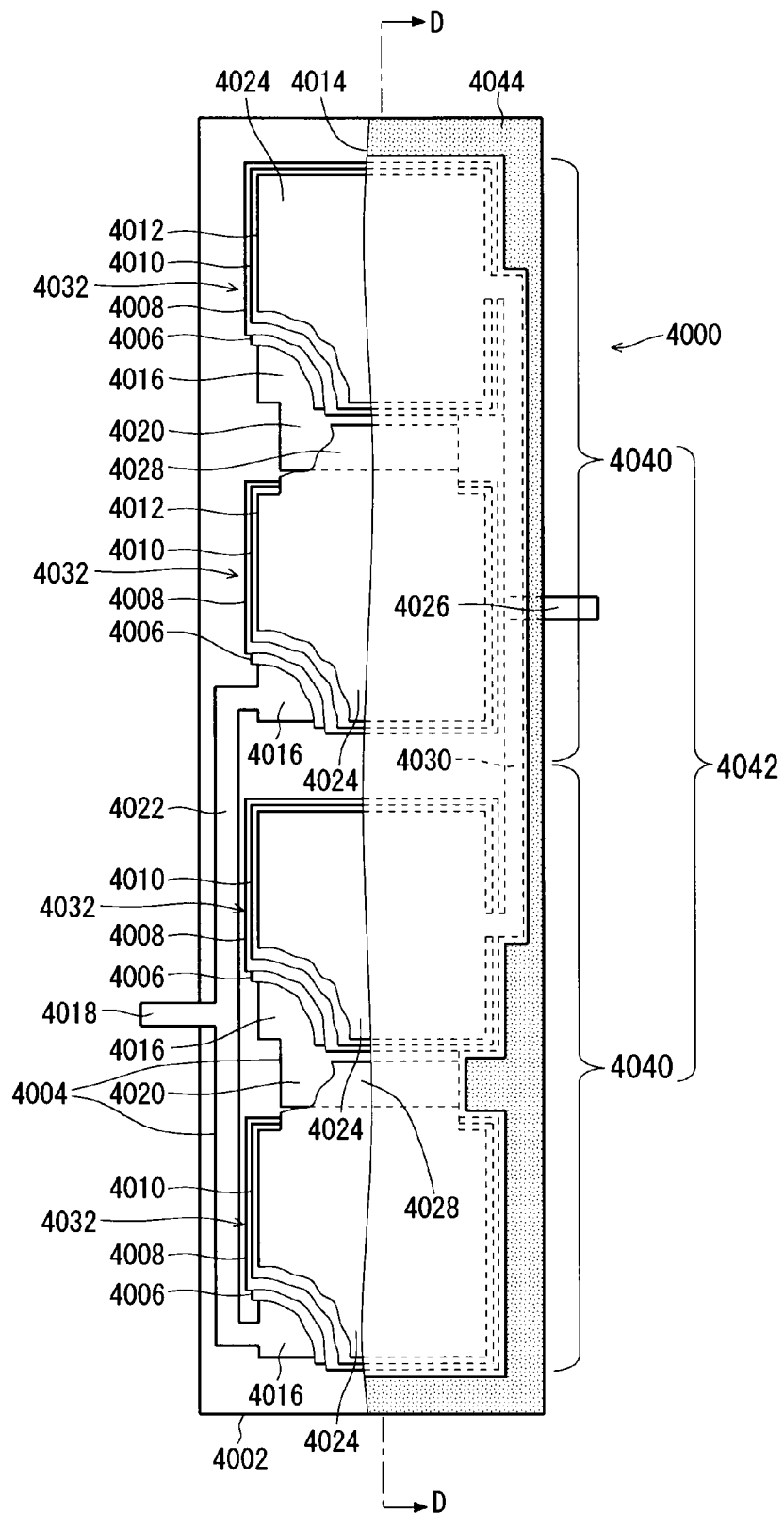
FIG. 26 A plan view of a lithium secondary battery according to a fourth embodiment.
Figure 27:
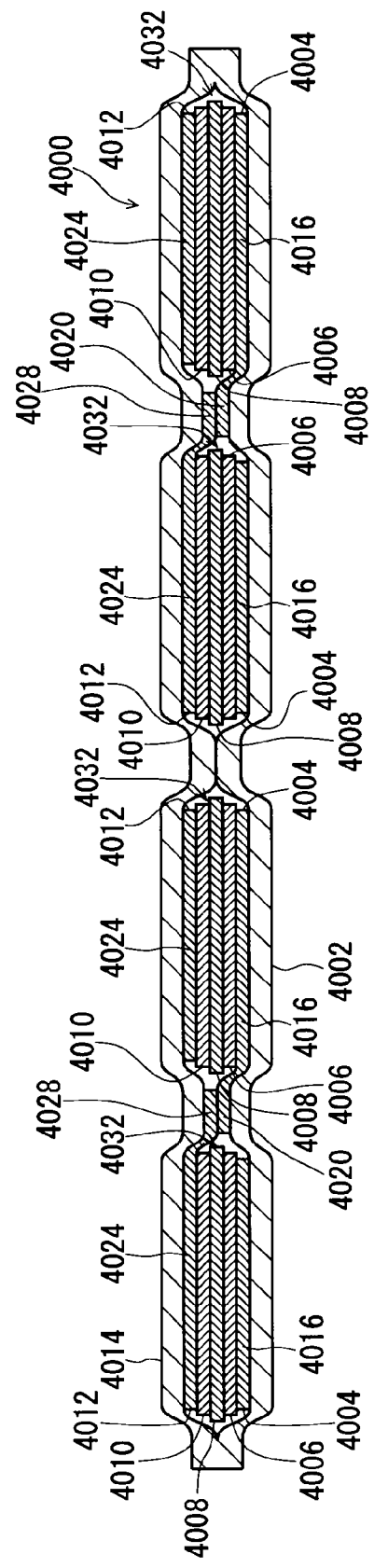
FIG. 27 A cross-sectional view of the lithium secondary battery according to the fourth embodiment.

FIGS. 26 and 27 are diagrams schematically showing the lithium secondary battery according to the fourth embodiment. FIG. 26 is a plan view, and FIG. 27 is a cross-sectional view as taken along the line D-D of FIG. 26. FIGS. 26 and 27 illustrate a case where two cells are connected in series and two series cell groups are connected in parallel. In FIG. 26, parts of upper component materials defined by cut-away lines are removed, in order to show component materials located under the upper component materials.

As shown in FIGS. 26 and 27, a lithium secondary battery 4000 includes a positive electrode side outer film 4002, a positive electrode side conductive material layer 4004, a positive electrode active material layer 4006, an electrolyte layer 4008, a negative electrode active material layer 4010, a negative electrode side conductive material layer 4012, and a negative electrode side outer film 4014. The positive electrode side conductive material layer 4004 has a positive electrode current collector 4016, a positive electrode terminal 4018, a positive electrode side series wiring 4020, and a positive electrode side parallel wiring 4022. The negative electrode side conductive material layer 4012 has a negative electrode current collector 4024, a negative electrode terminal 4026, a negative electrode side series wiring 4028, and a negative electrode side parallel wiring 4030.

It is desirable that each of the positive electrode side conductive material layer 4004 and the negative electrode side conductive material layer 4012 is a continuous layer. That is, the positive electrode current collector 4016, the positive electrode terminal 4018, the positive electrode side series wiring 4020, and the positive electrode side parallel wiring 4022 do not overlap one another, and no interface exists at a connection portion thereamong. The negative electrode current collector 4024, the negative electrode terminal 4026, the negative electrode side series wiring 4028, and the negative electrode side parallel wiring 4030 do not overlap each other, and no interface exists at a connection portion thereamong.

The positive electrode current collector 4016, the positive electrode active material layer 4006, the electrolyte layer 4008, the negative electrode active material layer 4010, and the negative electrode current collector 4024 are provided with respect to each cell 4032, and stacked in the same plane position, to form the cell 4032. The positive electrode side series wiring 4020 and the negative electrode side series wiring 4028 are electrically connected to each other, and connect the cells 4032 in series to thereby form a series cell group 4040. The positive electrode side parallel wiring 4022 and the negative electrode side parallel wiring 4030 connect the series cell groups 4040 in parallel, to thereby form a series-parallel cell group 4042. It may be also acceptable that the cells 4032 are connected in parallel by the positive electrode side parallel wiring and the negative electrode side parallel wiring to form a parallel cell group, while the parallel cell groups are connected in series by the positive electrode side series wiring and the negative electrode side series wiring to form a series-parallel cell group.

The positive electrode side outer film 4002 and the negative electrode side outer film 4014 are bonded to each other in a bonding region 4044 that surrounds the series-parallel cell group 4042. The series-parallel cell group 4042 is sealed with the positive electrode side outer film 4002 and the negative electrode side outer film 4014.

One end of the positive electrode terminal 4018 is electrically connected to the positive electrode current collector 4016 of the cell 4032 located at the most positive electrode side in each of the series cell groups 4040 of the series-parallel cell group 4042, and one end of the negative electrode terminal 4026 is electrically connected to the negative electrode current collector 4024 of the cell 4032 located at the most negative electrode side in each of the series cell groups 4040 of the series-parallel cell group 4042. The other end of the positive electrode terminal 4018 and the other end of the negative electrode terminal 4026 are exposed to the outside of the lithium secondary battery 4000. Thereby, the series cell group 4040 is charged and discharged through the positive electrode terminal 4018 and the negative electrode terminal 4026. The positive electrode terminal 4018 and the negative electrode terminal 4026 are connected to the positive electrode current collector 4016 and the negative electrode current collector 4024 through the positive electrode side parallel wiring 4022 and the negative electrode side parallel wiring 4030, respectively, but instead, may be connected directly to the positive electrode current collector 4016 and the negative electrode current collector 4024, respectively.

In each of the series cell groups 4040, the positive electrode side series wiring 4020 is electrically connected to the positive electrode current collector 4016 of the second cell 4032, and the negative electrode side series wiring 4028 is electrically connected to the negative electrode current collector 4024 of the first cell 4032.

The positive electrode side parallel wiring 4022 is electrically connected to the positive electrode current collector 4016 of the cell 4032 located at the most positive electrode side in each of the series cell groups 4040 of the series-parallel cell group 4042. The negative electrode side parallel wiring 4030 is electrically connected to the negative electrode current collector 4024 of the cell 4032 at the most negative electrode side in each of the series cell groups 4040 of the series-parallel cell group 4042.

(Manufacture of Lithium Secondary Battery)

FIGS. 28 to 31 are diagrams showing a flow of manufacture of the lithium secondary battery according to the fourth embodiment. FIGS. 28 to 31 are plan views.

(Preparation of Positive Electrode Side Composite Body)

Figure 28:
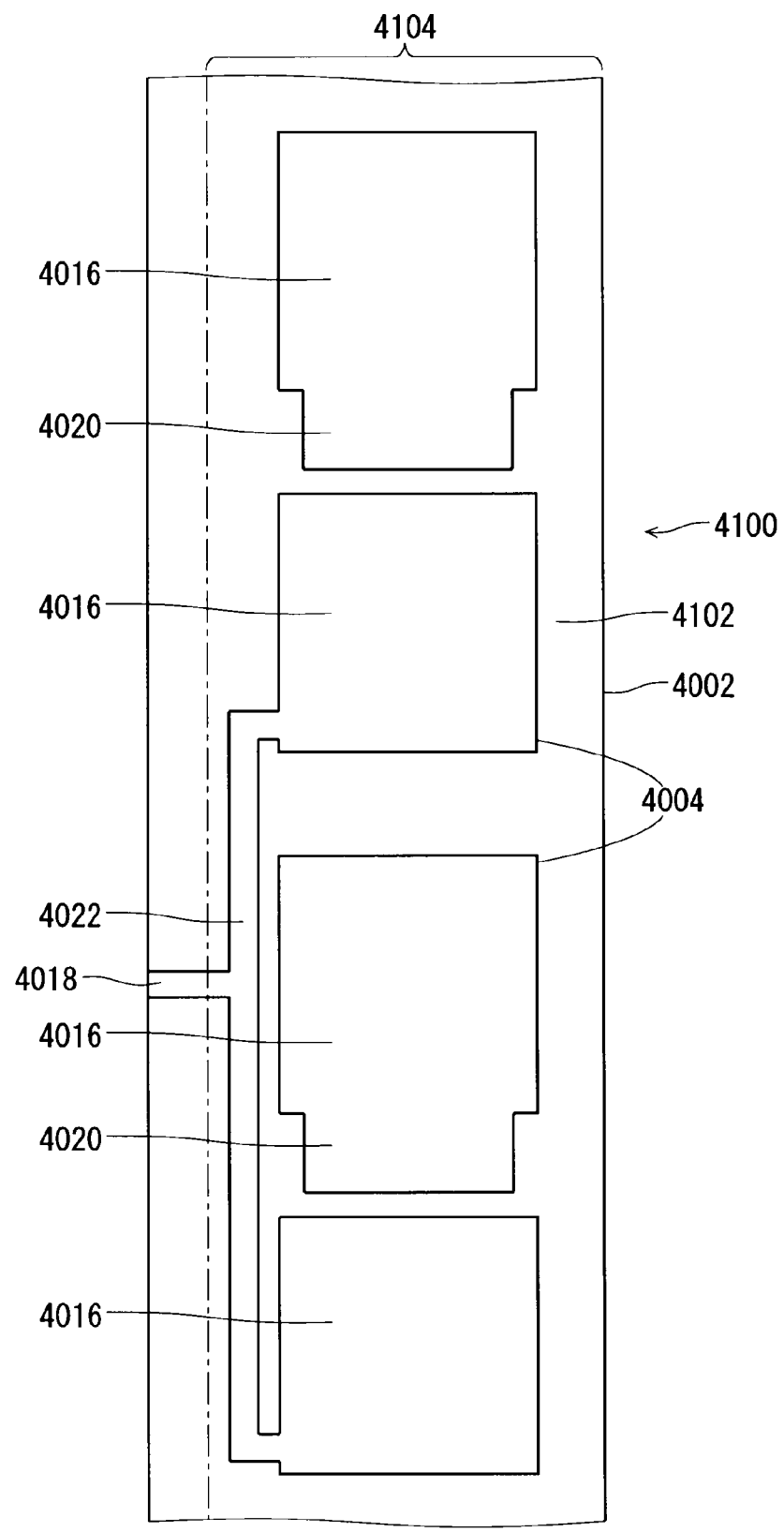
FIG. 28 A plan view showing a method for manufacturing the lithium secondary battery according to the fourth embodiment.

In the manufacture of the lithium secondary battery 4000, as shown in FIG. 28, the whole of the positive electrode side conductive material layer 4004 is formed on a positive electrode side bonding surface 4102 of the positive electrode side outer film 4002 to prepare a positive electrode side composite body 4100 in which the positive electrode side conductive material layer 4004 is integrated with the positive electrode side outer film 4002. The whole of the positive electrode side conductive material layer 4004 is supported on the positive electrode side outer film 4002. As a result, the positive electrode side conductive material layer 4004 is not easily damaged, even if the thickness thereof is small.

The positive electrode current collector 4016, the positive electrode side series wiring 4020, and the positive electrode side parallel wiring 4022 are located within the positive electrode side application region 4104. At least a part of the positive electrode terminal 4018 is located outside the positive electrode side application region 4104. As a result, when the cell 4032 is sealed, the positive electrode terminal 4018 is exposed to the outside of the lithium secondary battery 4000.

(Preparation of Negative Electrode Side Composite Body)

Figure 29:
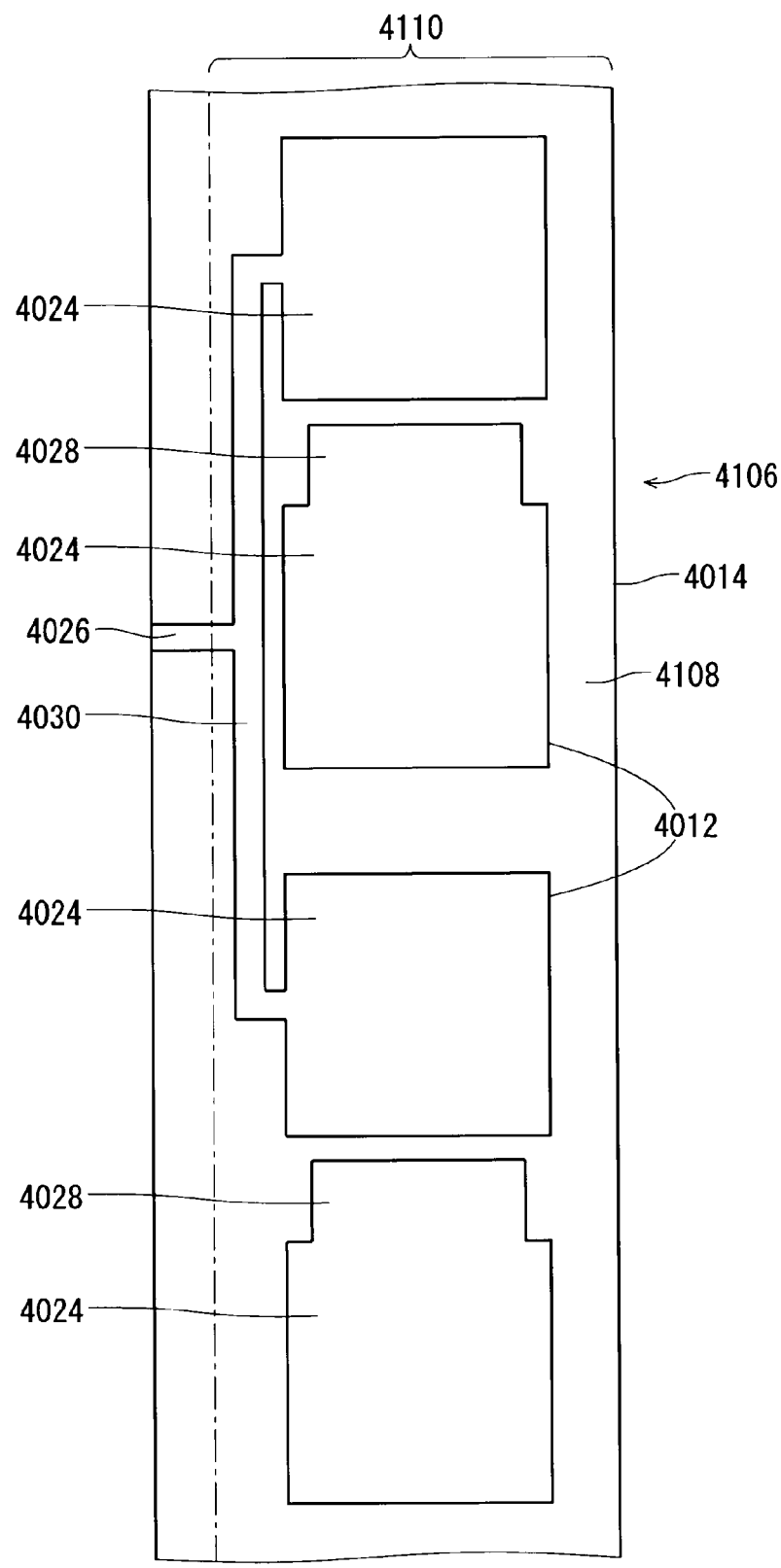
FIG. 29 A plan view showing the method for manufacturing the lithium secondary battery according to the fourth embodiment.

Separately from the preparation of the positive electrode side composite body 4100, as shown in FIG. 29, the whole of the negative electrode side conductive material layer 4012 is formed on a negative electrode side bonding surface 4108 of the negative electrode side outer film 4014 to prepare a negative electrode side composite body 4106 in which the negative electrode side conductive material layer 4012 is integrated with the negative electrode side outer film 4014. The whole of the negative electrode side conductive material layer 4012 is supported on the negative electrode side outer film 4014. As a result, the negative electrode side conductive material layer 4012 is not easily damaged, even if the thickness thereof is small.

The negative electrode current collector 4024, the negative electrode side series wiring 4028, and the negative electrode side parallel wiring 4030 are located within the negative electrode side application region 4110. At least a part of the negative electrode terminal 4026 is located outside the negative electrode side application region 4110. As a result, when the cell 4032 is sealed, the negative electrode terminal 4026 is exposed to the outside of the lithium secondary battery 4000.

(Positional Relationship)

The positive electrode side application region 4104 and the negative electrode side application region 4110 are applied to each other in a subsequent step.

The plane positions of the positive electrode terminal 4018 and the negative electrode terminal 4026 are determined in such a manner that the positive electrode terminal 4018 and the negative electrode terminal 4026 cannot overlap each other at a time of aligning the plane positions of the positive electrode current collector 4016 and the negative electrode current collector 4024 during the application.

The plane positions of the positive electrode side series wiring 4020 and the negative electrode side series wiring 4028 are determined in such a manner that, at a time of aligning the plane positions of the positive electrode current collector 4016 and the negative electrode current collector 4024 during the application, the positive electrode side series wiring 4020 of the former and the negative electrode side series wiring 4028 of the latter can overlap each other.

The plane positions of the positive electrode side parallel wiring 4022 and the negative electrode side parallel wiring 4030 are determined in such a manner that the positive electrode side parallel wiring 4022 and the negative electrode side parallel wiring 4030 cannot overlap each other at a time of aligning the plane positions of the positive electrode current collector 4016 and the negative electrode current collector 4022 during the application.

(Configuration of Positive Electrode Side Outer Film and Negative Electrode Side Outer Film)

As shown in FIGS. 28 and 29, it is desirable that the positive electrode side outer film 4002 and the negative electrode side outer film 4014 are webs having constant widths. In the positive electrode side outer film 4002 and the negative electrode side outer film 4014 that are traveling in a direction of extension, the positive electrode side conductive material layer 4004 and the negative electrode side conductive material layer 4012 are repeatedly formed, respectively. Thereby, many positive electrode side conductive material layers 4004 and many negative electrode side conductive material layers 4012 are formed at a high speed, while being arranged in the traveling direction of the positive electrode side outer film 4002 and the negative electrode side outer film 4014. Thus, a roll-to-roll process is applicable, so that the productivity of the lithium secondary battery 4000 is improved. However, it may be also possible that the positive electrode side conductive material layer 4004 and the negative electrode side conductive material layer 4012 are formed respectively on a positive electrode side outer film and a negative electrode side outer film that have been prepared as separate sheets corresponding to each lithium secondary battery 4000.

(Completion of Lithium Secondary Battery)

Figure 30:
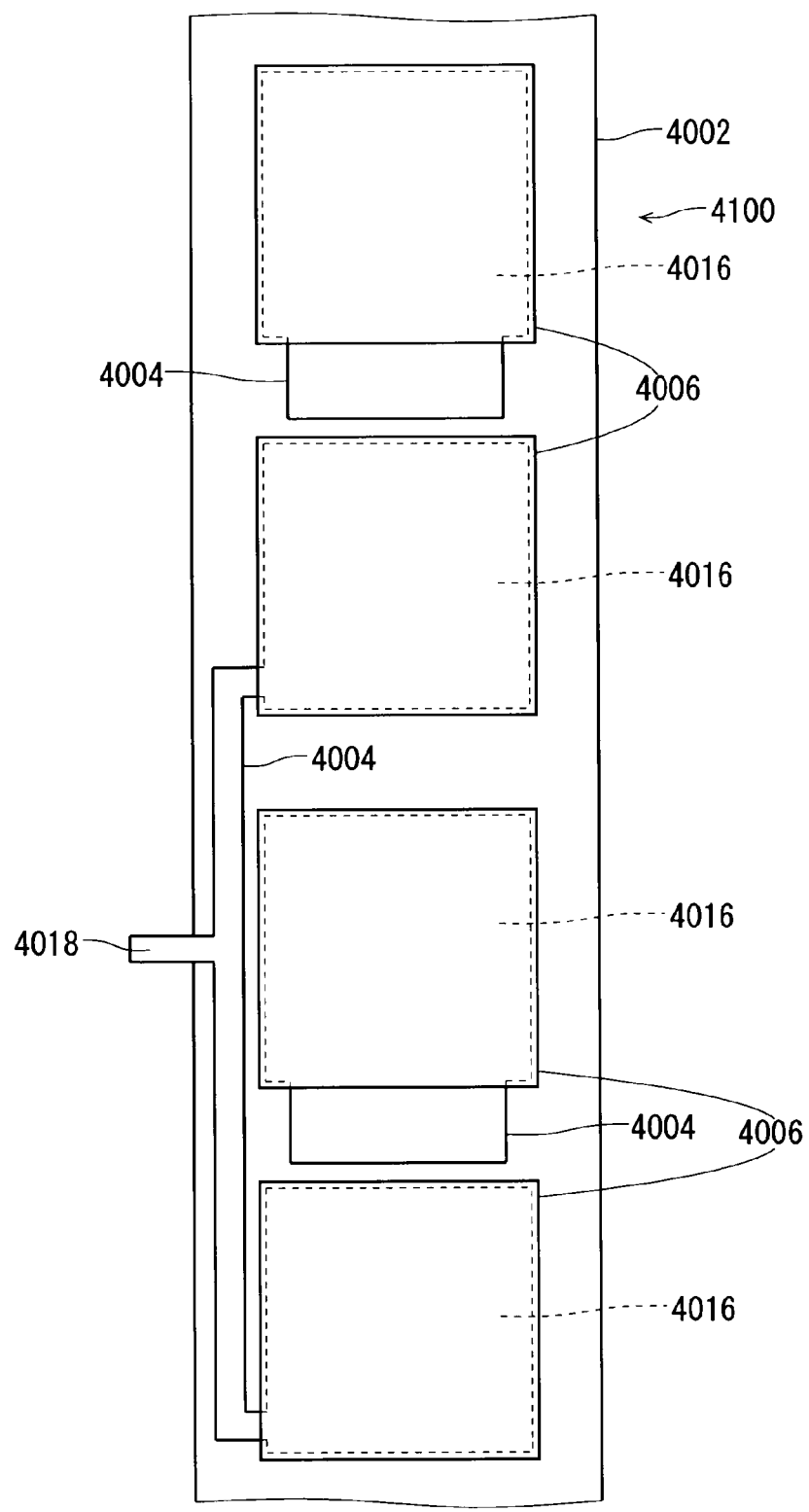
FIG. 30 A plan view showing the method for manufacturing the lithium secondary battery according to the fourth embodiment.
Figure 31:
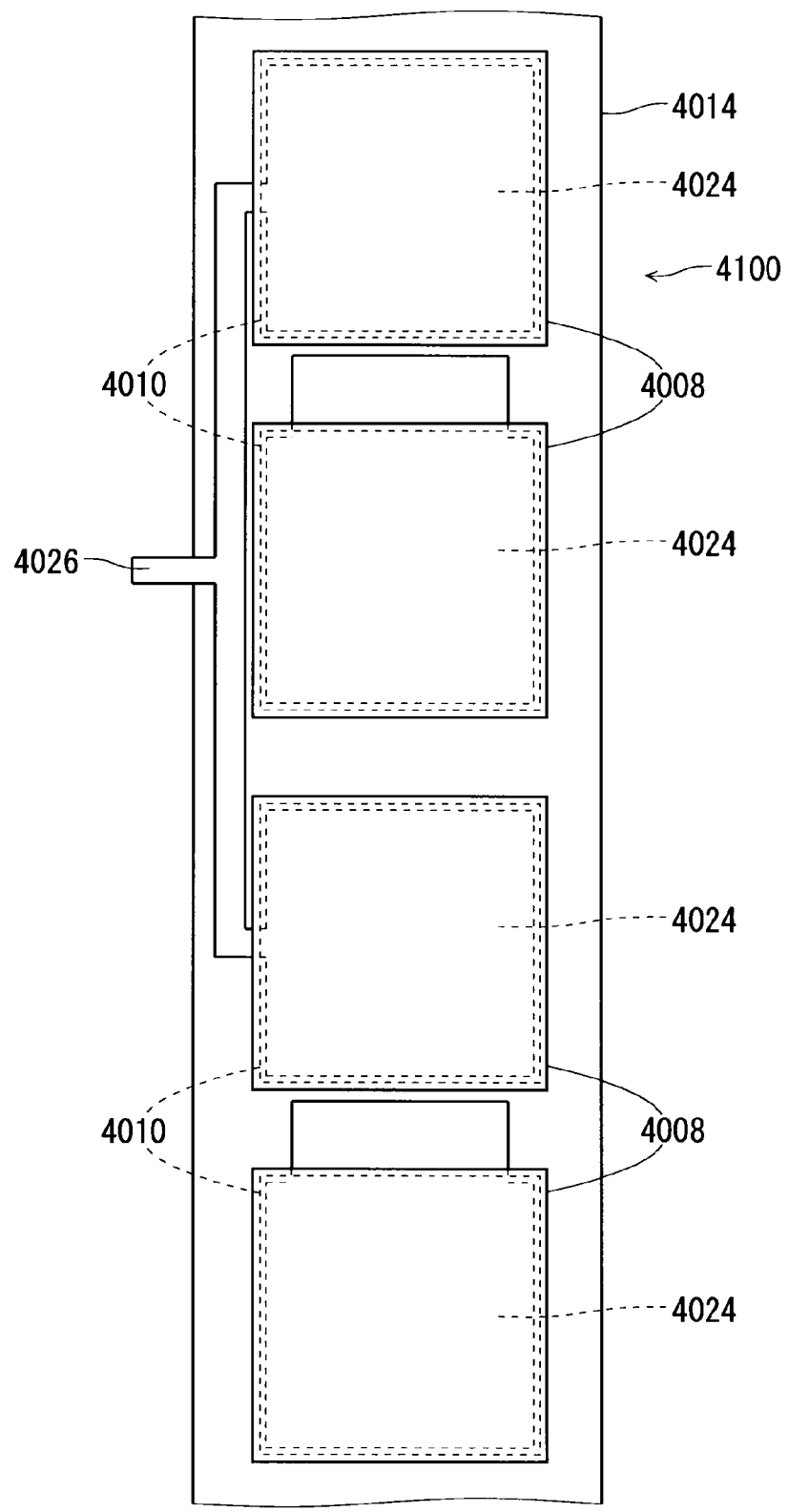
FIG. 31 A plan view showing the method for manufacturing the lithium secondary battery according to the fourth embodiment.

After the preparation of the positive electrode side composite body 4100 and the negative electrode side composite body 4106, similarly to the first embodiment, the positive electrode active material layer 4006 is added to the positive electrode side composite body 4100 with the plane position thereof being aligned with that of the positive electrode current collector 4016, and the negative electrode active material layer 4010 and the electrolyte layer 4008 are added to the negative electrode side composite body 4106 with the plane position thereof being aligned with that of the negative electrode current collector 4024. Here, the positive electrode side electrolyte layer and the negative electrode side electrolyte layer may be added to the positive electrode side composite body 4100 and the negative electrode side composite body 4106, respectively. Moreover, a part of the positive electrode side outer film 4002 located outside the positive electrode side application region 4104 is removed from the positive electrode side composite body 4100, while a portion where the positive electrode terminal 4018 overlaps the positive electrode side outer film 4002 is left. A part of the negative electrode side outer film 4014 located outside the negative electrode side application region 4110 is removed from the negative electrode side composite body 4106, while a portion where the negative electrode terminal 4026 overlaps the negative electrode side outer film 4014 is left. Furthermore, the positive electrode side bonding surface 4102 and the negative electrode side bonding surface 4108 are placed face to face with each other. Then, the positive electrode side application region 4104 and the negative electrode side application region 4110 are applied to each other. At this time, the plane positions of the positive electrode current collector 4016, the positive electrode active material layer 4006, the electrolyte layer 4008, the negative electrode active material layer 4010, and the negative electrode current collector 4022 of each cell 4032 are aligned with one another. FIGS. 30 and 31 are diagrams schematically showing the positive electrode side composite body 4100 and the negative electrode side composite body 4106, respectively, immediately before the application is performed. FIGS. 30 and 31 are plan views.

Subsequently, the positive electrode side outer film 4002 and the negative electrode side outer film 4014 are bonded to each other in a bonding region 4044 formed near an edge of each lithium secondary battery 4000. The continuous lithium secondary batteries 4000 are separated from one another, as needed. Thus, the lithium secondary battery 4000 shown in FIGS. 28 and 29 is completed.

Similarly to the first embodiment, in order to improve the in-plane uniformity of the electric connection between the positive electrode side series wiring 4020 and the negative electrode side series wiring 4028, the positive electrode side series wiring 4020 and the negative electrode side series wiring 4028 may be in contact with interposition of a conductive bonding medium.

(Advantages)

In the fourth embodiment, the positive electrode side conductive material layer 4004 overlaps the positive electrode side outer film 4002, and the negative electrode side conductive material layer 4012 overlaps the negative electrode side outer film 4014. Even though the positive electrode current collector 4016, the positive electrode terminal 4018, the positive electrode side series wiring 4020, the positive electrode side parallel wiring 4022, the negative electrode current collector 4024, the negative electrode terminal 4026, the negative electrode side series wiring 4028, and the negative electrode side parallel wiring 4030 have a reduced thickness, they are not easily damaged. This can reduce the thickness and weight of the positive electrode side conductive material layer 4004 and the negative electrode side conductive material layer 4012, thus reducing the size and weight of the lithium secondary battery 4000. As a result, the volume energy density and the weight energy density of the lithium secondary battery 4000 are improved. Additionally, two or more cells 4032 are connected in series and in parallel without hindering the downsizing and weight reduction of the lithium secondary battery 3000. This advantage is unique to the horizontal-type lithium secondary battery 4000 in which the cells 4032 are arranged in a plane.

Fifth Embodiment

A fifth embodiment relates to a lithium secondary battery including one cell, and to a manufacturing method thereof.

(Structure of Lithium Secondary Battery)

Figure 32:
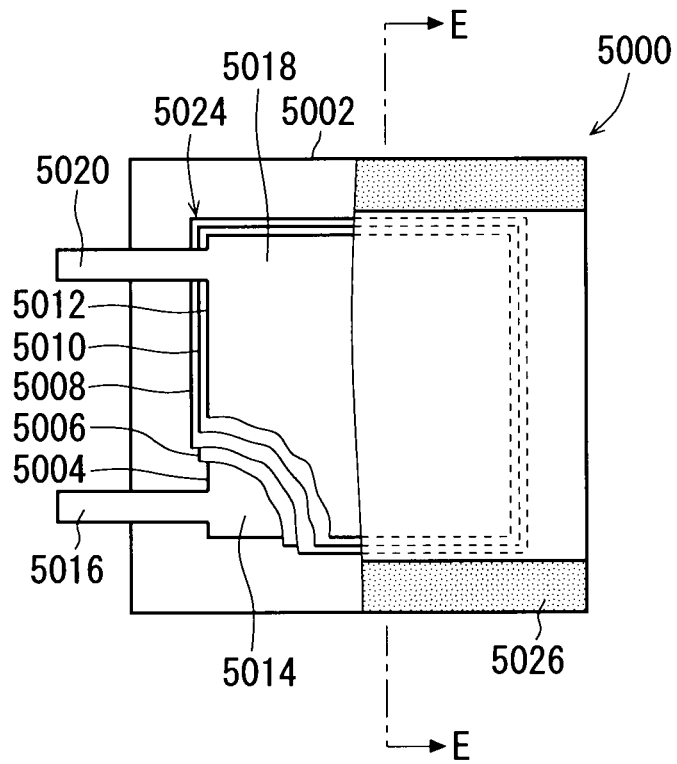
FIG. 32 A plan view of a lithium secondary battery according to a fifth embodiment.
Figure 33:
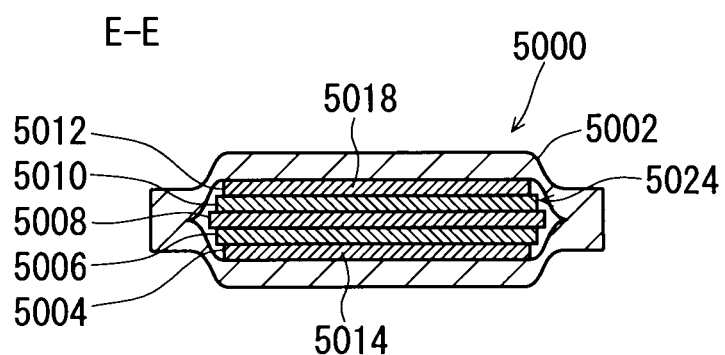
FIG. 33 A cross-sectional view of the lithium secondary battery according to the fifth embodiment.

FIGS. 32 and 33 are diagrams schematically showing the lithium secondary battery according to the fifth embodiment. FIG. 32 is a plan view, and FIG. 33 is a cross-sectional view as taken along the line E-E of FIG. 32. In FIG. 32, parts of upper component materials defined by cut-away lines are removed, in order to show component materials located under the upper component materials.

As shown in FIGS. 32 and 33, a lithium secondary battery 5000 includes an outer film 5002, a positive electrode side conductive material layer 5004, a positive electrode active material layer 5006, an electrolyte layer 5008, a negative electrode active material layer 5010, and a negative electrode side conductive material layer 5012. The positive electrode side conductive material layer 5004 has a positive electrode current collector 5014 and a positive electrode terminal 5016.

The negative electrode side conductive material layer 5012 has a negative electrode current collector 5018 and a negative electrode terminal 5020.

In the first embodiment, the cell 1024 is sealed between two of the positive electrode side outer film 1002 and the negative electrode side outer film 1014. On the other hand, in the fifth embodiment, a cell 5024 is sealed between one side and the other side of the single outer film 5002 that is two-folded. The positive electrode side conductive material layer 5004, the positive electrode active material layer 5006, the electrolyte layer 5008, the negative electrode active material layer 5010, and the negative electrode side conductive material layer 5012 of the fifth embodiment are identical to the positive electrode side conductive material layer 1004, the positive electrode active material layer 1006, the electrolyte layer 1008, the negative electrode active material layer 1010, and the negative electrode side conductive material layer 1012 of the first embodiment.

The two-folded outer film 5002 is bonded in a bonding region 5026 that surrounds the cell 5024. The cell 5024 is sealed with the outer film 5002.

(Manufacture of Lithium Secondary Battery)

FIGS. 34 to 39 are diagrams showing a flow of manufacture of the lithium secondary battery according to the fifth embodiment. FIGS. 34 to 39 are plan views.

(Preparation of Composite Body)

Figure 34:
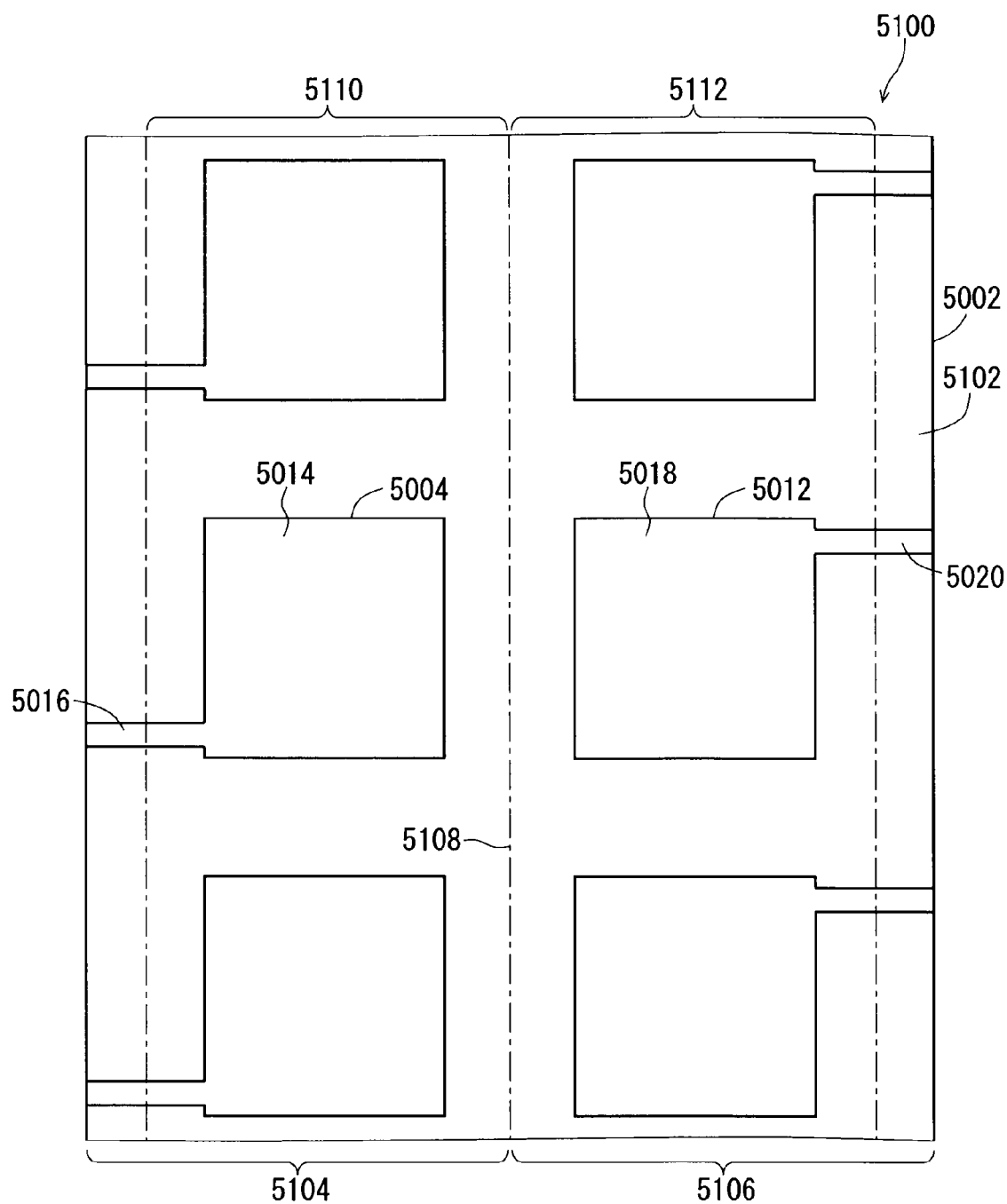
FIG. 34 A plan view showing a method for manufacturing the lithium secondary battery according to the fifth embodiment.

In the manufacture of the lithium secondary battery 5000, as shown in FIG. 34, the whole of the positive electrode side conductive material layer 5004 and the whole of the negative electrode side conductive material layer 5012 are formed on a bonding surface 5102 of the outer film 5002 to prepare a composite body 5100 in which the positive electrode side conductive material layer 5004, the negative electrode side conductive material layer 5012, and the outer film 5002 are integrated with one another. The whole of the positive electrode side conductive material layer 5004 and the whole of the negative electrode side conductive material layer 5012 are supported on the outer film 5002. As a result, the positive electrode side conductive material layer 5004 and the negative electrode side conductive material layer 5012 are not easily damaged, even if the thickness thereof is small.

The positive electrode side conductive material layer 5004 is formed in a positive electrode side conductive material layer formation region 5104, and the negative electrode side conductive material layer 5012 is formed in a negative electrode side conductive material layer formation region 5106. The positive electrode side conductive material layer formation region 5104 and the negative electrode side conductive material layer formation region 5106 are partitioned from each other by a fold line 5108 along which folding is made in a subsequent step. A perforation or a cut line may be provided at the position of the fold line 5108. This allows the outer film 5002 to be accurately folded at the position of the fold line 5108, so that the plane positions of the positive electrode current collector 5014, the positive electrode active material layer 5006, the electrolyte layer 5008, the negative electrode active material layer 5010, and the negative electrode current collector 5018 are accurately aligned. Additionally, folding of the outer film 5002 is easy.

The positive electrode current collector 5014 is located within a positive electrode side application region 5110 that is in the positive electrode side conductive material layer formation region 5104. At least a part of the positive electrode terminal 5016 is located outside the positive electrode side application region 5110. The negative electrode current collector 5018 is located within a negative electrode side application region 5112 that is in the negative electrode side conductive material layer formation region 5106. At least a part of the negative electrode terminal 5020 is located outside the negative electrode side application region 5112. As a result, when the cell 5024 is sealed, the positive electrode terminal 5016 and the negative electrode terminal 5020 are exposed to the outside of the lithium secondary battery 5000.

(Configuration of Outer Film)

It is desirable that the outer film 5002 is a web having a constant width. In the outer film 5002 that is traveling in a direction of extension, the positive electrode side conductive material layer 5004 and the negative electrode side conductive material layer 5012 are repeatedly formed, respectively. Thereby, many positive electrode side conductive material layers 5004 and many negative electrode side conductive material layers 5012 are formed at a high speed, while being arranged in the traveling direction of the outer film 5002. Thus, a roll-to-roll process is applicable, so that the productivity of the lithium secondary battery 5000 is improved. However, it may be also possible that the positive electrode side conductive material layer 5004 and the negative electrode side conductive material layer 5012 are formed on an outer film that has been prepared as a separate sheet corresponding to each lithium secondary battery 5000.

(Addition of Positive Electrode Active Material Layer, Negative Electrode Active Material Layer, and Electrolyte Layer)

Figure 35:
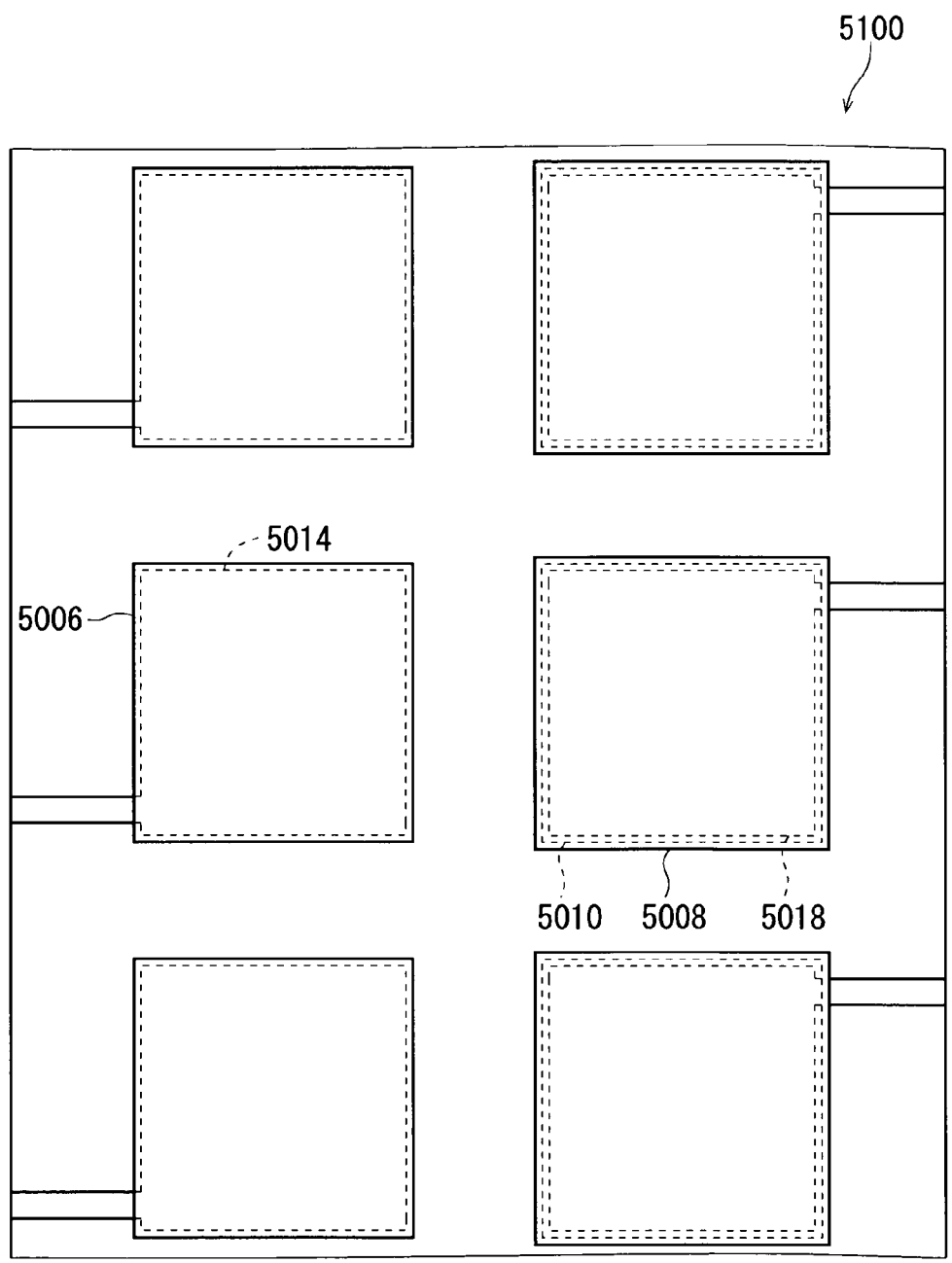
FIG. 35 A plan view showing the method for manufacturing the lithium secondary battery according to the fifth embodiment.

After the preparation of the composite body 5100, as shown in FIG. 35, the positive electrode active material layer 5006 is added to the composite body 5100 with the plane position thereof being aligned with that of the positive electrode current collector 5014, and the negative electrode active material layer 5010 and the electrolyte layer 5008 are sequentially added to the composite body 5100 with the plane positions thereof being aligned with that of the negative electrode current collector 5018. Here, the electrolyte layer 5008 may be added to the composite body 5100 with the plane position thereof being aligned with that of the positive electrode current collector 5014. In a case where the electrolyte layer 5008 is added to the composite body 5100 with the plane position thereof being aligned with that of the positive electrode current collector 5014, the positive electrode active material layer 5006 and the electrolyte layer 5008 are sequentially added to the composite body 5100 with the plane positions thereof being aligned with that of the positive electrode current collector 5014, while the negative electrode active material layer 5010 is added to the composite body 5100 with the plane position thereof being aligned with that of the negative electrode current collector 5018.

Figure 36:
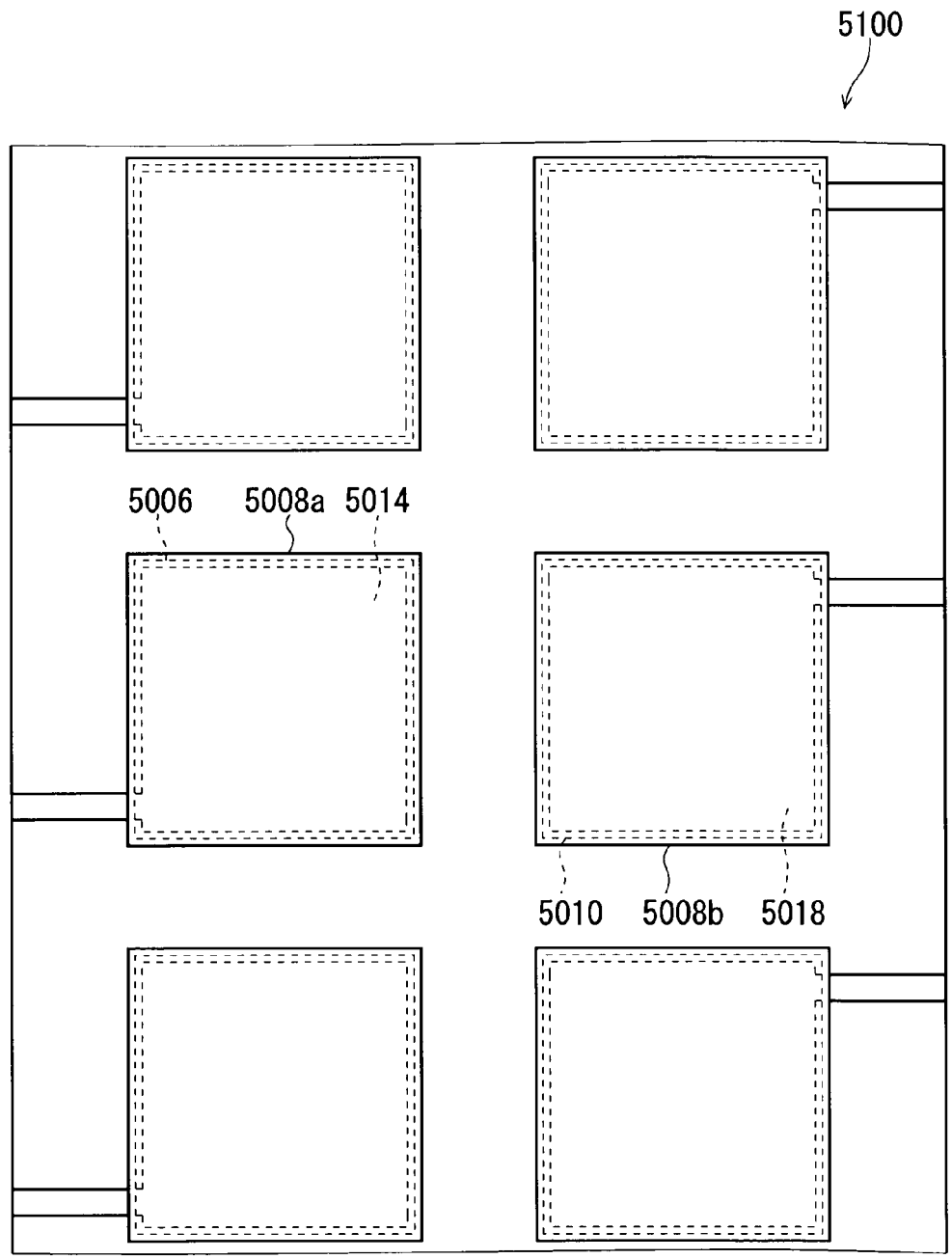
FIG. 36 A plan view showing the method for manufacturing the lithium secondary battery according to the fifth embodiment.

As shown in FIG. 36, a positive electrode side electrolyte layer 5008*a* and a negative electrode side electrolyte layer 5008*b* may be added to the composite body 5100. In this case, the positive electrode active material layer 5006 and the positive electrode side electrolyte layer 5008*a* are sequentially added to the composite body 5100 with the plane positions thereof being aligned with that of the positive electrode current collector 5014, while the negative electrode active material layer 5010 and the negative electrode side electrolyte layer 5008*b* are sequentially added to the composite body 5100 with the plane positions thereof being aligned with that of the negative electrode current collector 5018. When the positive electrode side application region 5110 and the negative electrode side application region 5112 are applied to each other, the positive electrode side electrolyte layer 5008*a* and the negative electrode side electrolyte layer 5008*b* are bonded to each other to form a single electrolyte layer 5008. Therefore, when the positive electrode side application region 5110 and the negative electrode side application region 5112 are applied to each other, the positive electrode side electrolyte layer 5008a and the negative electrode side electrolyte layer 5008b made of the same material are surely bonded to each other. As a result, an influence of occurrence of an interface that would be caused by uncertain bonding is suppressed, thus achieving uniform characteristics of the cells 5024.

(Removal of Outer Film)

Figure 37:
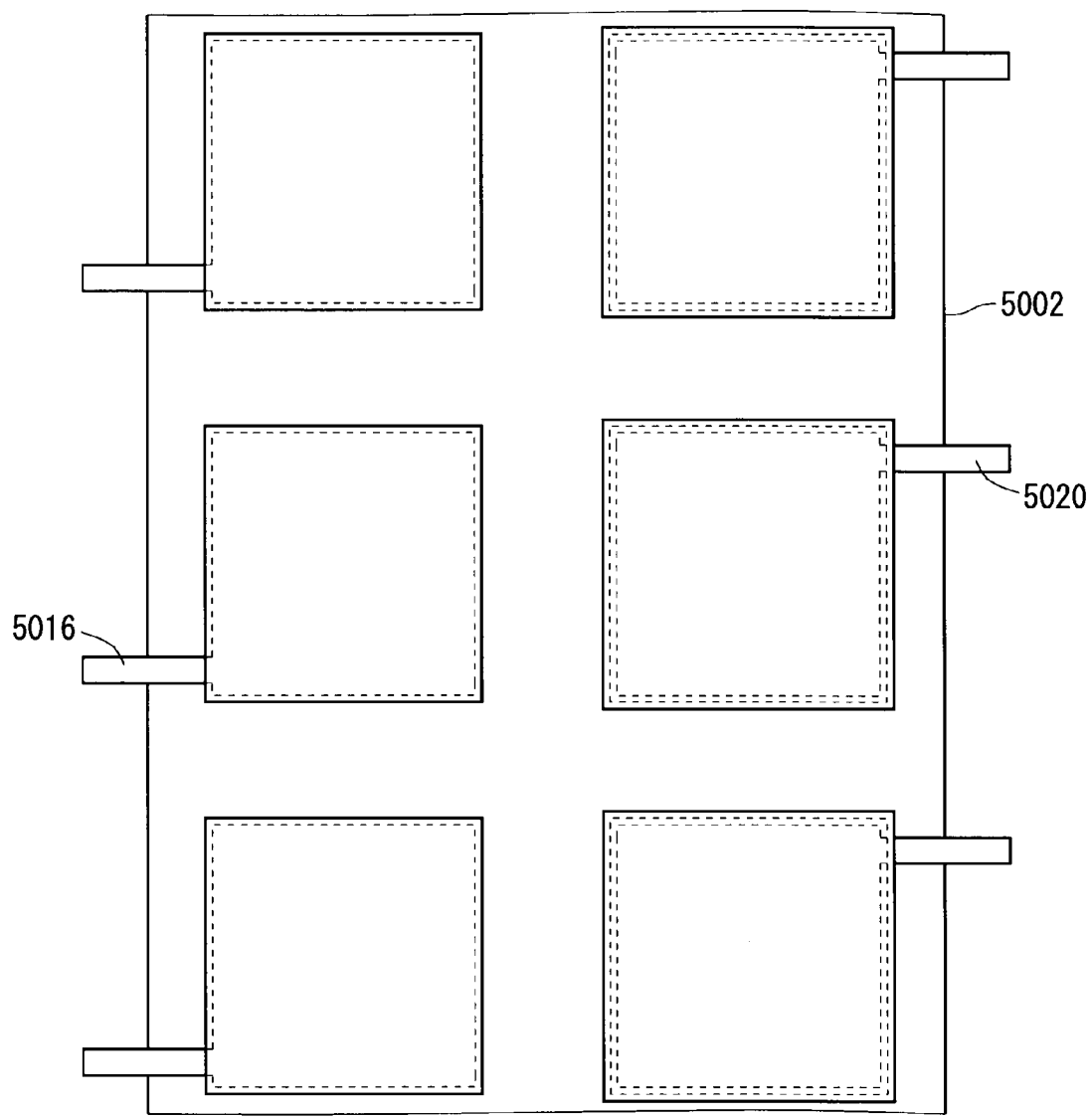
FIG. 37 A plan view showing the method for manufacturing the lithium secondary battery according to the fifth embodiment.

After the addition of the positive electrode active material layer 5006, the electrolyte layer 5008, and the negative electrode active material layer 5010, as shown in FIG. 37, the outer film 5002 is cut. A part of the outer film 5002 located outside the positive electrode side application region 5110 and the negative electrode side application region 5112 is removed, while a portion where the positive electrode terminal 5016 overlaps the outer film 5002 and a portion where the negative electrode terminal 5020 overlaps the outer film 5002 are left. Although it is desirable that the outer film 5002 is cut after the addition of the positive electrode active material layer 5006, the electrolyte layer 5008, and the negative electrode active material layer 5010, it may be cut before the addition of the positive electrode active material layer 5006, the electrolyte layer 5008, and the negative electrode active material layer 5010.

(Application)

Figure 38:
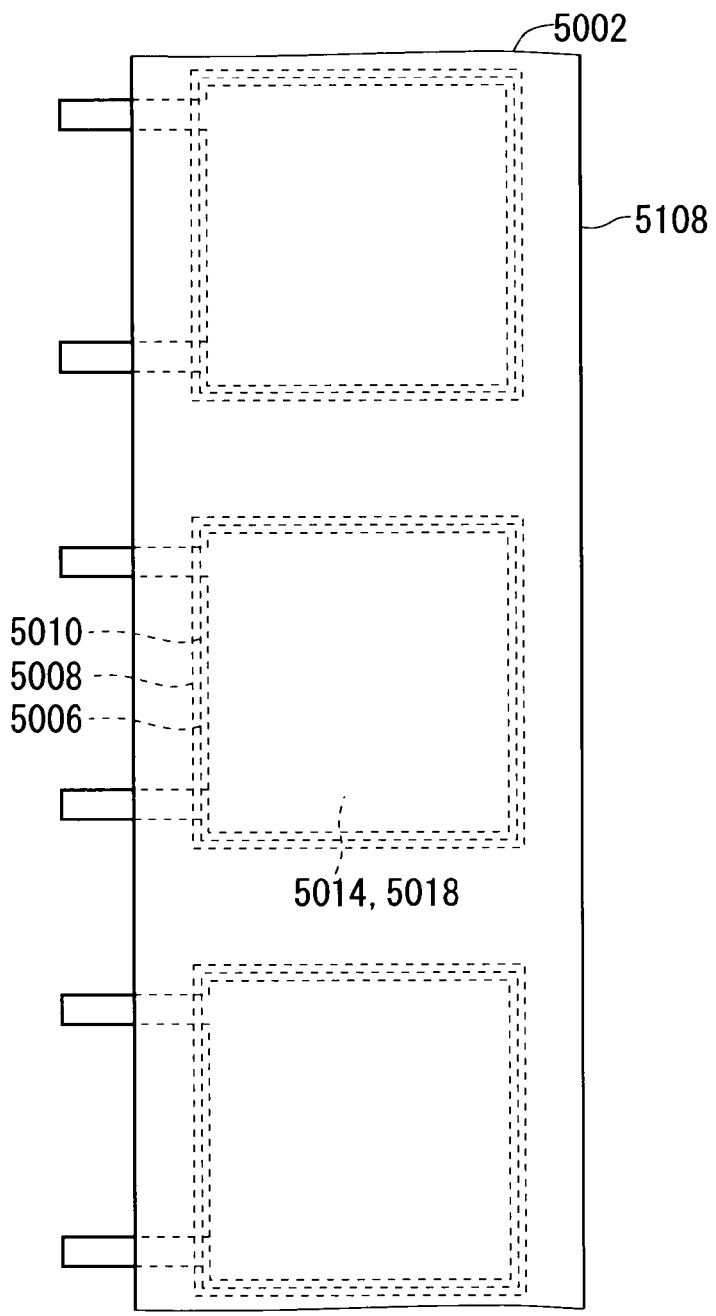
FIG. 38 A plan view showing the method for manufacturing the lithium secondary battery according to the fifth embodiment.

After the positive electrode active material layer 5006, the electrolyte layer 5008, and the negative electrode active material layer 5010 are added to the composite body 5100, and an unnecessary part of the outer film 5002 is removed, as shown in FIG. 38, the outer film 5002 is folded at the position of the fold line 5108 with the bonding surface 5102 on the inside. Then, the positive electrode side application region 5110 and the negative electrode side application region 5112 are applied to each other. At this time, the plane positions of the positive electrode current collector 5014, the positive electrode active material layer 5006, the electrolyte layer 5008, the negative electrode active material layer 5010, and the negative electrode current collector 5018 are aligned with one another.

The application is performed by surface-pressing or roll-pressing (line-pressing). The pressing may be performed at a normal temperature, or may be performed in a heated state.

(Bonding)

Figure 39:
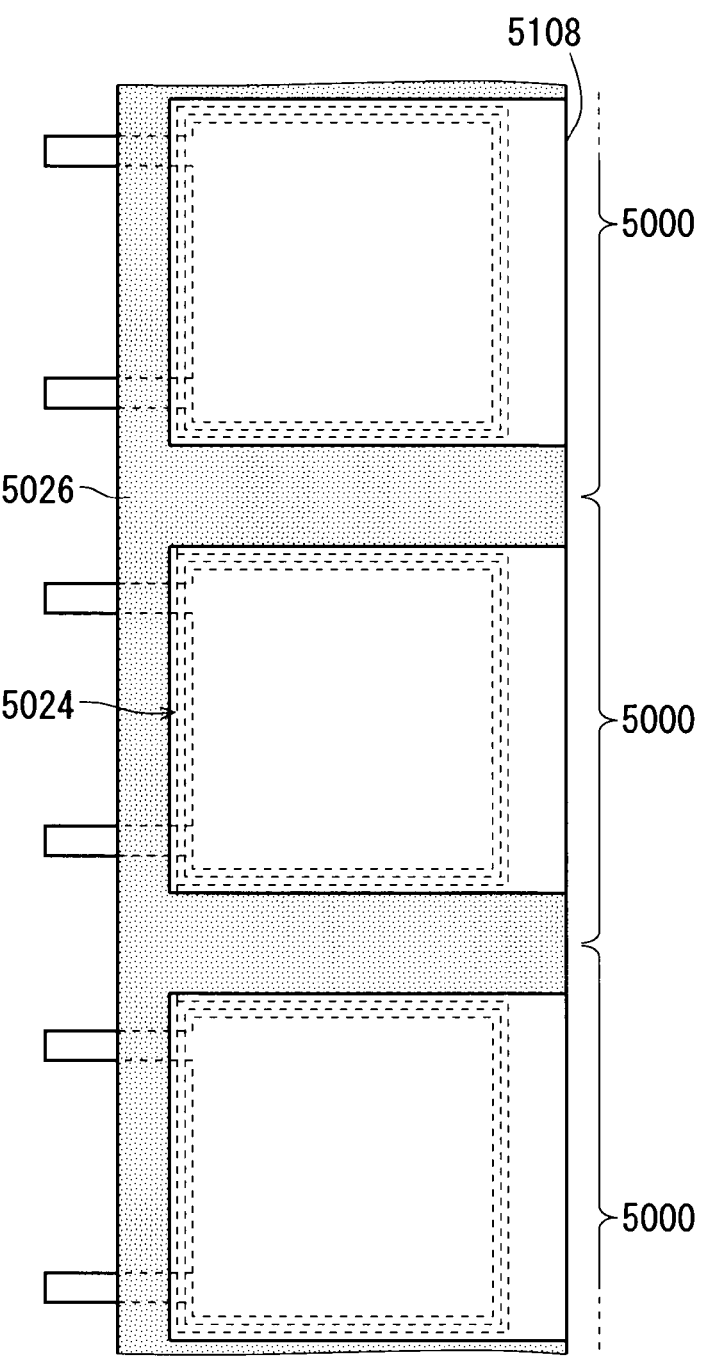
FIG. 39 A plan view showing the method for manufacturing the lithium secondary battery according to the fifth embodiment.

After the application of the positive electrode side application region 5110 to the negative electrode side application region 5112, as shown in FIG. 39, the outer film 5002 is bonded in the bonding region 5026 that extends from an edge of each lithium secondary battery 5000 to the vicinity of an edge of the electrolyte layer 5008 except a region near the fold line 5108. Thus, the cell 5024 is sealed. In a case where a perforation is provided at the position of the fold line 5108, the bonding region 5026 also contains a region extending from the fold line 5108 to the vicinity of the edge of the electrolyte layer 5008. Even in a case where no perforation is provided at the position of the fold line 5108, the bonding region 5026 may contain the region extending from the fold line 5108 to the vicinity of the edge of the electrolyte layer 5008.

(Separation of Lithium Secondary Battery)

After the bonding of the outer film 5002, the continuous lithium secondary batteries 5000 are separated from one another, as needed. Thus, the lithium secondary battery 5000 shown in FIGS. 32 and 33 is completed.

(Advantages)

In the fifth embodiment, the positive electrode side conductive material layer 5004 and the negative electrode side conductive material layer 5012 overlap the outer film 5002. Thus, the positive electrode current collector 5014, the positive electrode terminal 5016, the negative electrode current collector 5018, and the negative electrode terminal 5020 are not easily damaged, even if the thickness thereof is small. This can reduce the thickness and weight of each of the positive electrode side conductive material layer 5004 and the negative electrode side conductive material layer 5012, thus reducing the size and weight of the lithium secondary battery 5000. As a result, the volume energy density and the weight energy density of the lithium secondary battery 5000 are improved.

(Application to Manufacture of Lithium Secondary Battery Including Two or More Cells)

The positive electrode side conductive material layer 5004, the positive electrode active material layer 5006, the electrolyte layer 5008, the negative electrode active material layer 5010, and the negative electrode side conductive material layer 5012 of the fifth embodiment may be identical respectively to the positive electrode side conductive material layer 2004, 3004, or 4004, the positive electrode active material layer 2006, 3006, or 4006, the electrolyte layer 2008, 3008, or 4008, the negative electrode active material layer 2010, 3010, or 4010, and the negative electrode side conductive material layer 2012, 3012, or 4012 of the second, third, or fourth embodiment.

Sixth Embodiment

A sixth embodiment relates to a stacked battery in which two or more lithium secondary batteries are combined, and to a manufacturing method thereof.

Figure 40:
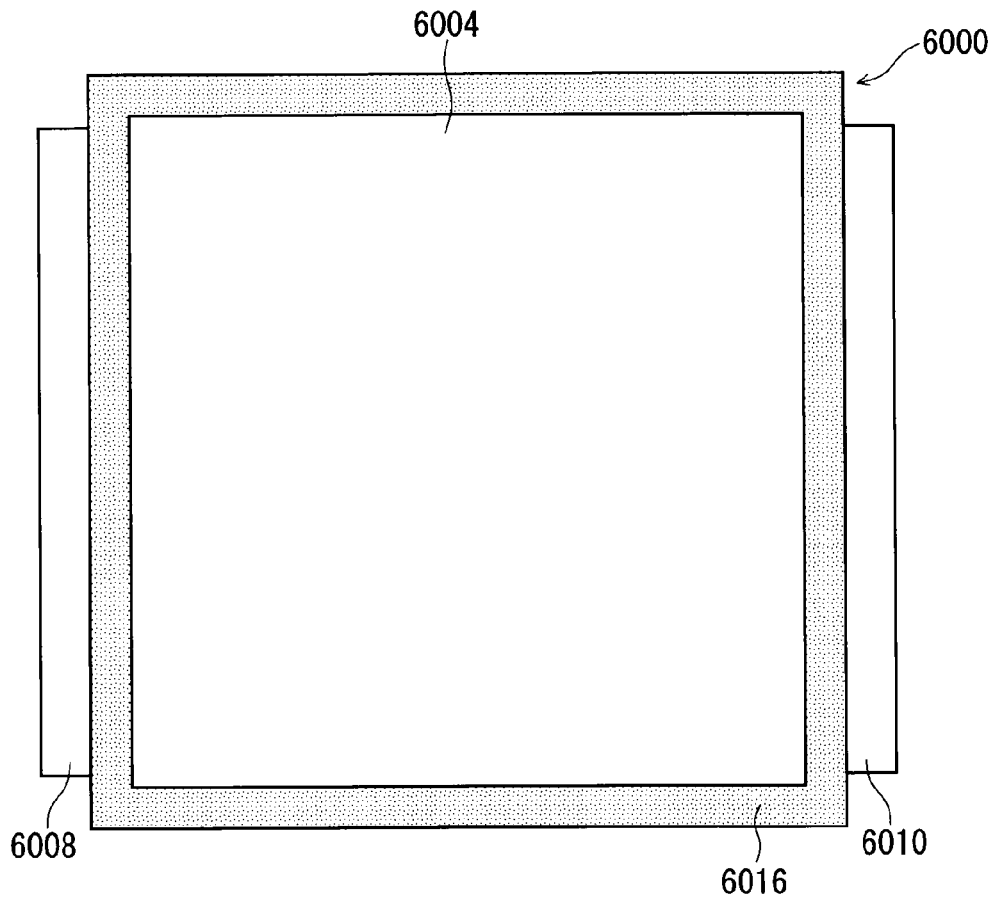
FIG. 40 A plan view of a stacked battery according to a sixth embodiment.
Figure 41:
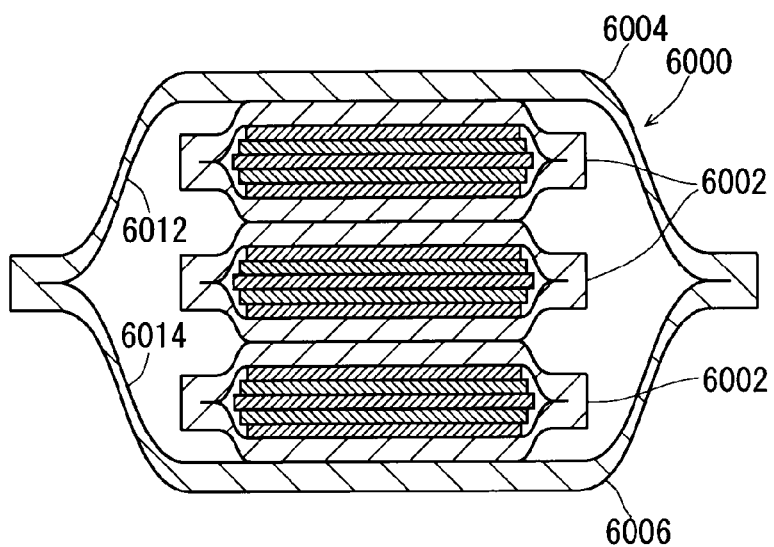
FIG. 41 A cross-sectional view of the stacked battery according to the sixth embodiment.

FIGS. 40 and 41 are diagrams schematically showing the stacked battery according to the sixth embodiment. FIG. 40 is a plan view, and FIG. 41 is a cross-sectional view.

As shown in FIGS. 40 and 41, a stacked battery 6000 includes lithium secondary batteries 6002, an upper outermost film 6004, and a lower outermost film 6006. A positive electrode terminal 6008 and a negative electrode terminal 6010 are exposed to the outside of the stacked battery 6000.

In the manufacture of the stacked battery 6000, a separated lithium secondary battery 6002 is manufactured by any of the manufacturing methods according to the first to fifth embodiments. The lithium secondary batteries 6002 are stacked, and sandwiched between the upper outermost film 6004 and the lower outermost film 6006 while an upper bonding surface 6012 of the upper outermost film 6004 and a lower bonding surface 6014 of the lower outermost film 6006 are placed face to face with each other. The upper outermost film 6004 and the lower outermost film 6006 are bonded to each other in a bonding region 6016 that surrounds the lithium secondary batteries 6002. Thus, the lithium secondary batteries 6002 are sealed with the upper outermost film 6004 and the lower outermost film 6006. The upper outermost film 6004 and the lower outermost film 6006 are bonded to each other in the same manner as the positive electrode side outer film 1002 and the negative electrode side outer film 1014 of the first embodiment. The lithium secondary batteries 6002 may be sealed with a single outermost film being two-folded. In a case where a welding layer of the upper outermost film 6004 and a welding layer of the lower outermost film 6006 are heat-sealed to each other, the upper outermost film 6004 includes not only a barrier layer and the welding layer but also a positive electrode side conductive material layer. The positive electrode side conductive material layer has a positive electrode current collector and the positive electrode terminal 6008. The lower outermost film 6006 includes not only a barrier layer and the welding layer but also a negative electrode side conductive material layer. The negative electrode side conductive material layer has a negative electrode current collector and the negative electrode terminal 6010. The lithium secondary batteries 6002 are connected in series or in parallel.

In the sixth embodiment, a cell is double-sealed, thus improving the sealing performance.

Seventh Embodiment

A seventh embodiment relates to a stacked battery in which two or more lithium secondary batteries are combined, and to a manufacturing method thereof.

Figure 42:
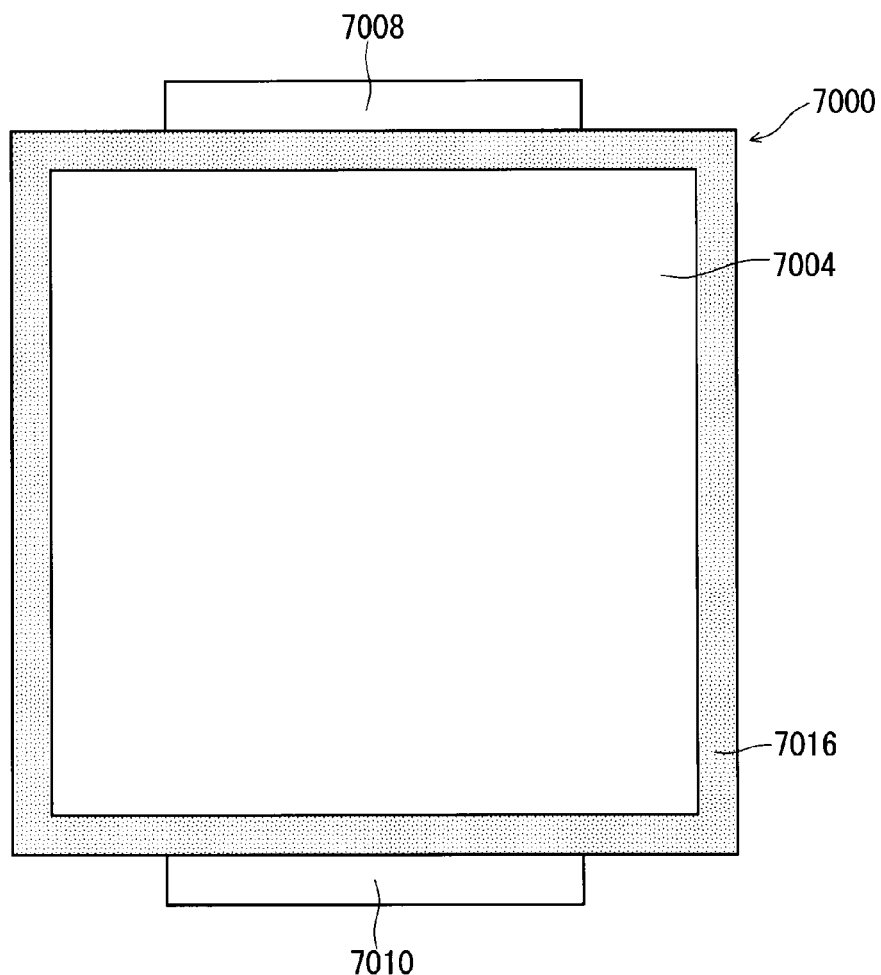
FIG. 42 A plan view of a stacked battery according to a seventh embodiment.
Figure 43:
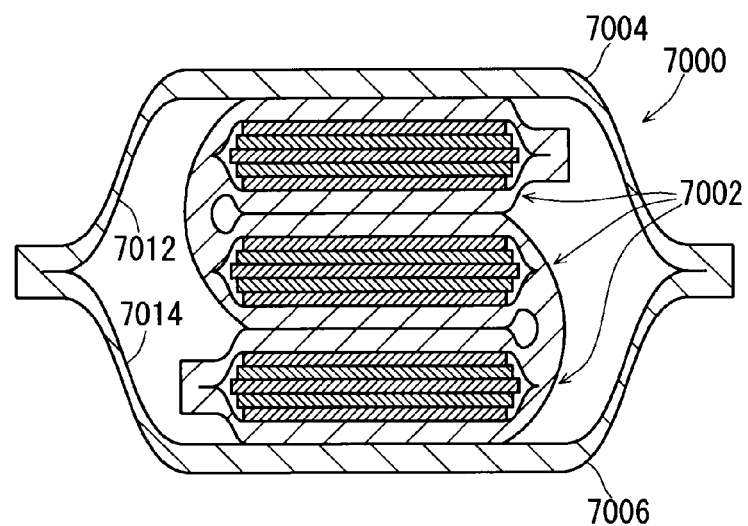
FIG. 43 A cross-sectional view of the stacked battery according to the seventh embodiment.

FIGS. 42 and 43 are diagrams schematically showing the stacked battery according to the seventh embodiment. FIG. 42 is a plan view, and FIG. 43 is a cross-sectional view.

As shown in FIGS. 42 and 43, a stacked battery 7000 includes lithium secondary batteries 7002, an upper outermost film 7004, and a lower outermost film 7006. A positive electrode terminal 7008 and a negative electrode terminal 7010 are exposed to the outside of the stacked battery 7000.

In the manufacture of the stacked battery 7000, continuous lithium secondary batteries 7002 are manufactured by any of the manufacturing methods according to the first to fifth embodiments. The lithium secondary batteries 7002 are stacked while being folded in a zigzag shape, and sandwiched between the upper outermost film 7004 and the lower outermost film 7006 while a upper bonding surface 7012 of the upper outermost film 7004 and a lower bonding surface 7014 of the lower outermost film 7006 are placed face to face with each other. The lower outermost film 7004 and the upper outermost film 7006 are bonded to each other in a bonding region 7016 that surrounds the lithium secondary batteries 7002. Thus, the lithium secondary batteries 7002 are sealed with the upper outermost film 7004 and the lower outermost film 7006. The upper outermost film 7004 and the lower outermost film 7006 are bonded to each other in the same manner as the positive electrode side outer film 1002 and the negative electrode side outer film 1014 of the first embodiment. The lithium secondary batteries 7002 may be sealed with a single outermost film being two-folded. In a case where a welding layer of the upper outermost film 6004 and a welding layer of the lower outermost film 6006 are heat-sealed to each other, the upper outermost film 7004 includes not only a barrier layer and the welding layer but also a positive electrode side conductive material layer. The positive electrode side conductive material layer has a positive electrode current collector and the positive electrode terminal 7008. The lower outermost film 7006 includes not only a barrier layer and the welding layer but also a negative electrode side conductive material layer. The negative electrode side conductive material layer has a negative electrode current collector and the negative electrode terminal 7010. The lithium secondary batteries 7002 are connected in series or in parallel.

In the seventh embodiment, a cell is double-sealed, thus improving the sealing performance.

Eighth Embodiment

An eighth embodiment relates to the positive electrode active material layer, the electrolyte layer, and the negative electrode active material layer according to the first to fifth embodiments, and a method for forming them.

FIGS. 44 to 49 are diagrams schematically showing a method for forming the positive electrode active material layer, the electrolyte layer, and the negative electrode active material layer according to the eighth embodiment. FIGS. 44 to 49 are cross-sectional views.

(Preparation of Positive Electrode Active Material Substance, Electrolyte Substance, and Negative Electrode Active Material Substance)

Prior to forming a positive electrode active material layer 8004, an electrolyte layer 8014, and a negative electrode active material layer 8010, a positive electrode active material substance, an electrolyte substance, and a negative electrode active material substance are prepared. The positive electrode active material substance is a mixture of a pre-crosslinked precursor of a lithium-ion-conducting polymer electrolyte and a positive electrode active material. The electrolyte substance is a pre-crosslinked precursor of a lithium-ion-conducting polymer electrolyte. The negative electrode active material substance is a mixture of a pre-crosslinked precursor of a lithium-ion-conducting polymer electrolyte and a negative electrode active material.

The pre-crosslinked precursor of the lithium-ion-conducting polymer electrolyte contained in the positive electrode active material substance and the negative electrode active material substance also serves as a binder. Here, a binder different from this pre-crosslinked precursor, such as polyvinylidene fluoride (PVdF) or styrene-butadiene rubber (SBR), may be additionally mixed into the positive electrode active material substance and the negative electrode active material substance.

A conductive aid may be mixed into the positive electrode active material substance and the negative electrode active material substance. This improves the electron conductivity of the positive electrode active material layer 8004 and the negative electrode active material layer 8010.

A solvent may be mixed into the positive electrode active material substance, the electrolyte substance, and the negative electrode active material substance. This gives flowability to the positive electrode active material substance, the electrolyte substance, and the negative electrode active material substance, to make it easy to print the positive electrode active material substance, the electrolyte substance, and the negative electrode active material substance. After the positive electrode active material substance, the electrolyte substance, and the negative electrode active material substance are printed, the solvent mixed into the positive electrode active material substance, the electrolyte substance, and the negative electrode active material substance is vaporized by infrared light irradiation, hot-air blasting, or the like.

A viscosity modifier may be mixed into the electrolyte substance.

(Formation of Positive Electrode Active Material Layer)

Figure 44:
FIG. 44 A cross-sectional view showing a method for forming a positive electrode active material layer, an electrolyte layer, and a negative electrode active material layer according to an eighth embodiment.

After the preparation of the positive electrode active material substance, as shown in FIG. 44, the positive electrode active material substance is printed with the plane position thereof being aligned with that of a positive electrode current collector 8000, so that a positive electrode active material precursor layer 8002 is formed. Before the positive electrode active material precursor layer 8002 is formed, a conductive undercoating material may be applied to the positive electrode current collector 8000. This improves the adhesiveness between the positive electrode current collector 8000 and the positive electrode active material precursor layer 8002, thus improving the adhesiveness between the positive electrode current collector 8000 and the positive electrode active material layer 8004.

Figure 45:
FIG. 45 A cross-sectional view showing the method for forming the positive electrode active material layer, the electrolyte layer, and the negative electrode active material layer according to the eighth embodiment.

After the positive electrode active material precursor layer 8002 is formed, the positive electrode active material precursor layer 8002 is subjected to a crosslinking process, so that the positive electrode active material precursor layer 8002 is transformed into the positive electrode active material layer 8004, as shown in FIG. 45. After the positive electrode active material precursor layer 8002 is subjected to the crosslinking process, the positive electrode active material layer 8004 may be pressed in its thickness direction. This improves the packing density of the positive electrode active material, and improves the surface smoothness of the positive electrode active material layer 8004.

(Formation of Negative Electrode Active Material Layer)

Figure 46:
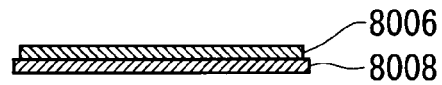
FIG. 46 A cross-sectional view showing the method for forming the positive electrode active material layer, the electrolyte layer, and the negative electrode active material layer according to the eighth embodiment.

After the preparation of the negative electrode active material substance, as shown in FIG. 46, the negative electrode active material substance is printed with the plane position thereof being aligned with that of a negative electrode current collector 8006, so that a negative electrode active material precursor layer 8008 is formed. Before the negative electrode active material precursor layer 8008 is formed, a conductive undercoating material may be applied to the negative electrode current collector 8006. This improves the adhesiveness between the negative electrode current collector 8006 and the negative electrode active material precursor layer 8008, thus improving the adhesiveness between the negative electrode current collector 8006 and the negative electrode active material layer 8010.

Figure 47:
FIG. 47 A cross-sectional view showing the method for forming the positive electrode active material layer, the electrolyte layer, and the negative electrode active material layer according to the eighth embodiment.

After the negative electrode active material precursor layer 8008 is formed, the negative electrode active material precursor layer 8008 is subjected to a crosslinking process, so that the negative electrode active material precursor layer 8008 is transformed into the negative electrode active material layer 8010, as shown in FIG. 47. After the negative electrode active material precursor layer 8008 is subjected to the crosslinking process, the negative electrode active material layer 8010 may be pressed in its thickness direction. This improves the packing density of the negative electrode active material, and improves the surface smoothness of the negative electrode active material layer 8010.

(Formation of Electrolyte Layer)

Figure 48:
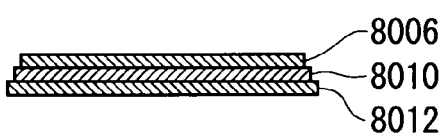
FIG. 48 A cross-sectional view showing the method for forming the positive electrode active material layer, the electrolyte layer, and the negative electrode active material layer according to the eighth embodiment.

After the preparation of the electrolyte substance and after the formation of the negative electrode active material layer 8010, as shown in FIG. 48, the electrolyte substance is printed with the plane position thereof being aligned with that of the negative electrode current collector 8006 and the negative electrode active material layer 8010, so that an electrolyte precursor layer 8012 is formed. Here, the electrolyte substance may be printed with the plane position thereof being aligned with that of the positive electrode current collector 8000 and the positive electrode active material layer 8004, after the preparation of the electrolyte substance and after the formation of the positive electrode active material layer 8004.

Figure 49:
FIG. 49 A cross-sectional view showing the method for forming the positive electrode active material layer, the electrolyte layer, and the negative electrode active material layer according to the eighth embodiment.

After the electrolyte precursor layer 8012 is formed, the electrolyte precursor layer 8012 is subjected to a crosslinking process, so that the electrolyte precursor layer 8012 is transformed into the electrolyte layer 8014, as shown in FIG. 49. After the electrolyte precursor layer 8012 is subjected to the crosslinking process, the electrolyte layer 8014 may be pressed in its thickness direction. This improves the surface smoothness of the electrolyte layer 8014.

The positive electrode active material layer 8004 serves as the positive electrode active material layers 1006, 2006, 3006, 4006, and 5006 according to the first to fifth embodiments. The electrolyte layer 8014 serves as the electrolyte layers 1008, 2008, 3008, 4008, and 5008 according to the first to fifth embodiments. The negative electrode active material layer 8010 serves as the negative electrode active material layers 1010, 2010, 3010, 4010, and 5010 according to the first to fifth embodiments.

(Crosslinking Process)

The crosslinking process is performed for crosslinking the pre-crosslinked precursor of the lithium-ion-conducting polymer electrolyte.

It is not essential that the positive electrode active material precursor layer 8002, the electrolyte precursor layer 8012, and the negative electrode active material precursor layer 8008 are separated subjected to the crosslinking process. Two or three layers among them may be simultaneously subjected to the crosslinking process.

Examples of the crosslinking process include electron beam irradiation crosslinking, ultraviolet light irradiation crosslinking, and chemical (peroxide) crosslinking. Desirably, the crosslinking process is performed by means of the electron beam irradiation crosslinking. The electron beam irradiation crosslinking enables the crosslinking process to be completed in a short time. Additionally, in the electron beam irradiation crosslinking, an electron beam penetrates deep into the positive electrode active material precursor layer 8002, the electrolyte precursor layer 8012, and the negative electrode active material precursor layer 8008, and the crosslinking process is uniformly performed. Moreover, the electron beam irradiation crosslinking is unlikely to cause an impurity that damages the lithium ion conductivity, such as a decomposition product of peroxide.

(Planar Shapes of Positive Electrode Active Material Layer, Electrolyte Layer, and Negative Electrode Active Material Layer)

Desirably, the planar shape of the positive electrode active material layer 8004 is slightly larger than the planar shape of the positive electrode current collector 8000. This can ensure that the positive electrode current collector 8000 is covered with the positive electrode active material layer 8004 when the plane positions of the positive electrode active material layer 8004 and the positive electrode current collector 8000 are aligned with each other. However, the planar shape of the positive electrode active material layer 8004 may be the same as the planar shape of the positive electrode current collector 8000.

Desirably, the planar shape of the negative electrode active material layer 8010 is slightly larger than the planar shape of the negative electrode current collector 8006. This can ensure that the negative electrode current collector 8006 is covered with the negative electrode active material layer 8010 when the plane positions of the negative electrode active material layer 8010 and the negative electrode current collector 8006 are aligned with each other. However, the planar shape of the negative electrode active material layer 8010 may be the same as the planar shape of the negative electrode current collector 8006.

Desirably, the planar shape of the electrolyte layer 8014 is slightly larger than the planar shapes of the positive electrode current collector 8000, the positive electrode active material layer 8004, the negative electrode active material layer 8010, and the negative electrode current collector 8006. This can ensure that the positive electrode side and the negative electrode side are insulated from each other. However, the planar shape of the electrolyte layer 8014 may be the same as the planar shapes of all or part of the positive electrode current collector 8000, the positive electrode active material layer 8004, the negative electrode active material layer 8010, and the negative electrode current collector 8006.

(Printing)

The positive electrode active material substance, the electrolyte substance, and the negative electrode active material substance are printed by a flexography method, a soft lithography method, a gravure method, an offset lithography method, a screen method, a rotary screen method, an ink-jet method, a comma reverse method, a comma direct method, a die coating method, a lip coating method, or the like. Desirably, the positive electrode active material substance, the electrolyte substance, and the negative electrode active material substance are printed by the screen method or the rotary screen method. This is because the screen method or the rotary screen method can easily form a thick film, and therefore the positive electrode active material precursor layer 8002, the electrolyte precursor layer 8012, and the negative electrode active material precursor layer 8008 are formed at a high speed.

(Pre-Crosslinked Precursor of Lithium-Ion-Conducting Polymer Electrolyte)

The pre-crosslinked precursor of the lithium-ion-conducting polymer electrolyte is a mixture of a lithium salt and a matrix component that will become a matrix after the crosslinking. Although no limitation is put on a polymer of the matrix component, desirable first and second examples thereof will be described later. The lithium salt is selected from $LiPF_6$, $LiClO_4$, $LiBF_4$, $LiN(CF_3SO_2)_2$, $LiN(CF_3CF_2SO_2)_2$, $LiCF_3SO_3$, $LiN(FSO_2)_2$, and the like. While it is desirable to adopt a polymer electrolyte that requires a crosslinking process, a polymer electrolyte that does not require a crosslinking process may be adopted. In a case of adopting a polymer electrolyte that does not require a crosslinking process, the crosslinking process is omitted. Thus, the positive electrode active material layer, the electrolyte layer, and the negative electrode active material layer are formed without undergoing the positive electrode active material precursor layer, the electrolyte precursor layer, and the negative electrode active material precursor layer.

(Example of Matrix Component)

A first example of the matrix component includes a polyalkylene oxide and a polyalkylene carbonate. The polyalkylene oxide includes a polyethylene oxide, a polypropylene oxide, a copolymer of an ethylene oxide and a polypropylene oxide, and the like. The polyalkylene carbonate includes a polyethylene carbonate, a polypropylene carbonate, a copolymer of an ethylene carbonate and a propylene carbonate, and the like.

Desirably, a hyperbranched polymer (hereinafter, simply referred to as "hyperbranched polymer") having a branched molecular chain that includes a polyalkylene oxide chain is mixed with a base polymer such as a polyalkylene oxide or a polyalkylene carbonate. This suppresses occurrence of crystallization of the base polymer at a low temperature, and thus improves the lithium-ion conductivity at a low temperature.

The polyalkylene oxide chain is a molecular chain in which an alkylene group and ether oxygen are alternately arranged. The polyalkylene oxide chain may contain a substituent group. Typically, the polyalkylene oxide chain is a polyethylene oxide chain. An end group of the hyperbranched polymer may be a non-crosslinking group such as a acetyl group, or may be a crosslinking group such as an acryloyl group, a methacryloyl group, a vinyl group, or an allyl group.

Desirably, the hyperbranched polymer is such a polymer that an end group of a polymer, that is obtained by causing a hydroxyl group of a monomer indicated by the chemical formula (1) to react with A, is a crosslinking group or a non-crosslinking group. In the monomer indicated by the chemical formula (1), two molecular chains each having a hydroxyl group as an end group and each including a polyalkylene oxide chain, and one molecular chain having A that is reactive with the hydroxyl group as an end group, extend from X.

[Chemical Formula 1]

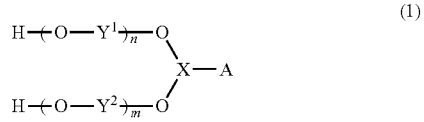

In the chemical formula (1), the valence of X is a trivalent group. $Y^1$ and $Y^2$ are alkylene groups. m and n are integers equal to or greater than zero. Here, in a case where X does not include a polyalkylene oxide chain, at least one of m and n is an integer equal to or greater than one.

In the chemical formula (1) A is desirably an acid group such as a carboxyl group, a sulfate group, a sulfo group, and a phosphate group; a group resulting from alkyl-esterification of the acid group; a group resulting from chlorination of the acid group; or a glycidyl group, for example. More desirably, A is a group resulting from alkyl-esterification of the acid group. Particularly desirably, A is a group resulting from alkyl-esterification of the carboxyl group. This is because, if A is a group resulting from alkyl-esterification of the acid group, a hydroxyl group can easily react with A due to an ester exchange reaction.

Desirably, the ester exchange reaction is performed in the presence of a catalyst made of an organic tin compound such as tributyltin chloride, triethyltin chloride, or dichlorobutyltin, or a catalyst made of an organic titanium compound such as isopropyl titanate, and performed in a nitrogen stream, and performed at a temperature of 100 to 250° C. However, the synthesis may be made by another method.

Desirably, introduction of the polyalkylene oxide chain is made by adding the polyalkylene oxide chain to the hydroxyl group of the precursor in the presence of a catalyst made of a base such as a potassium carbonate. However, the synthesis may be made by another method.

In the chemical formula (1), X is desirably a group indicated by the chemical formula (2), which includes three molecular chains extending from Q and containing $Z^1$, $Z^2$, and $Z^3$. In the chemical formula (2), Q is a methine group, an aromatic ring system, or an aliphatic ring system, and each of $Z^1$, $Z^2$, and $Z^3$ is an alkylene group or a polyalkylene oxide chain. The alkylene group or the polyalkylene oxide chain may contain a substituent group. $Z^1$, $Z^2$, and $Z^3$ may be entirely or partially omitted.

[Chemical Formula 2]

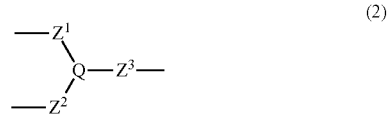

Desirably, the hyperbranched polymer is such a polymer that an end group of a polymer, that is obtained by binding a carbonyl group with the polyalkylene oxide chain in constituting units indicated by the chemical formula (3), is a crosslinking group or a non-crosslinking group. In the chemical formula (3), m and n are desirably 1 to 20. The synthesis of this polymer is made by polymerizing an ethylene oxide adduct of 3,5-dihydroxybenzoic acid or a derivative thereof, such as an ethylene oxide adduct of 3,5-dihydroxybenzoic acid methyl, and introducing a crosslinking group or a non-crosslinking group as an end group.

[Chemical Formula 3]

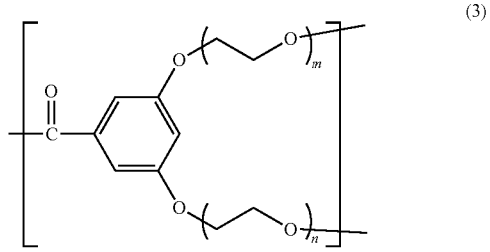

(3)

In a case where a hyperbranched polymer whose end group is wholly or partially a crosslinking group is mixed with the base polymer, it is desirable that a crosslink control agent such as polyethylene oxide methacrylate (PEOMA), polyethylene oxide acrylate (PEOA), or polyethylene oxide diacrylate (PEODA) is mixed with the base polymer. This suppresses reduction of the lithium-ion-conductivity which would be caused by crosslinking.

(Second Example of Matrix Component)

A second example of the matrix component is a mixture of a hyperbranched polymer whose end group is partially or wholly a crosslinking group, a crosslinkable ethylene oxide multicomponent copolymer, and an unreactive polyalkylene glycol. As a result of performing the crosslinking process on the second example of the matrix component, a matrix 8302 is obtained as shown in a schematic diagram of FIG. 50. The matrix 8302 has a microstructure in which an unreactive polyalkylene glycol 8310 is held on a co-crosslinked body 8308 obtained by chemically crosslinking a hyperbranched polymer 8304 having a branched molecular chain that includes a polyalkylene oxide chain and a crosslinkable ethylene oxide multicomponent copolymer 8306. The co-crosslinked body 8308 include at least a crosslinking point 8312 at which the hyperbranched polymer 8304 is chemically crosslinked with the crosslinkable ethylene oxide multicomponent copolymer 8306, but may include a crosslinking point 8313 at which the hyperbranched polymers 8304 are chemically crosslinked with each other, or may include a crosslinking point 8314 at which the crosslinkable ethylene oxide multicomponent copolymers 8306 are chemically crosslinked with each other. The unreactive polyalkylene glycol 8310 is held mainly on a portion corresponding to the hyperbranched polymer 8304.

Figure 51:
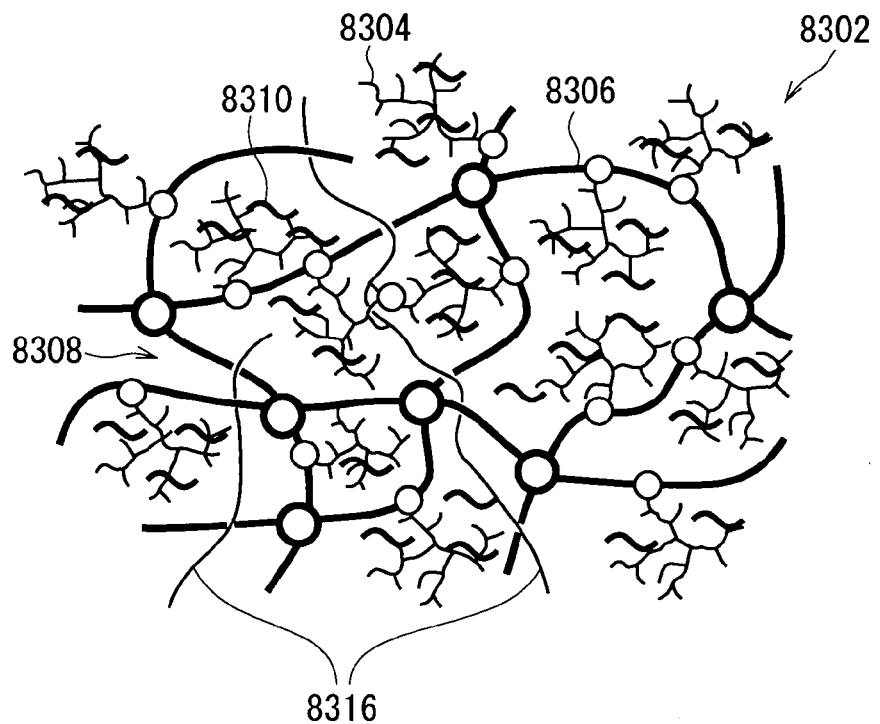
FIG. 51 A diagram schematically showing the matrix according to the eighth embodiment.

A non-crosslinkable ethylene oxide homopolymer may be additionally mixed with the matrix component. As a result of performing the crosslinking process on the matrix component having the non-crosslinkable ethylene oxide homopolymer additionally mixed therein, as shown in a schematic diagram of FIG. 51, a non-crosslinkable ethylene oxide homopolymer 8316 is physically crosslinked with the co-crosslinked body 8308. Here, the term "physically crosslinking" means entangling molecular chains with each other without forming a chemical crosslink by chemical coupling.

The hyperbranched polymer is the same of the hyperbranched polymer described in the first example of the matrix.

The crosslinkable ethylene oxide multicomponent copolymer is a multicomponent copolymer of two or more kinds of monomers including an ethylene oxide and a glycidyl ether having a crosslinking group.

Desirably, the crosslinkable polyethylene oxide multicomponent copolymer is a binary copolymer of an ethylene oxide and a glycidyl ether having a crosslinking group. This binary copolymer is a binary copolymer in which constituting units indicated by the chemical formulas (4) and (5) are irregularly arranged. In the chemical formula (5), R1 is a crosslinking group, and desirably is an alkenyl group, and more desirably is an allyl group.

[Chemical Formula 4]

(4)

[Chemical Formula 5]

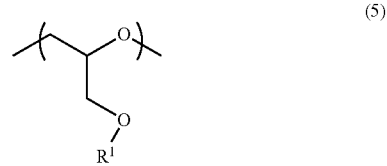

(5)

The crosslinkable ethylene oxide multicomponent copolymer may be a ternary copolymer of an ethylene oxide, a glycidyl ether having a crosslinking group, and an alkylene oxide other than the ethylene oxide. This ternary copolymer is a ternary copolymer in which a constituting unit indicated by the chemical formula (6) in addition to the constituting units indicated by the chemical formulas (4) and (5) are irregularly arranged. In the chemical formula (6), $R^2$ is an alkyl group having a carbon number of 1 to 2.

[Chemical Formula 6]

(6)

Both ends of a molecular chain of the unreactive polyalkylene glycol are sealed with unreactive end groups. Here, the term "unreactive" means not reacting with other elements of the matrix component and not hindering movement of lithium ion. Accordingly, reduction of the mobility of the molecular chain of the unreactive polyalkylene glycol, which would be caused if the unreactive polyalkylene glycol is crosslinked, is suppressed. Thus, hindering of lithium ion conduction by the unreactive polyalkylene glycol is suppressed.

The unreactive polyalkylene glycol is an ethylene oxide homopolymer, a polypropylene oxide homopolymer, a binary copolymer of an ethylene oxide and a polypropylene oxide, or the like, and has a molecular chain including an oligo alkylene glycol chain.

The end group is selected from an alkyl group, a cycloalkyl group, an alkyl ester group, and the like having a carbon number of 1 to 7.

It is desirable that the unreactive polyalkylene glycol is an oligomer indicated by the chemical formula (7).

[Chemical Formula 7]

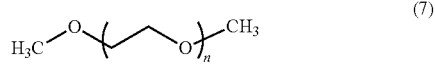

(7)

Figure 50:
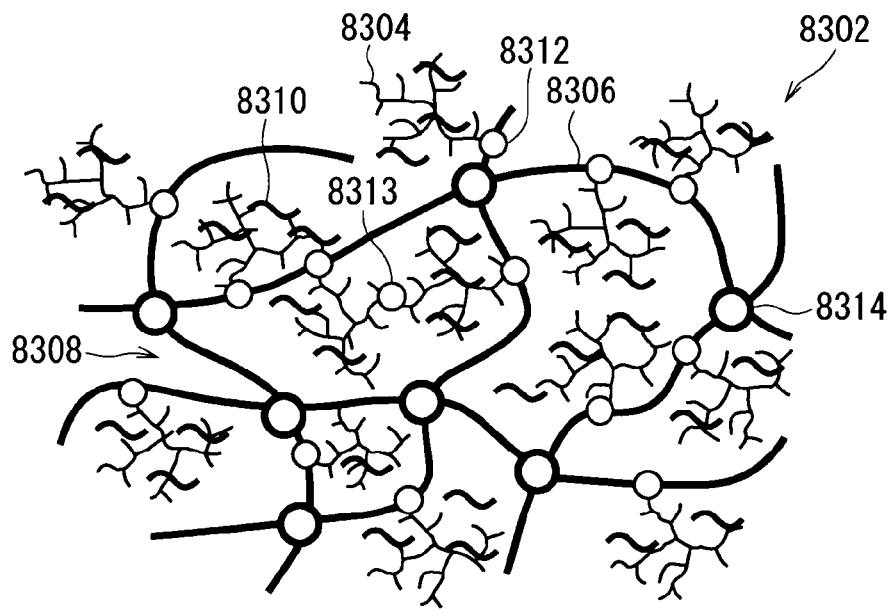
FIG. 50 A diagram schematically showing a matrix according to the eighth embodiment.

FIG. 50 shows a state where the unreactive polyalkylene glycol 8310 having a straight-chain shape is held on the co-crosslinked body 8308. Instead of the unreactive polyalkylene glycol 8310 having a straight-chain shape, an oligomer having a branched molecular chain that includes an oligo alkylene glycol chain may be held on the co-crosslinked body 8308. Needless to say, all ends of this oligomer are sealed with unreactive end groups.

The non-crosslinkable ethylene oxide homopolymer is a homopolymer in which the constituting units indicated by the chemical formula (8) are arranged.

[Chemical Formula 8]

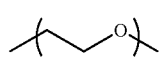

(8)

Instead of the non-crosslinkable ethylene oxide homopolymer, or in addition to the non-crosslinkable ethylene oxide homopolymer, a non-crosslinkable ethylene oxide multicomponent copolymer not having any crosslinking group that reacts with the crosslinking group of the hyperbranched polymer may be physically crosslinked with the co-crosslinked body.

The non-crosslinkable ethylene oxide multicomponent copolymer is a multicomponent copolymer of two or more kinds of monomers including an ethylene oxide and an alkylene oxide (for example, an alkylene oxide having a carbon number of 3 to 4) other than the ethylene oxide.

It is desirable that the non-crosslinkable ethylene oxide multicomponent copolymer is a binary copolymer in which constituting units indicated by the chemical formula (9), in addition to the constituting units indicated by the chemical formula (8), are irregularly arranged. In the chemical formula (9), $R^1$ is an alkyl group having a carbon number of 1 to 2, and desirably is a methyl group.

[Chemical Formula 9]

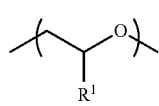

(9)

(Positive Electrode Active Material, Negative Electrode Active Material, and Conductive Aid)

The lithium secondary batteries 1000, 2000, 3000, 4000, and 5000 according to the first to fifth embodiments are lithium ion batteries.

Accordingly, the positive electrode active material is a substance that allows insertion/desorption of lithium ion. For example, the positive electrode active material is a bedded-salt type compound such as $LiCoO_2$ or $LiNiO_2$, a spinel compound such as $LiMn_2O_4$, or a polyanion compound such as $LiFePO_4$ or $LiMn_xFe_{1-x}PO_4$.

The negative electrode active material is a substance that allows insertion/desorption of lithium ion at a potential lower than that of the positive electrode active material. For example, the negative electrode active material is carbon, graphite, a spinel compound of $Li_4Ti_5O_{12}$ or the like, Si, Si alloy system, Sn, or Sn alloy system.

The conductive aid is powder or fibers of a conductive substance. For example, the conductive aid is conductive carbon powder of carbon black or the like, or conductive carbonfibers such as carbon nanofibers or carbon nanotubes. When called under a name derived from a manufacturing method, a starting material, or the like, the conductive carbon powder is, called "furnace black", "channel black", "acetylene black", or "thermal black", for example.

(Advantages)

In the eighth embodiment, the positive electrode active material layer 8004, the electrolyte layer 8014, and the negative electrode active material layer 8010 are formed by printing. Thus, the productivity of the lithium secondary battery is improved. Additionally, an all-solid-state lithium polymer secondary battery is prepared.

Ninth Embodiment

A ninth embodiment relates to a method for forming an electrolyte layer as an alternative to the method for forming the electrolyte layer according to the eighth embodiment.

FIGS. 52 to 55 are diagrams schematically showing the method for forming the electrolyte layer according to the ninth embodiment. FIGS. 52 to 55 are cross-sectional views.

Figure 52:
FIG. 52 A cross-sectional view showing a method for forming an electrolyte layer according to a ninth embodiment.
Figure 53:
FIG. 53 A cross-sectional view showing the method for forming the electrolyte layer according to the ninth embodiment.

After the positive electrode active material layer 8004 is formed similarly to the eighth embodiment, as shown in FIG. 52, an electrolyte substance is printed with the plane position thereof being aligned with those of the positive electrode current collector 8000 and the positive electrode active material layer 8004, so that a positive electrode side electrolyte precursor layer 8012a is formed. After the positive electrode side electrolyte precursor layer 8012a is formed, the positive electrode side electrolyte precursor layer 8012a is subjected to a crosslinking process, so that the positive electrode side electrolyte precursor layer 8012a is transformed into a positive electrode side electrolyte layer 8014a, as shown in FIG. 53.

Figure 54:
FIG. 54 A cross-sectional view showing the method for forming the electrolyte layer according to the ninth embodiment.
Figure 55:
FIG. 55 A cross-sectional view showing the method for forming the electrolyte layer according to the ninth embodiment.

After the negative electrode active material layer 8010 is formed similarly to the eighth embodiment, as shown in FIG. 54, an electrolyte substance is printed with the plane position thereof being aligned with those of the negative electrode current collector 8006 and the negative electrode active material layer 8010, so that a negative electrode side electrolyte precursor layer 8012b is formed. After the negative electrode side electrolyte precursor layer 8012b is formed, the negative electrode side electrolyte precursor layer 8012b is subjected to a crosslinking process, so that the negative electrode side electrolyte precursor layer 8012b is transformed into a negative electrode side electrolyte layer 8014b, as shown in FIG. 55.

The positive electrode side electrolyte layer 8014a and the negative electrode side electrolyte layer 8014b are bonded to and integrated with each other, thus serving as the electrolyte layer 1008, 2008, 3008, 4008, or 5008 according to the first to fifth embodiments.

Tenth Embodiment

A tenth embodiment relates to the positive electrode side conductive material layer and the negative electrode side conductive material layer according to the first to fifth embodiments, and a method for forming them.

(First Example of Formation Method)

Desirably, the positive electrode side conductive material layers 1004, 2004, 3004, 4004, 5004, and the negative electrode side conductive material layers 1012, 2012, 3012, 4012, 5012 (hereinafter, simply referred to as "conductive material layer") are formed by printing (applying), to a surface on which a conductor should be formed, a paste (ink) containing a dispersion of particles of a conductor (such as a metal or an alloy) (filler). In the conductive material layer that is formed by the first example of the formation method, the thickness widely ranges. By the first example of the formation method, the conductive material layer having a thickness of 0.1 to 20 µm is suitably formed. The first example of the formation method contributes improvement of the productivity of the lithium secondary battery.

The paste is printed by a flexography method, a soft lithography method, a gravure method, an offset lithography method, a screen method, a rotary screen method, an ink-jet method, a comma reverse method, a comma direct method, a die coating method, a rip coating method, or the like. Desirably, the paste is printed by the screen method or the rotary screen method. This is because the screen method or the rotary screen method can easily form a thick film, and therefore the conductive material layer is formed at a high speed.

(Second Example of Formation Method)

The conductive material layer may be formed by stacking a conductor foil of a metal, an alloy, or the like, to a surface on which the conductive material layer should be formed. In the second example of the formation method, the conductive material layer having a thickness of 5 to 20 µm is suitably formed. In the second example of the formation method, a foil having been processed into a final planar shape may be stacked to the surface on which the conductive material layer should be formed, or alternatively a foil not processed into a final planar shape may be stacked to a surface on which the conductive material layer should be formed and then the foil may be processed into the final planar shape by dry etching or wet etching (Third Example of Formation Method)

The conductive material layer may be formed by vapor-depositing or sputtering a conductor film of a metal, an alloy, or the like, to a surface on which the conductive material layer should be formed. In the third example of the formation method, the conductive material layer having a relatively small thickness of 0.1 to 1 µm is suitably formed. In the third example of the formation method, a mask (mold frame) may be used to vapor-deposit or sputter a film having a final planar shape to a surface on which the conductive material layer should be formed, or alternatively a film not having a final planar shape may be vapor-deposited or sputtered to a surface on which the conductive material layer should be formed and then the film may be processed into the final planar shape by dry etching or wet etching. The conductive material layer may be formed by a plating method such as an electrolytic plating method or an electroless plating method.

(Fourth Example of Formation Method)

Alternatively, the conductive material layer may be formed by transferring a transfer vapor-deposition film to a surface on which the conductive material layer should be formed. In the fourth example of the formation method, the conductive material layer having a moderate thickness of 0.3 to 3 µm is suitably formed.

(Materials of Positive Electrode Current Collector and Negative Electrode Current Collector)

A material of a conductor for each of the positive electrode current collectors 1016, 2016, 3016, 4016, 5014 (hereinafter, referred to as "positive electrode current collector 1016 etc." and the negative electrode current collectors 1020, 2022, 3022, 4024, 5018 (hereinafter, referred to as "negative electrode current collector 1020 etc.") is selected depending on the positive electrode active material or the negative electrode active material, from a metal such as copper, aluminum, nickel, or titanium, an alloy containing the metal as a main component, a stainless steel, and the like. For example, in a case where the positive electrode active material is lithium-cobaltate-based, aluminum or an aluminum alloy containing aluminum as a main component is selected as the material for the conductor for the positive electrode current collector 1016 etc. In a case where the negative electrode active material is graphite-based, copper or a copper alloy containing copper as a main component is selected as the material of the conductor for the negative electrode current collector 1020 etc. In a case where the negative electrode active material is lithium-titanate-based, aluminum or an aluminum alloy containing aluminum as a main component is selected as the material of the conductor for the negative electrode current collector 1020 etc.

(Materials of Parts Other than Positive Electrode Current Collector and Negative Electrode Current Collector)

Materials of conductors for parts other than the positive electrode current collector 1016 etc. and the negative electrode current collector 1020 etc. are selected from copper, aluminum, nickel, and the like.

It is desirable that the material of the conductor for the part other than the positive electrode current collector 1016 etc. is the same as the material of the conductor for the positive electrode current collector 1016 etc. This enables the positive electrode current collector 1016 etc. and the part other than the positive electrode current collector 1016 etc. to be concurrently formed. Thus, the positive electrode side conductive material layer 1004 etc. can be formed as a continuous layer.

In the same manner, it is desirable that the material of the conductor for the part other than the negative electrode current collector 1020 etc. is the same as the material of the conductor for the negative electrode current collector 1020 etc. This enables the negative electrode current collector 1020 etc. and the part other than the negative electrode current collector 1020 etc. to be concurrently formed. Thus, the negative electrode side conductive material layer 1012 etc. can be formed as a continuous layer.

Eleventh Embodiment

An eleventh embodiment relates to the positive electrode side outer film and the negative electrode side outer film according to the first to fourth embodiments, to the outer film according to the fifth embodiment, and to the barrier film used for the upper outermost film and the lower outermost film according to the sixth and seventh embodiments.

The positive electrode side outer films 1002, 2002, 3002, 4002 (hereinafter, referred to as "positive electrode side outer film 1002 etc."), the negative electrode side outer films 1014, 2014, 3014, 4014 (hereinafter, referred to as "negative electrode side outer film 1014 etc."), the outer film 5002, the upper outermost films 6004, 7004 (hereinafter, referred to as "upper outermost film 6004 etc."), and the lower outermost films 6006, 7006 (hereinafter, referred to as "lower outermost film 6006 etc.") are barrier films having flexibility and barrier properties. The barrier properties means the capability of preventing transmission of moisture vapor, oxygen, and the like, existing in the air.

(Barrier Film Type)

The barrier films include high-barrier films having a moisture vapor transmission rate of $10^1$ to $10^{-2}$ g/m²/day, and super-barrier films having a moisture vapor transmission rate of $10^{-2}$ to $10^{-6}$ g/m²/day.

(Selection of Barrier Film Type)

In the stacked batteries 6000 and 7000, desirably, the positive electrode side outer film 1002 etc., the negative electrode side outer film 1014 etc., and the outer film 5002 are high-barrier films, while the upper outermost film 6004 etc. and the lower outermost film 6006 etc. are super-barrier films. However, in a case where there is a high demand for suppressing transmission of moisture vapor existing in the air, the positive electrode side outer film 1002 etc., the negative electrode side outer film 1014 etc., and the outer film 5002 may be super-barrier films.

In a case where the lithium secondary battery is not sealed with the outermost film, it is desirable that the positive electrode side outer film 1002 etc., the negative electrode side outer film 1014 etc., and the outer film 5002 are super-barrier films. However, in a case where a slight reduction of the barrier properties is allowed, the positive electrode side outer film 1002 etc., the negative electrode side outer film 1014 etc., and the outer film 5002 may be high-barrier films.

(Structure of Barrier Film)

Figure 56:
FIG. 56 A cross-sectional view of a barrier film according to an eleventh embodiment.

As shown in a schematic diagram of FIG. 56, the barrier film is a stack of a barrier layer 10002 and a welding layer 10004. When pressure and heat are applied to a portion where the welding layers 10004 are in contact with each other, the welding layers 10004 are welded (fused) to each other. A low-temperature plasma treatment or the like may be performed on a film surface, to give barrier properties to the film. In this case, an adhesiveless barrier film having no welding layer is obtained.

(Thickness and Material of High-Barrier Film)

Desirably, the high-barrier film has a thickness of 3 to 20 μm. The material of a barrier layer of the high-barrier film may be a plastic such as PET (polyethylene terephthalate), PEN (polyethylene naphthalate), Ny (nylon), PI (polyimide), PC (polycarbonate), PAR (polyarylate), PES (polyether sulfone), PVA (polyvinyl alcohol), and EVOH (ethylene-vinylalcohol copolymer), or may be glass.

(Thickness and Material of Super-Barrier Film)

Desirably, the super-barrier film has a thickness of 20 to 500 μm. The super-barrier film may be a multilayer barrier film having an inorganic layer made of $SiO_2$, DLC (diamond-like carbon), or the like, or may be a multilayer barrier film in which metal foils made of a metal such as aluminum are stacked. An aluminum laminate film which is widely used for a laminate cell is also a super-barrier film. In the aluminum laminate film, generally, a layer made of PET or Ny, an aluminum foil, and a layer made of PP (polypropylene) or denatured PP are stacked. An adhesive layer may be interposed between the layer made of PET or Ny and the aluminum foil. An adhesive layer may be interposed between the aluminum foil and the layer made of PP or denatured PP. A plastic layer such as the layer made of PET or Ny may be replaced with a glass layer.

(Cutting of Barrier Film)

The barrier film may be mechanically cut by a blade (cutter), or may be optically cut by a laser beam.

Modification of First Embodiment

FIGS. 57 to 64 show a flow of manufacture of a lithium secondary battery according to a modification of the first embodiment. FIGS. 57 to 64 are plan views. The matters mentioned in the description of the first embodiment are also applicable to the modification of the first embodiment.

(Preparation of Positive Electrode Side Composite Body)

Figure 57:
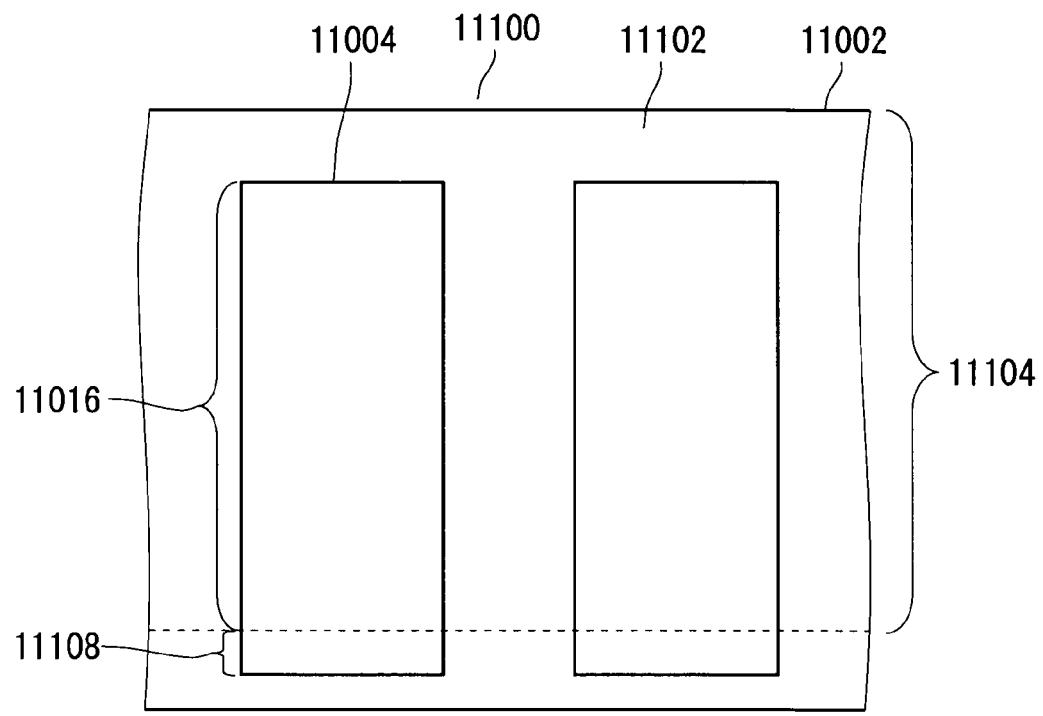
FIG. 57 A plan view showing a modification of the method for manufacturing the lithium secondary battery according to the first embodiment.

In the manufacture of the lithium secondary battery, as shown in FIG. 57, the whole of a positive electrode side conductive material layer 11004 is formed on a positive electrode side bonding surface 11102 of a positive electrode side outer film 11002 to prepare a positive electrode side composite body 11100 in which the positive electrode side conductive material layer 11004 is integrated with the positive electrode side outer film 11002.

The positive electrode side conductive material layer 11004 has a rectangular planar shape. This makes it easy to successively form the positive electrode side conductive material layers 11004 by intermittent application. Thus, the productivity of the lithium secondary battery is improved.

A positive electrode current collector 11016 is located within the positive electrode side application region 11104, and a positive electrode terminal 11018 is located outside the positive electrode side application region 11104.

The positive electrode terminal 11018 is formed as a region having an elongated-rectangular planar shape that occupies an area of and around one side of the rectangular.

(Preparation of Negative Electrode Side Composite Body)

Separately from the preparation of the positive electrode side composite body 11100, as shown in FIG. 58, the whole of a negative electrode side conductive material layer 11012 is formed on a negative electrode side bonding surface 11108 of a negative electrode side outer film 11014 to prepare a negative electrode side composite body 11106 in which the negative electrode side conductive material layer 11012 is integrated with the negative electrode side outer film 11014.

The negative electrode side conductive material layer 11012 has a rectangular planar shape. This makes it easy to successively form the negative electrode side conductive material layers 11012 by intermittent application. Thus, the productivity of the lithium secondary battery is improved.

The negative electrode current collector 11020 is located within the negative electrode side application region 11110, and the negative electrode terminal 11022 is located outside the negative electrode side application region 11110.

The negative electrode terminal 11022 is formed as a region having an elongated-rectangular planar shape that occupies an area of and around one side of the rectangular.

(Addition of Positive Electrode Active Material Layer, Positive Electrode Side Electrolyte Layer, Negative Electrode Side Electrolyte Layer, and Negative Electrode Active Material Layer)

Figure 60:
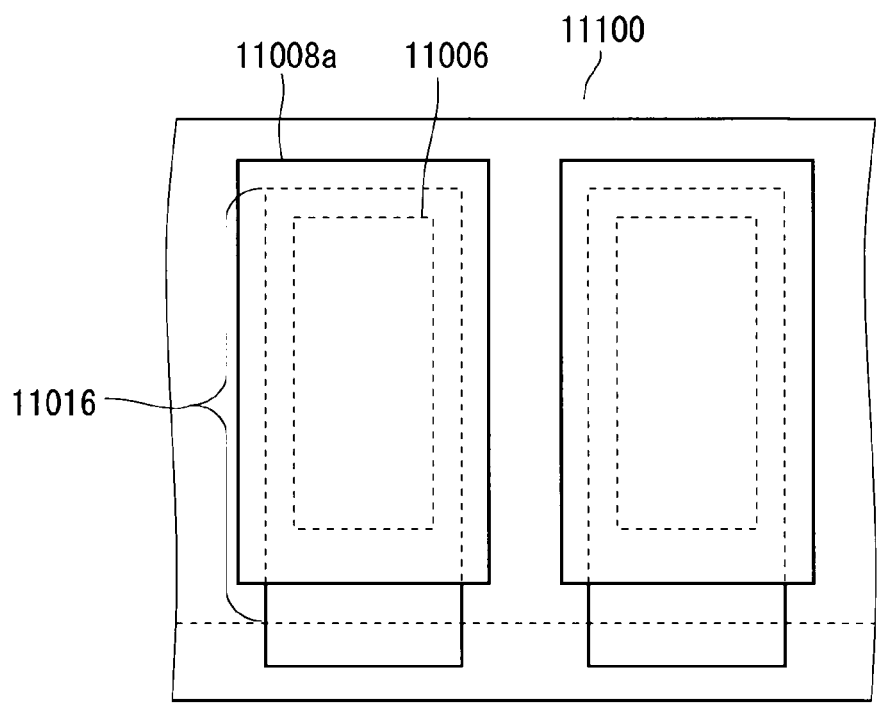
FIG. 60 A plan view showing the modification of the method for manufacturing the lithium secondary battery according to the first embodiment.
Figure 61:
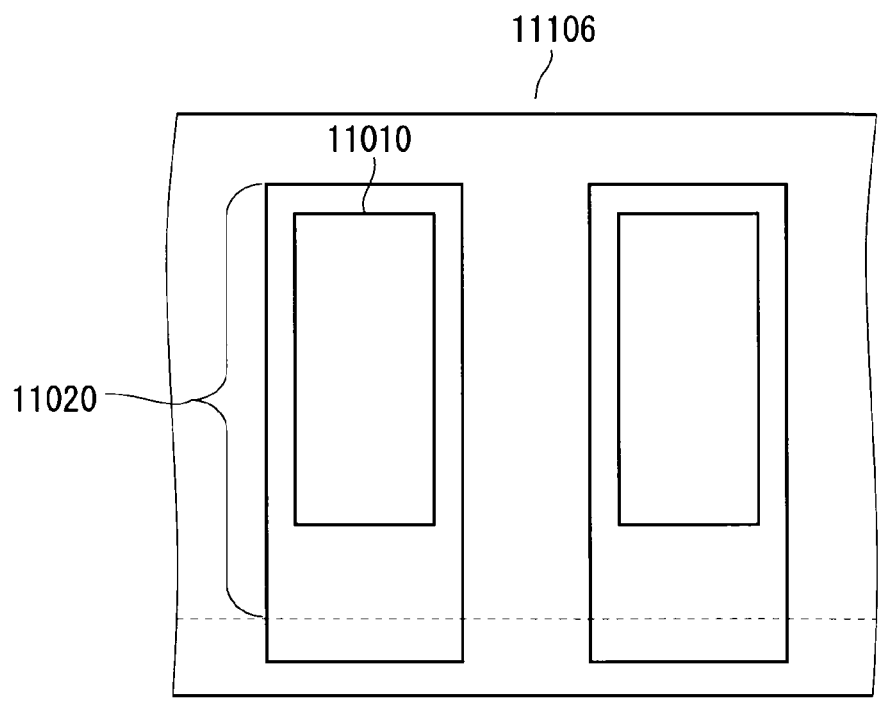
FIG. 61 A plan view showing the modification of the method for manufacturing the lithium secondary battery according to the first embodiment.
Figure 62:
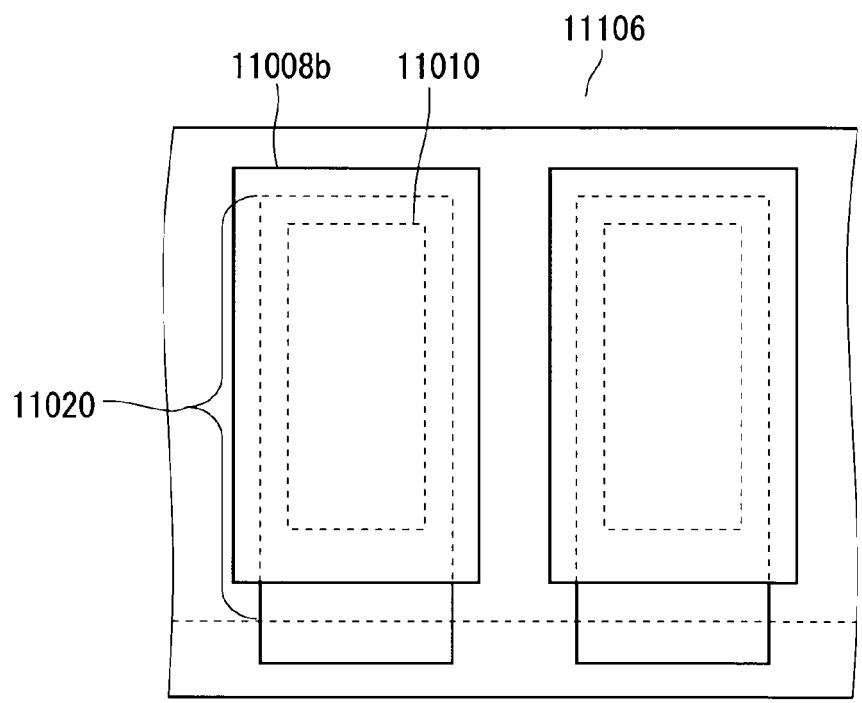
FIG. 62 A plan view showing the modification of the method for manufacturing the lithium secondary battery according to the first embodiment.

After the preparation of the positive electrode side composite body 11100, as shown in FIGS. 59 and 60, a positive electrode active material layer 11006 and a positive electrode side electrolyte layer 11008*a* are sequentially added to the positive electrode side composite body 11100 with the plane positions thereof being aligned with that of the positive electrode current collector 11016. After the preparation of the negative electrode side composite body 11106, as shown in FIGS. 61 and 62, a negative electrode active material layer 11010 and a negative electrode side electrolyte layer 11008*b* are sequentially added to the negative electrode side composite body 11106 with the plane positions thereof being aligned with that of the negative electrode current collector 11020.

(Application)

Figure 63:
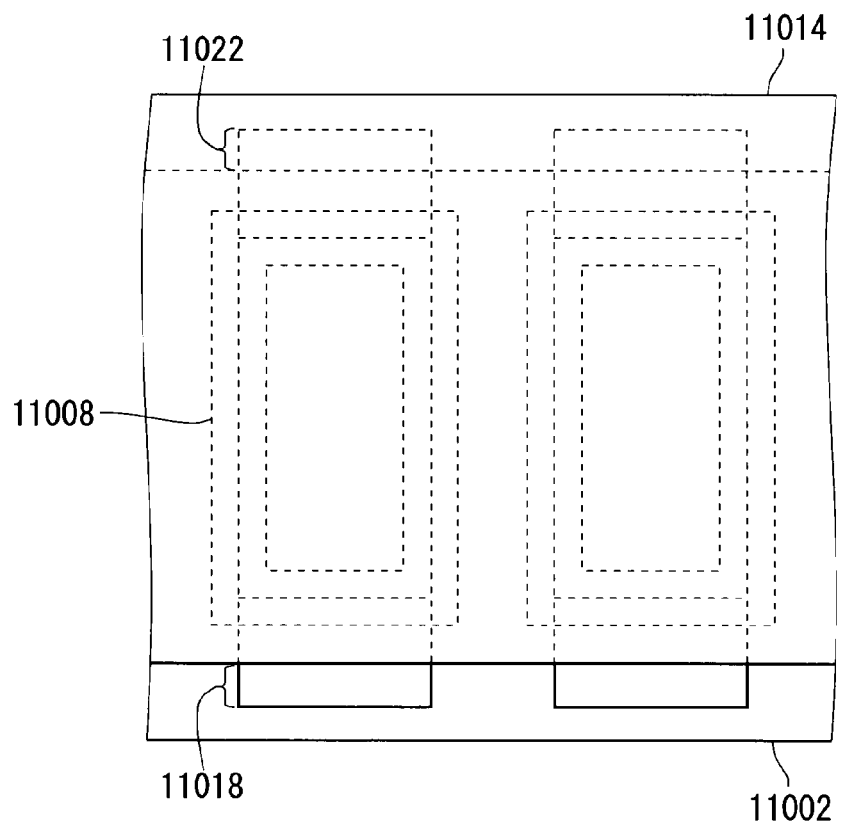
FIG. 63 A plan view showing the modification of the method for manufacturing the lithium secondary battery according to the first embodiment.

After the positive electrode active material layer 11006, the positive electrode side electrolyte layer 11008*a*, the negative electrode side electrolyte layer 11008*b*, and the negative electrode active material layer 11010 are added to the positive electrode side composite body 11100 or the negative electrode side composite body 11106, as shown in FIG. 63, the positive electrode side bonding surface 11102 and the negative electrode side bonding surface 11108 are placed face to face with each other. Then, the positive electrode side application region 11104 and the negative electrode side application region 11110 are applied to each other. At this time, the plane positions of the positive electrode current collector 11016, the positive electrode active material layer 11006, the positive electrode side electrolyte layer 11008*a*, the negative electrode side electrolyte layer 11008*b*, the negative electrode active material layer 11010, and the negative electrode current collector 11020 are aligned with one another. When the positive electrode side application region 11104 and the negative electrode side application region 11110 are applied to each other, the positive electrode side electrolyte layer 11008*a* and the negative electrode side electrolyte layer 11008*b* are bonded to each other to form a single electrolyte layer 11008.

In the modification of the first embodiment, the positive electrode side outer film 11002 and the negative electrode side outer film 11014 are not cut. Instead of cutting the positive electrode side outer film 11002 and the negative electrode side outer film 11014, the positive electrode side outer film 11002 and the negative electrode side outer film 11014 are applied to each other while being displaced from each other with respect to the widthwise direction of the web. As a result, the positive electrode terminal 11018 is exposed at one side, and the negative electrode terminal 11022 is exposed at the other side. The positive electrode terminal 11018 and the negative electrode terminal 11022 are arranged at the opposite sides.

(Bonding)

After the positive electrode side application region 11104 is applied to the negative electrode side application region 11110, as shown in FIG. 64, the positive electrode side outer film 11002 and the negative electrode side outer film 11014 are bonded to each other in a bonding region 11026 that extends from an edge of each lithium secondary battery 11000 to the vicinity of an edge of the electrolyte layer 11008. Thus, the cell 11024 is sealed. The continuous lithium secondary batteries 11000 are separated from one another, as needed.

Modification of Second Embodiment

FIGS. 65 to 72 show a flow of manufacture of a lithium secondary battery according to a modification of the second embodiment. FIGS. 65 to 72 are plan views. The matters mentioned in the second embodiment are also applicable to the modification of the second embodiment.

(Preparation of Positive Electrode Side Composite Body)

In the manufacture of the lithium secondary battery, as shown in FIG. 65, the whole of a positive electrode side conductive material layer 12004 is formed on a positive electrode side bonding surface 12102 of a positive electrode side outer film 12002 to prepare a positive electrode side composite body 12100 in which the positive electrode side outer film 12002 is integrated with the positive electrode side conductive material layer 12004.

The positive electrode side conductive material layer 12004 has a rectangular planar shape. This makes it easy to successively form the positive electrode side conductive material layers 12004 by intermittent application. Thus, the productivity of the lithium secondary battery is improved.

A positive electrode current collector 12016 and a positive electrode side series wiring 12020 are located within a positive electrode side application region 12104. A positive electrode terminal 12108 is located outside the positive electrode side application region 12104.

The positive electrode terminal 12108 is formed as a region having an elongated-rectangular planar shape that occupies an area of and around one side of the rectangular. The positive electrode side series wiring 12020 is formed as a region having an elongated-rectangular planar shape that occupies an area of and around one side of the rectangular.

(Preparation of Negative Electrode Side Composite Body)

Figure 66:
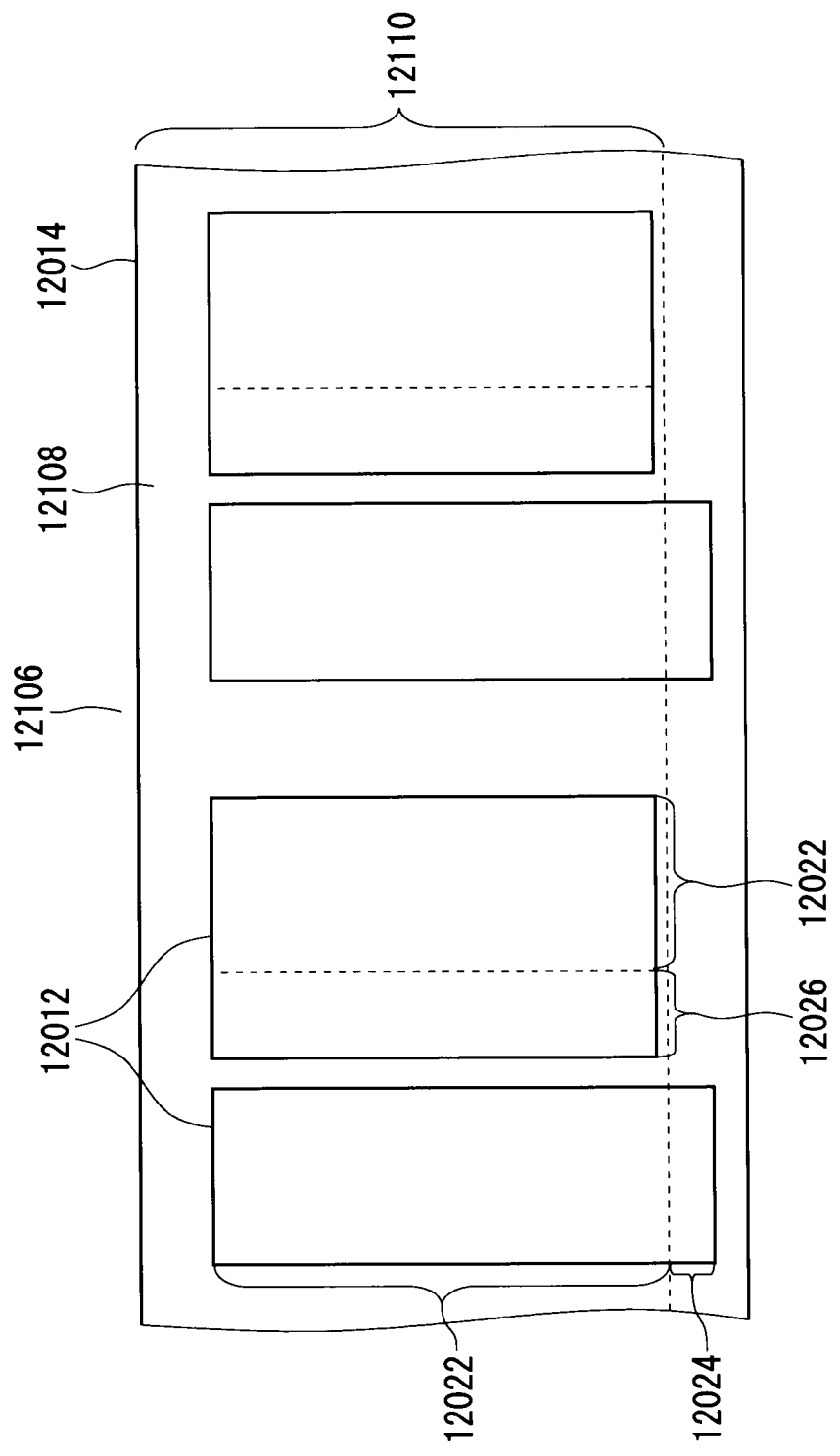
FIG. 66 A plan view showing the modification of the method for manufacturing the lithium secondary battery according to the second embodiment.

Separately from the preparation of the positive electrode side composite body 12100, as shown in FIG. 66, the whole of a negative electrode side conductive material layer 12012 is formed on a negative electrode side bonding surface 12108 of a negative electrode side outer film 12014 to prepare a negative electrode side composite body 12106 in which the negative electrode side conductive material layer 12012 is integrated with the negative electrode side outer film 12014.

The negative electrode side conductive material layer 12012 has a rectangular planar shape. This makes it easy to successively form the negative electrode side conductive material layers 12012 by intermittent application. Thus, the productivity of the lithium secondary battery is improved.

A negative electrode current collector 12022 and a negative electrode side series wiring 12026 are located within a negative electrode side application region 12110. A negative electrode terminal 12024 is located outside the negative electrode side application region 12110.

The negative electrode terminal 12024 is formed as a region having an elongated-rectangular planar shape that occupies an area of and around one side of the rectangular. The negative electrode side series wiring 12026 is formed as a region having an elongated-rectangular planar shape that occupies an area of and around one side of the rectangular.

(Completion of Lithium Secondary Battery)

Figure 67:
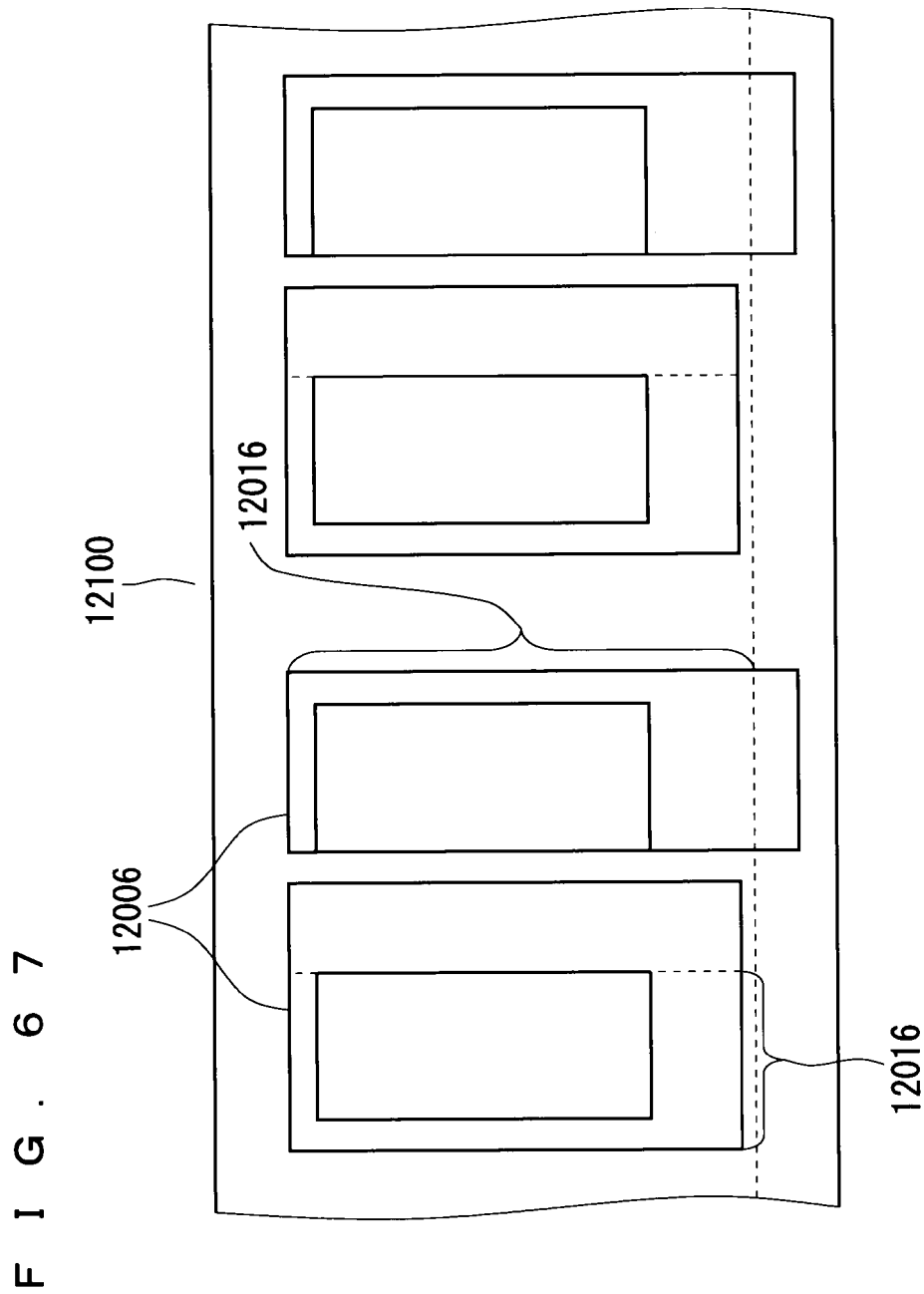
FIG. 67 A plan view showing the modification of the method for manufacturing the lithium secondary battery according to the second embodiment.
Figure 68:
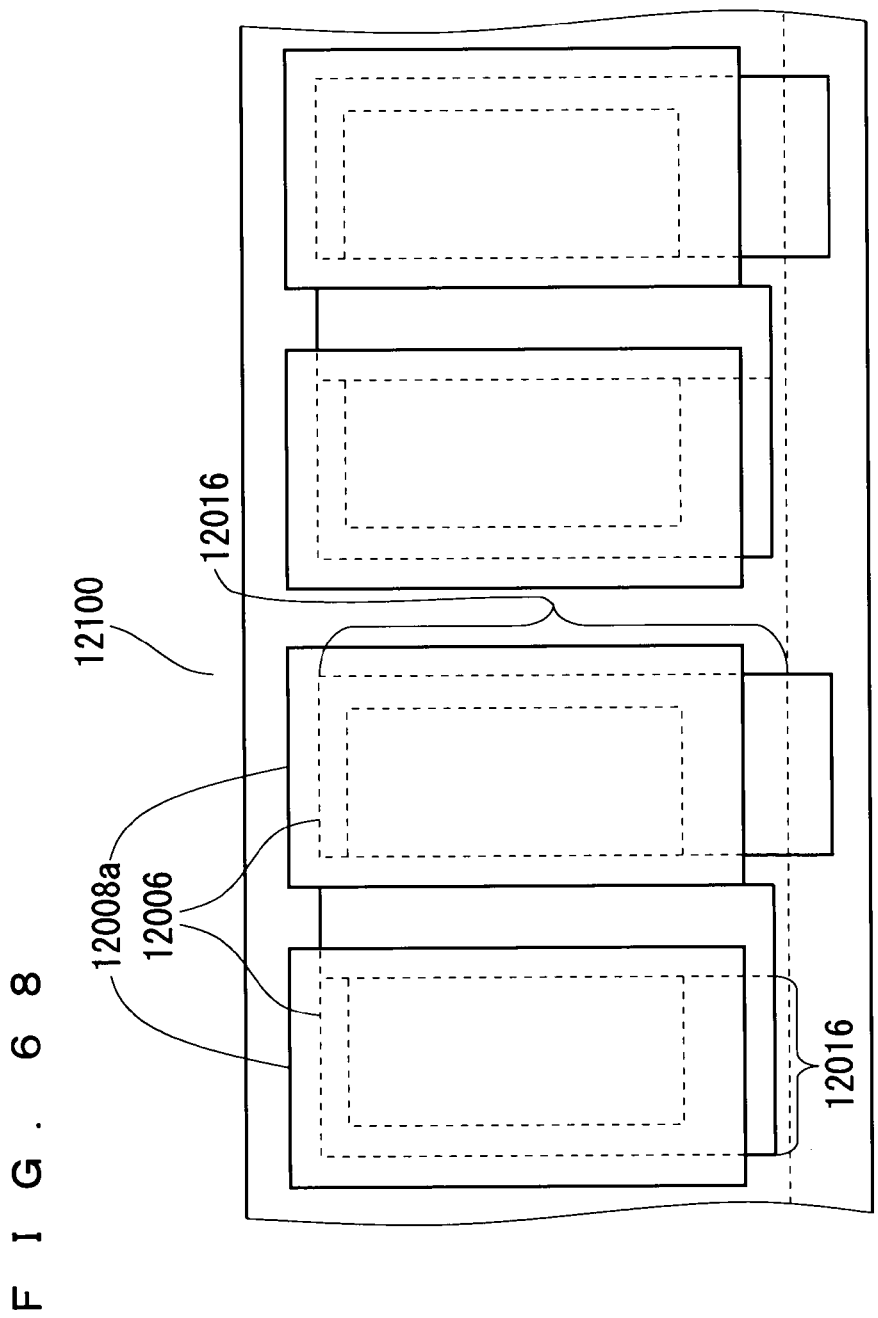
FIG. 68 A plan view showing the modification of the method for manufacturing the lithium secondary battery according to the second embodiment.
Figure 69:
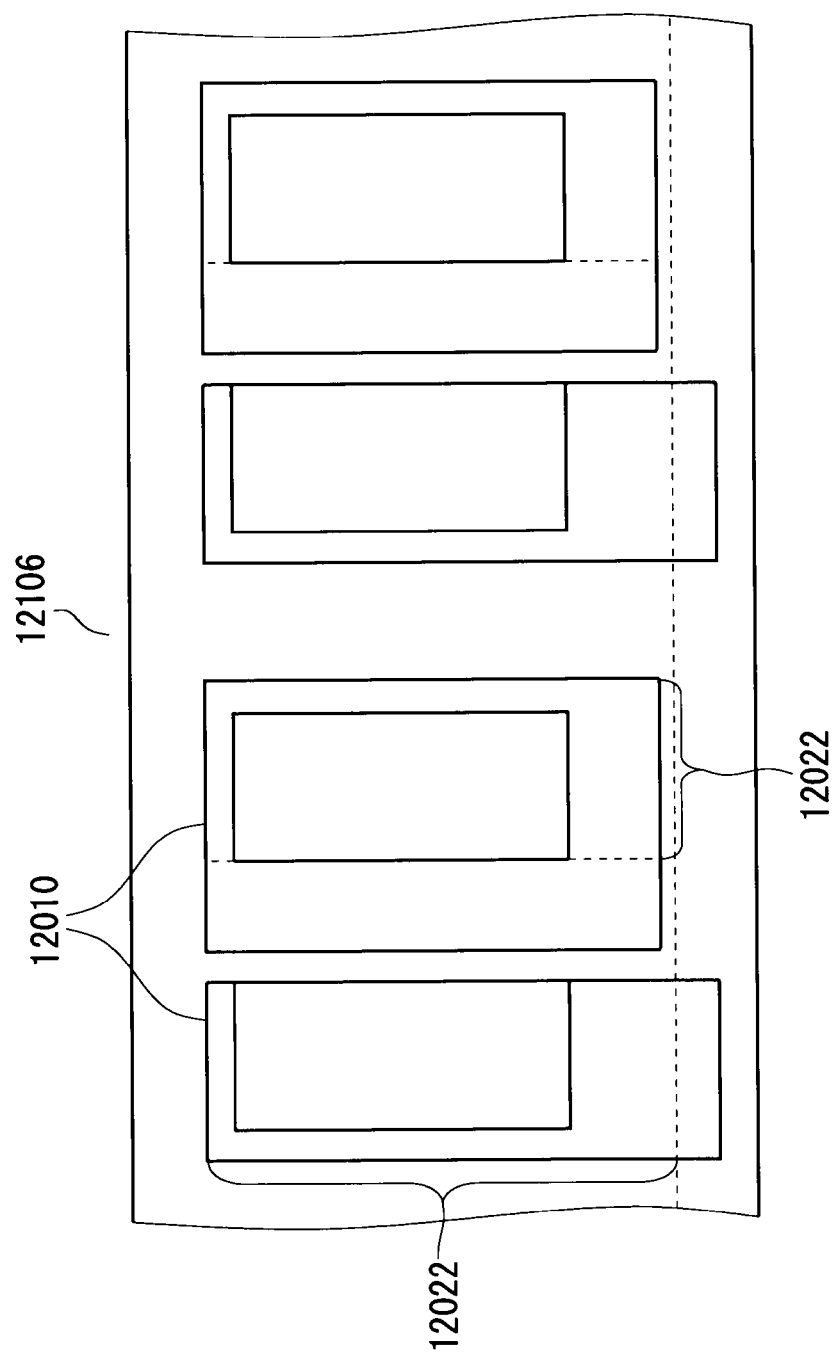
FIG. 69 A plan view showing the modification of the method for manufacturing the lithium secondary battery according to the second embodiment.
Figure 70:
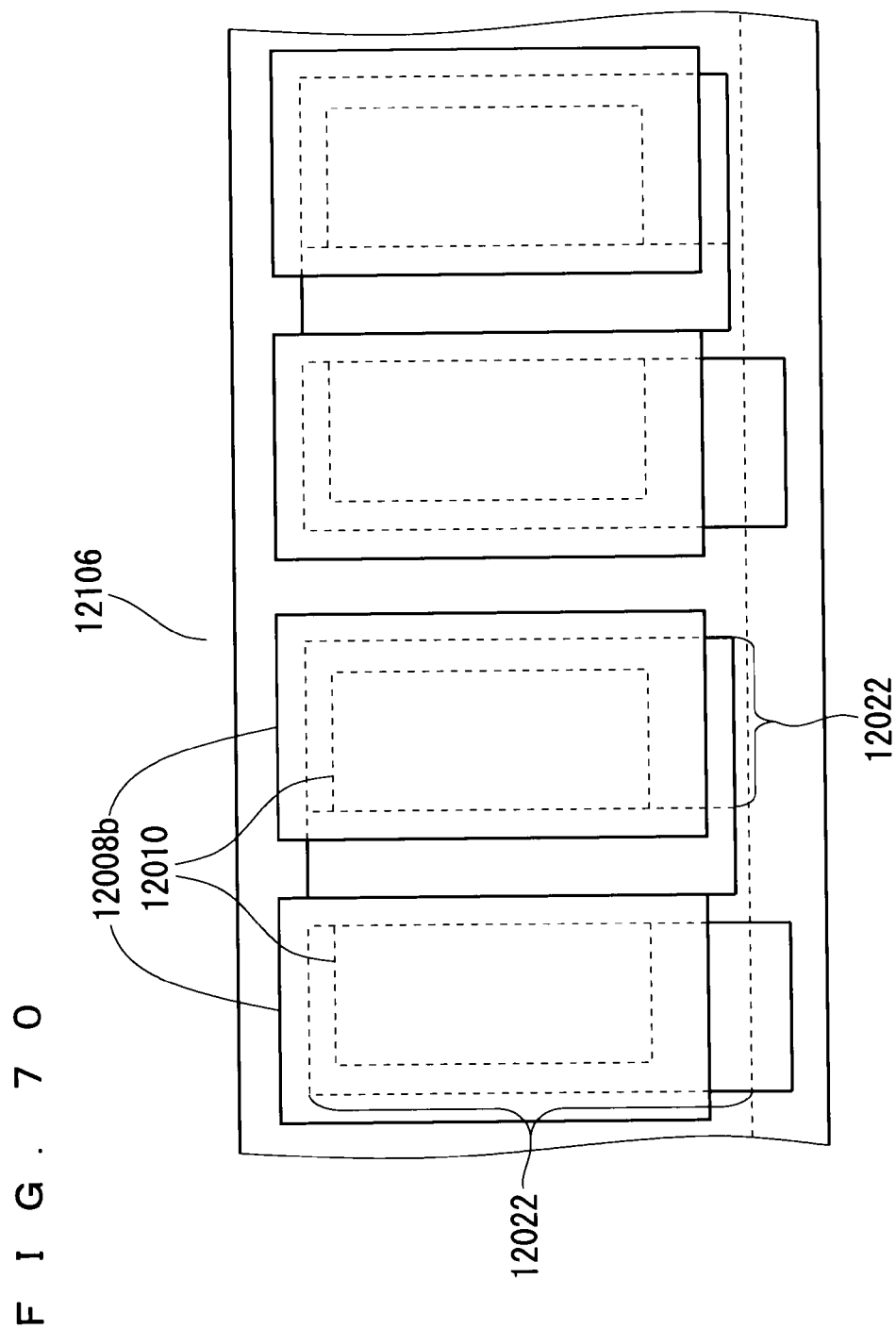
FIG. 70 A plan view showing the modification of the method for manufacturing the lithium secondary battery according to the second embodiment.
Figure 71:
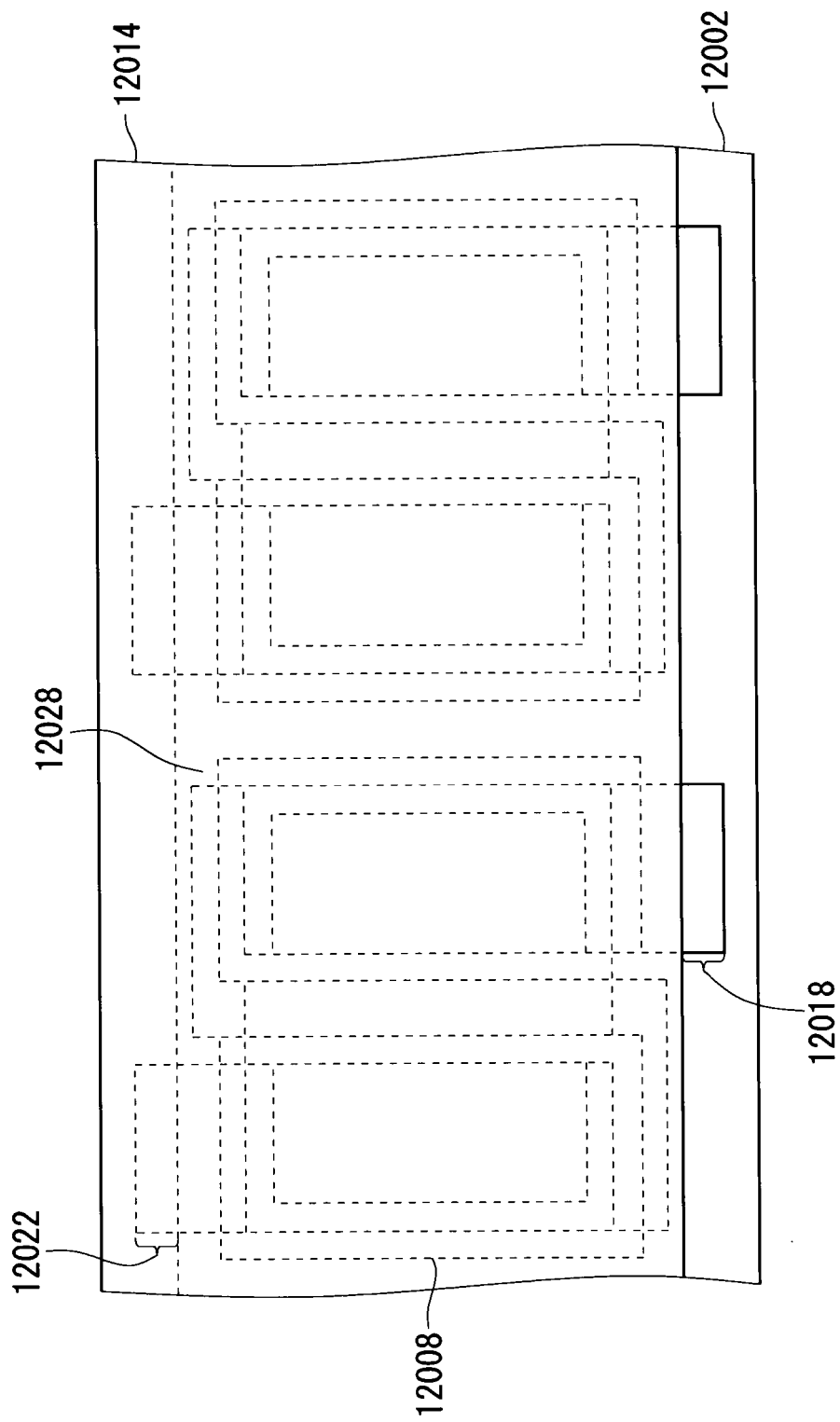
FIG. 71 A plan view showing the modification of the method for manufacturing the lithium secondary battery according to the second embodiment.

After the preparation of the positive electrode side composite body 12100, as shown in FIGS. 67 and 68, a positive electrode active material layer 12006 and a positive electrode side electrolyte layer 12008*a* are added to the positive electrode side composite body 12100 with the plane positions thereof being aligned with that of the positive electrode current collector 12016. After the preparation of the negative electrode side composite body 12106, as shown in FIGS. 69 and 70, a negative electrode active material layer 12010 and a negative electrode side electrolyte layer 12008*b* are added to the negative electrode side composite body 12106 with the plane positions thereof being aligned with that of the negative electrode current collector 12022. Moreover, as shown in FIG. 71, the positive electrode side bonding surface 12102 and the negative electrode side bonding surface 12108 are placed face to face with each other, and then the positive electrode side application region 12104 and the negative electrode side application region 12110 are applied to each other. At this time, the plane positions of the positive electrode current collector 12016, the positive electrode active material layer 12006, the positive electrode side electrolyte layer 12008*a*, the negative electrode side electrolyte layer 12008*b*, the negative electrode active material layer 12010, and the negative electrode current collector 12022 of each cell 12028 are aligned with one another. When the positive electrode side application region 12104 and the negative electrode side application region 12110 are applied to each other. the positive electrode side electrolyte layer 12008*a* and the negative electrode side electrolyte layer 12008*b* are bonded to each other to form a single electrolyte layer 12008.

In the modification of the second embodiment, the positive electrode side outer film 12002 is not cut, and the negative electrode side outer film 12014 is not cut, either. Instead of cutting the positive electrode side outer film 12002 and the negative electrode side outer film 12014, the positive electrode side outer film 12002 and the negative electrode side outer film 12014 are applied to each other while being displaced from each other with respect to the widthwise direction of the web. As a result, the positive electrode terminal 12108 is exposed at one side, and the negative electrode terminal 12022 is exposed at the other side. The positive electrode terminal 12108 and the negative electrode terminal 12022 are arranged at the opposite sides.

Figure 72:
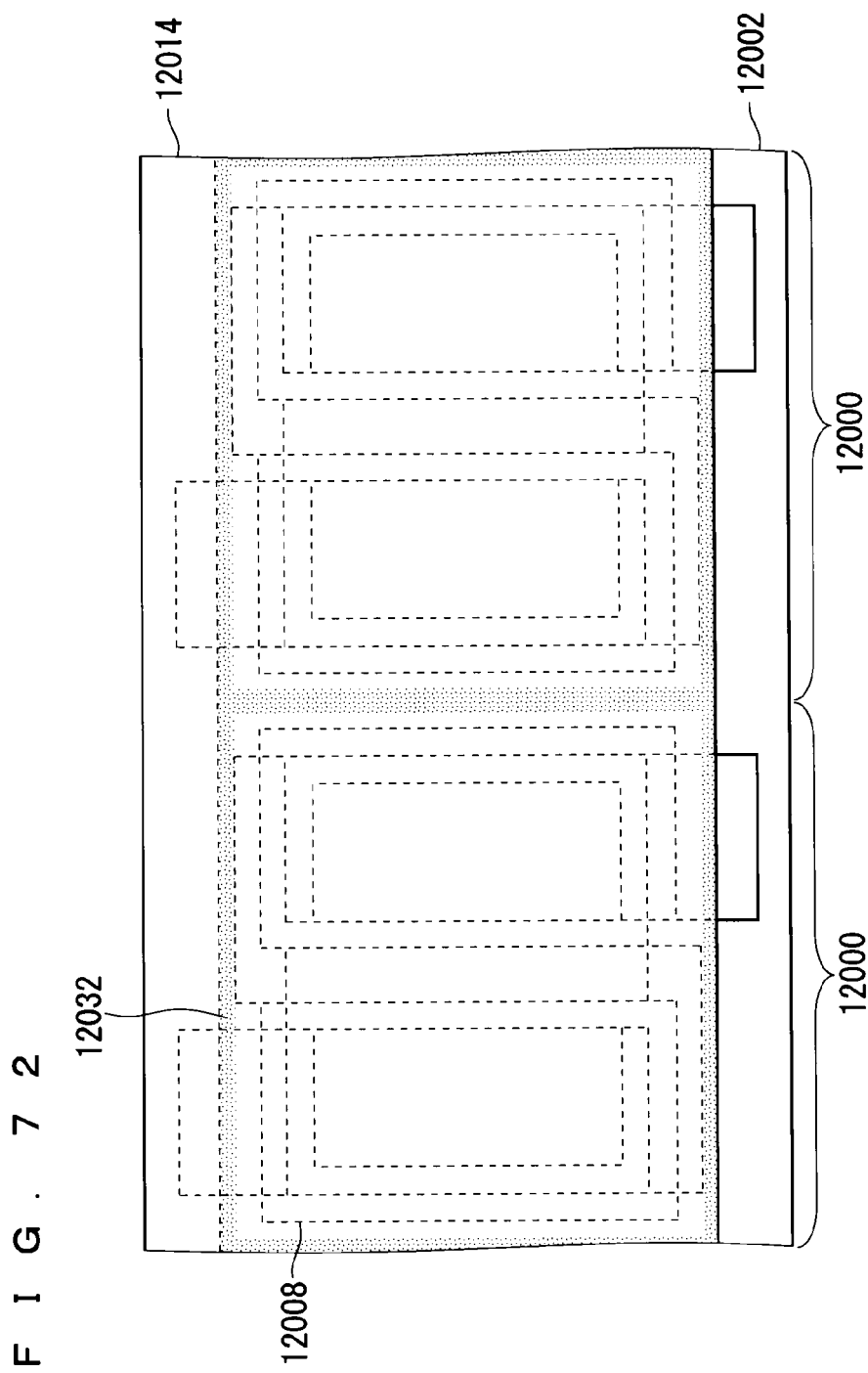
FIG. 72 A plan view showing the modification of the method for manufacturing the lithium secondary battery according to the second embodiment.

Subsequently, as shown in FIG. 72, the positive electrode side outer film 12002 and the negative electrode side outer film 12014 are bonded to each other in a bonding region 12032 that extends from an edge of each lithium secondary battery 12000 to the vicinity of an edge of the electrolyte layer 12008 and the like. The continuous lithium secondary batteries 12000 are separated from one another, as needed.

Modification of Third Embodiment

FIGS. 73 to 80 show a flow of manufacture of a lithium secondary battery according to a modification of the third embodiment. FIGS. 73 to 80 are plan views. The matters mentioned in the third embodiment are also applicable to the modification of the third embodiment.

(Preparation of Positive Electrode Side Composite Body)

Figure 73:
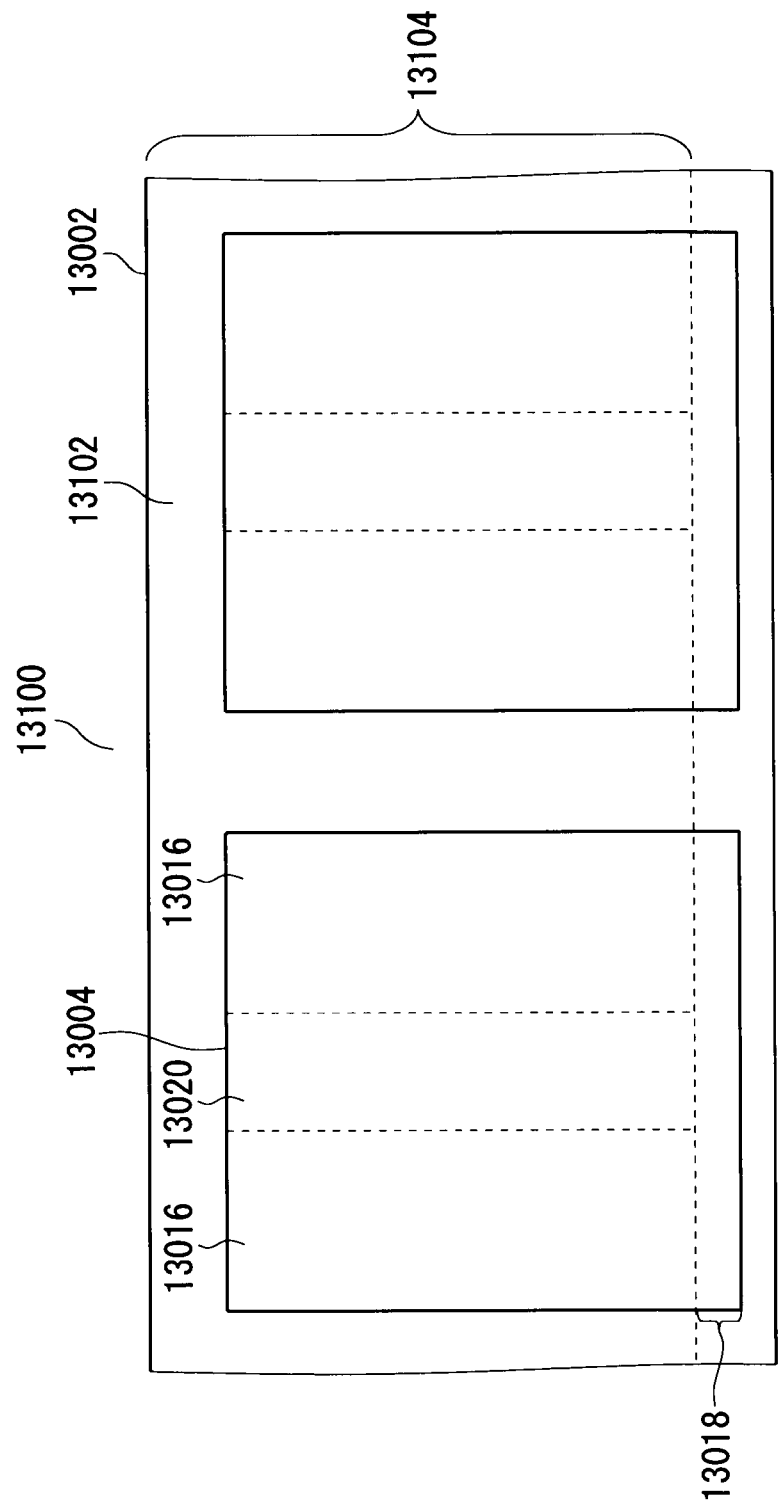
FIG. 73 A plan view showing a modification of the method for manufacturing the lithium secondary battery according to the third embodiment.

In the manufacture of the lithium secondary battery, as shown in FIG. 73, the whole of a positive electrode side conductive material layer 13004 is formed on a positive electrode side bonding surface 13102 of a positive electrode side outer film 13002 to prepare a positive electrode side composite body 13100 in which the positive electrode side conductive material layer 13004 is integrated with the positive electrode side outer film 13002.

The positive electrode side conductive material layer 13004 has a rectangular planar shape. This makes it easy to successively form the positive electrode side conductive material layers 1004 by intermittent application. Thus, the productivity of the lithium secondary battery is improved.

A positive electrode current collector 13016 and a positive electrode side parallel wiring 13020 are located within a positive electrode side application region 13104, and a positive electrode terminal 13018 is located outside the positive electrode side application region 13104.

The positive electrode terminal 13018 has an elongated-rectangular planar shape that occupies an area of and around one side of the rectangular.

(Preparation of Negative Electrode Side Composite Body)

Figure 74:
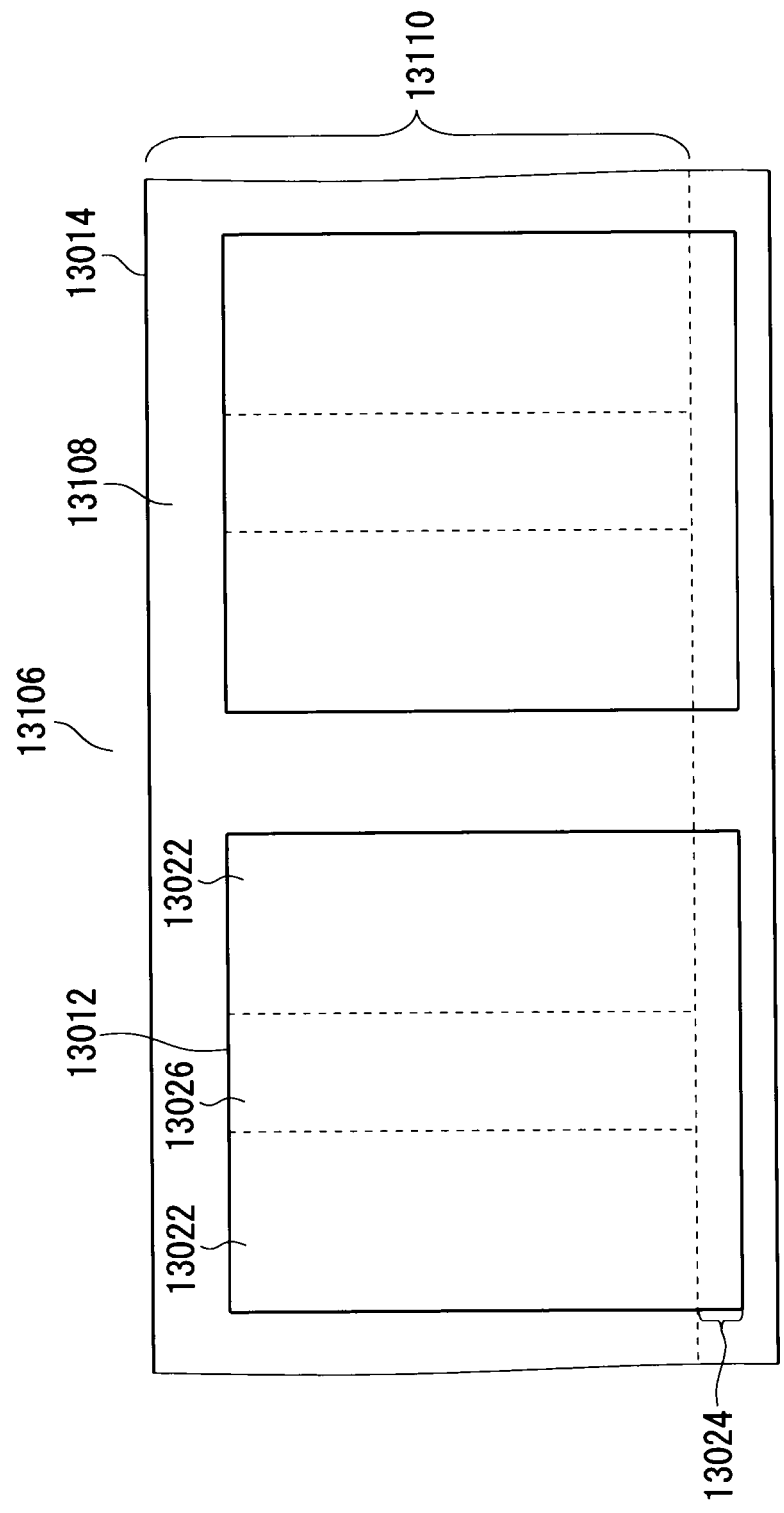
FIG. 74 A plan view showing the modification of the method for manufacturing the lithium secondary battery according to the third embodiment.

Separately from the preparation of the positive electrode side composite body 13100, as shown in FIG. 74, the whole of a negative electrode side conductive material layer 13012 is formed on a negative electrode side bonding surface 13108 of a negative electrode side outer film 13014 to prepare a negative electrode side composite body 13106 in which the negative electrode side conductive material layer 13012 is integrated with the negative electrode side outer film 13014.

The negative electrode side conductive material layer 13012 has a rectangular planar shape. This makes it easy to successively form the negative electrode side conductive material layers 13012 by intermittent application. Thus, the productivity of the lithium secondary battery is improved.

A negative electrode current collector 13022 and a negative electrode side parallel wiring 13026 are located within the negative electrode side application region 13110, and a negative electrode terminal 13024 is located outside the negative electrode side application region 13110.

The negative electrode terminal 13024 is formed as a region having an elongated-rectangular planar shape that occupies an area of and around one side of the rectangular.

(Completion of Lithium Secondary Battery)

Figure 75:
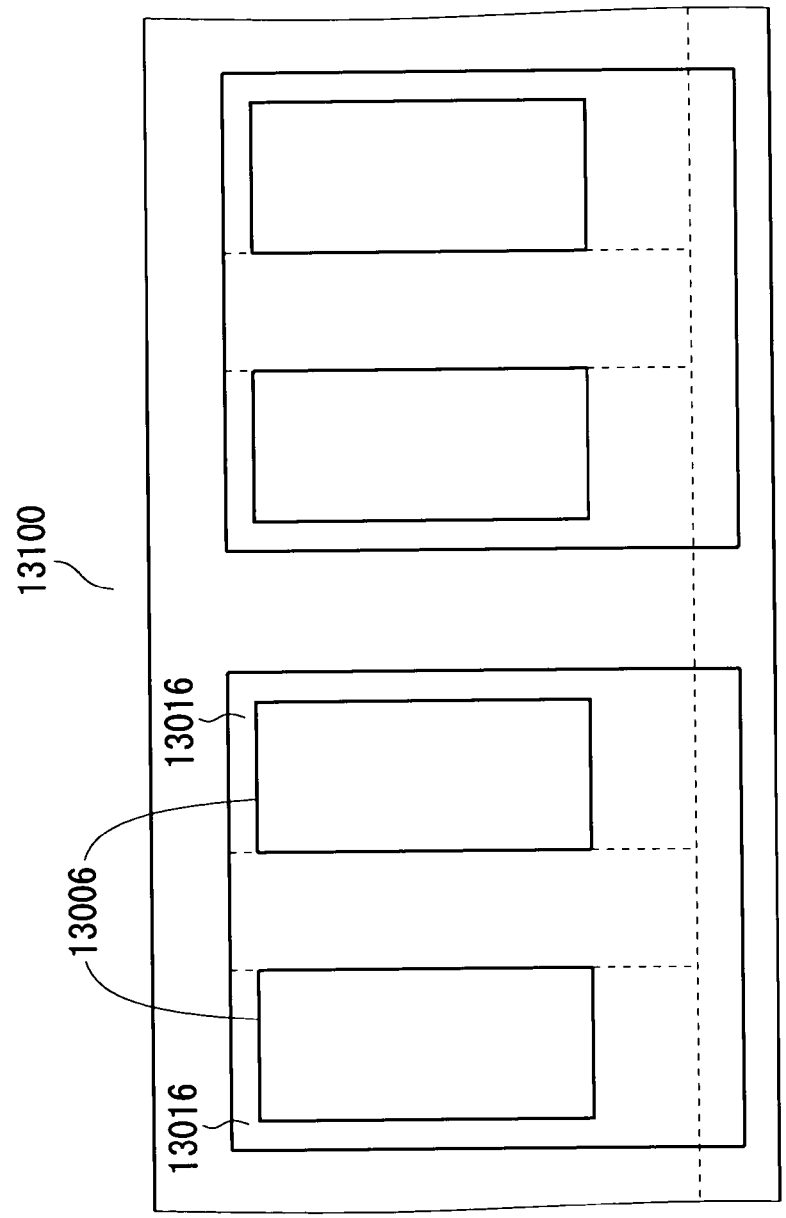
FIG. 75 A plan view showing the modification of the method for manufacturing the lithium secondary battery according to the third embodiment.
Figure 76:
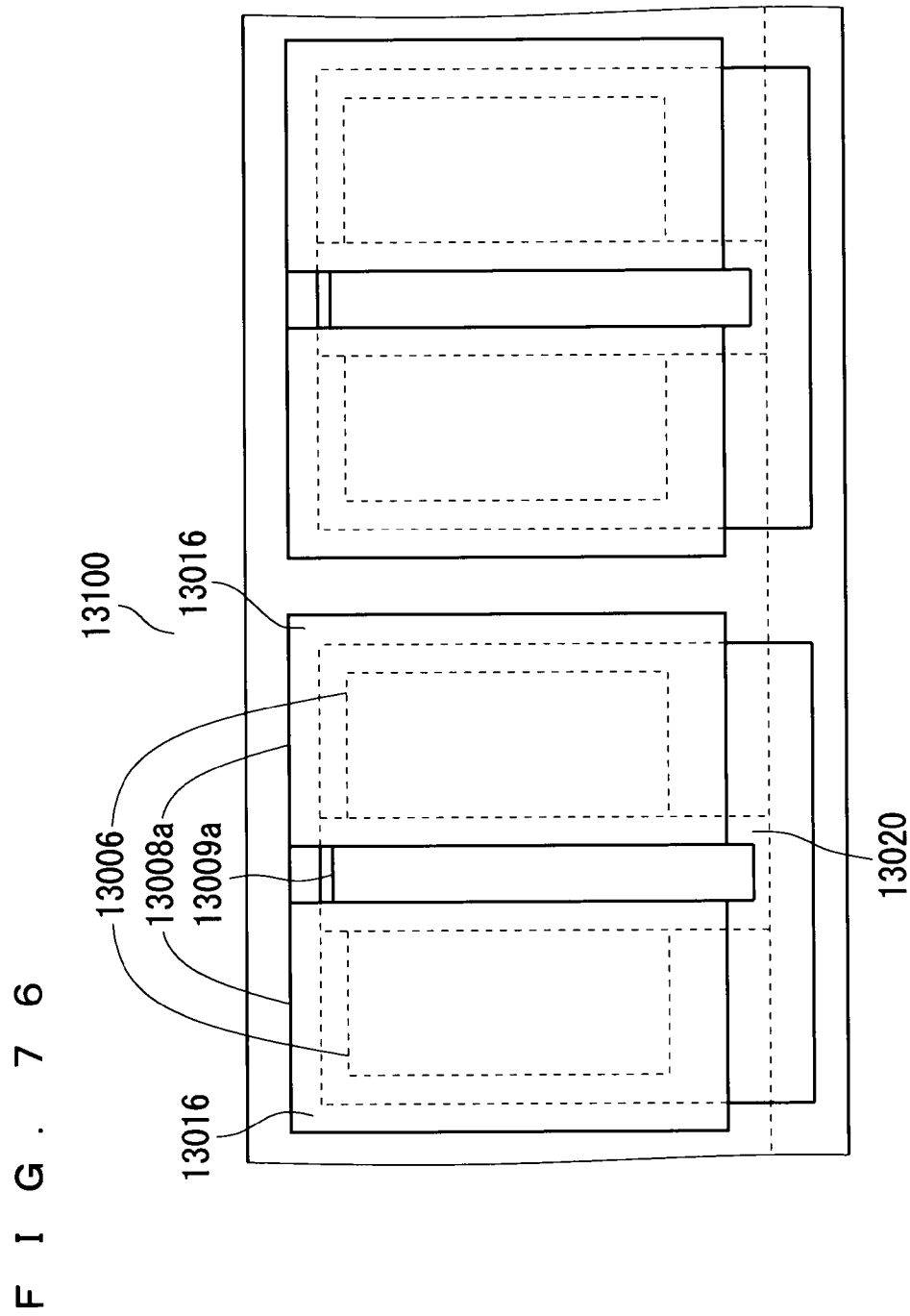
FIG. 76 A plan view showing the modification of the method for manufacturing the lithium secondary battery according to the third embodiment.
Figure 77:
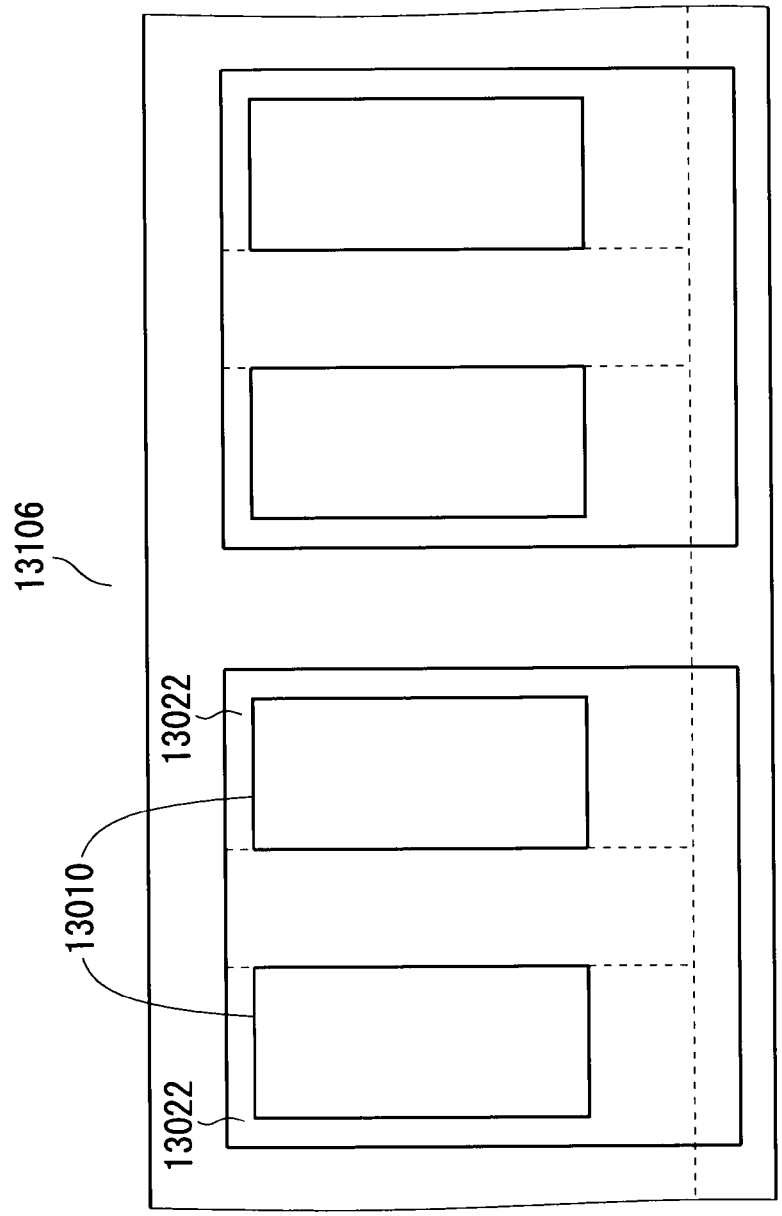
FIG. 77 A plan view showing the modification of the method for manufacturing the lithium secondary battery according to the third embodiment.
Figure 78:
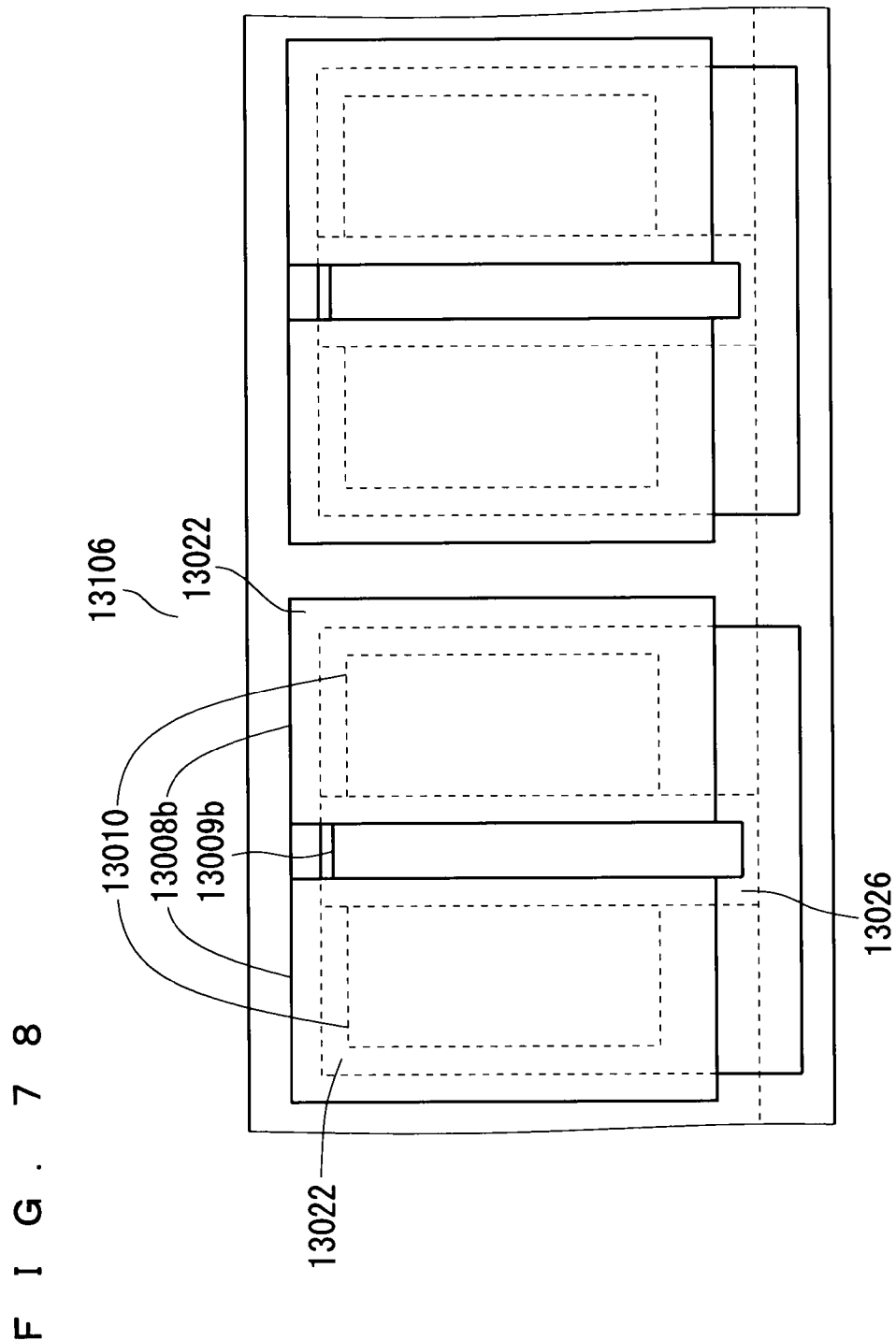
FIG. 78 A plan view showing the modification of the method for manufacturing the lithium secondary battery according to the third embodiment.
Figure 79:
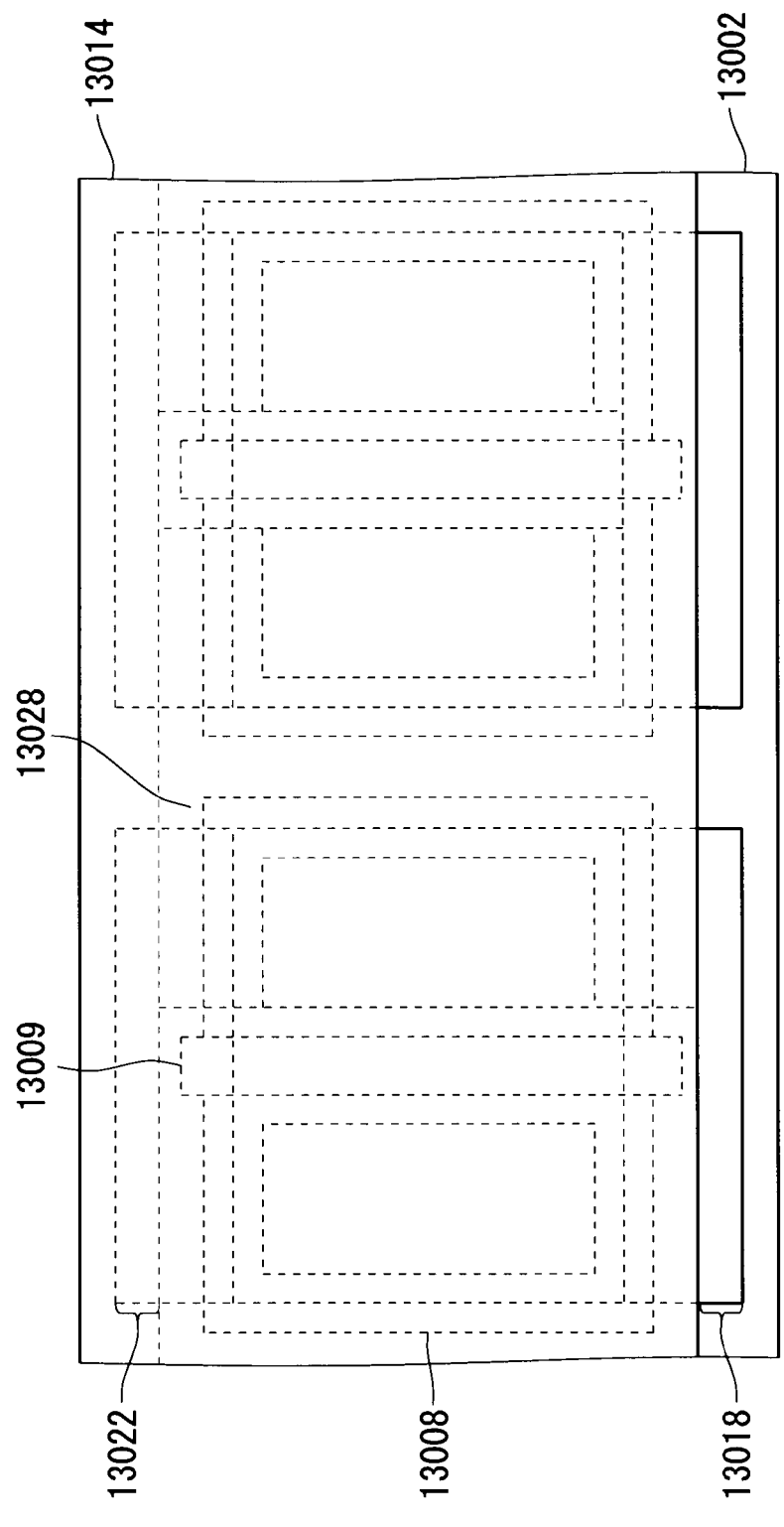
FIG. 79 A plan view showing the modification of the method for manufacturing the lithium secondary battery according to the third embodiment.

After the preparation of the positive electrode side composite body 13100, as shown in FIG. 75, a positive electrode active material layer 13006 is added to the positive electrode side composite body 13100 with the plane position thereof being aligned with that of the positive electrode current collector 13016. As shown in FIG. 76, a positive electrode side electrolyte layer 13008a is added to the positive electrode side composite body 13100 with the plane position thereof being aligned with that of the positive electrode current collector 13016. A positive electrode side insulating layer 13009a is added to the positive electrode side composite body 13100 with the plane position thereof being aligned with that of the positive electrode side parallel wiring 13020. Moreover, after the preparation of the negative electrode side composite body 13106, as shown in FIG. 77, a negative electrode active material layer 13010 is added to the negative electrode side composite body 13106 with the plane position thereof being aligned with that of the negative electrode current collector 13022. As shown in FIG. 78, a negative electrode side electrolyte layer 13008b is added to the negative electrode side composite body 13106 with the plane position thereof being aligned with that of the negative electrode current collector 13022. A negative electrode side insulating layer 13009b is added to the negative electrode side composite body 13106 with the plane position thereof being aligned with that of the negative electrode side parallel wiring 13026. Furthermore, the positive electrode side bonding surface 13102 and the negative electrode side bonding surface 13108 are placed face to face with each other, and then the positive electrode side application region 13104 and the negative electrode side application region 13110 are applied to each other. At this time, the plane positions of the positive electrode current collector 13016, the positive electrode active material layer 13006, the positive electrode side electrolyte layer 13008a, the negative electrode side electrolyte layer 13008b, the negative electrode active material layer 13010, and the negative electrode current collector 13022 of each cell 13028 are aligned with one another. When the positive electrode side application region 13104 and the negative electrode side application region 13110 are applied to each other, the positive electrode side electrolyte layer 13008a and the negative electrode side electrolyte layer 13008b are bonded to each other to form a single electrolyte layer 13008. When the positive electrode side application region 13104 and the negative electrode side application region 13110 are applied to each other, the positive electrode side insulating layer 13009a and the negative electrode side insulating layer 13009b are bonded to each other to form a single insulating layer 13009. The insulating layer 13009 is interposed between the positive electrode side parallel wiring 13020 and the negative electrode side parallel wiring 13026, and serves to prevent short circuit between the positive electrode side parallel wiring 13020 and the negative electrode side parallel wiring 13026. The positive electrode side insulating layer 13009a and the negative electrode side insulating layer 13009b are formed by, for example, applying a viscous material or sticking a sheet-shaped material.

In the modification of the third embodiment, the positive electrode side outer film 13002 is not cut, and the negative electrode side outer film 13014 is not cut, either. Instead of cutting the positive electrode side outer film 13002 and the negative electrode side outer film 13014, the positive electrode side outer film 13002 and the negative electrode side outer film 13014 are applied to each other while being displaced from each other. As a result, the positive electrode terminal 13018 is exposed at one side, and the negative electrode terminal 13022 is exposed at the other side.

Subsequently, as shown in FIG. 80, the positive electrode side outer film 13002 and the negative electrode side outer film 13014 are bonded to each other in a bonding region 13032 that extends from an edge of each lithium secondary battery 13000 to the vicinity of an edge of the electrolyte layer 13008 or the like. The continuous lithium secondary batteries 13000 are separated from one another, as needed.

While the invention has been shown and described in detail, the foregoing description is in all aspects illustrative and not restrictive. Therefore, it will be appreciated that numerous modifications and variations can be devised without departing from the scope of the present invention.

DESCRIPTION OF THE REFERENCE NUMERALS

- 1000, 2000, 3000, 4000, 5000 lithium secondary battery
- 1002, 2002, 3002, 4002 positive electrode side outer film
- 1004, 2004, 3004, 4004, 5004 positive electrode side conductive material layer
- 1006, 2006, 3006, 4006, 5006 positive electrode active material layer
- 1008, 2008, 3008, 4008, 5008 electrolyte layer
- 1008a, 5008a positive electrode side electrolyte layer
- 1008b, 5008b negative electrode side electrolyte layer
- 1010, 2010, 3010, 4010, 5010 negative electrode active material layer
- 1012, 2012, 3012, 4012, 5012 negative electrode side conductive material layer
- 1014, 2014, 3014, 4014 negative electrode side outer film
- 5002 outer film
- 6004, 7004 upper outermost film
- 6006, 7006 lower outermost film

The invention claimed is:

1. A method for manufacturing a lithium secondary battery comprising a cell, said method comprising:
   (a) forming the whole of a first conductive material layer on a first bonding surface of a first outer film having flexibility and barrier properties to prepare a first composite body,
   wherein
   said first conductive material layer is integrated with said first outer film,
   said first conductive material layer comprises a first-pole current collector of said cell and a first-pole electrode terminal that is electrically connected to said first-pole current collector,
   said first-pole current collector is located within a first application region, and
   at least a part of said first-pole electrode terminal is located outside said first application region;
   (b) adding a first-pole active material precursor layer to said first composite body by printing a first-pole active material substance with a plane position thereof being aligned with that of said first-pole current collector, wherein said first-pole active material substance is a mixture of a pre-crosslinked precursor of a lithium-ion-conducting polymer electrolyte and a first-pole active material;
   (c) after (b), adding an electrolyte precursor layer to said first composite body by printing an electrolyte substance with a plane position thereof being aligned with that of said first-pole current collector, wherein said electrolyte substance comprises a pre-crosslinked precursor of a lithium-ion-conducting polymer electrolyte;
   (d) simultaneously or separately subjecting said first-pole active material precursor layer and said electrolyte precursor layer to a crosslinking process, to thereby transform said first-pole active material precursor layer and said electrolyte precursor layer into a first-pole active material layer and an electrolyte layer, respectively;
   (e) separately from (a) to (d), forming the whole of a second conductive material layer on a second bonding surface of a second outer film having flexibility and barrier properties to prepare a second composite body, wherein
   said second conductive material layer is integrated with said second outer film,
   said second conductive material layer comprises a second-pole current collector of said cell and a second-pole electrode terminal that is electrically connected to said second-pole current collector,
   said second-pole current collector is located within a second application region, and
   at least a part of said second-pole electrode terminal is located outside said second application region;
   (f) adding a second-pole active material precursor layer to said second composite body by printing a second-pole active material substance with a plane position thereof being aligned with that of said second-pole current collector, wherein said second-pole active material substance is a mixture of a pre-crosslinked precursor of a lithium-ion-conducting polymer electrolyte and a second-pole active material;
   (g) simultaneously with or separately from the crosslinking process on said first-pole active material precursor layer and said electrolyte precursor layer, subjecting said second-pole active material precursor layer to a crosslinking process, to thereby transform said second-pole active material precursor layer into a second-pole active material layer;
   (h) after (a) to (g), placing said first bonding surface and said second bonding surface face to face with each other, and applying said first application region and said second application region to each other while aligning plane positions of said first-pole current collector, said first-pole active material layer, said electrolyte layer, said second-pole active material layer, and said second-pole current collector; and
   (i) after (h), bonding said first outer film and said second outer film to each other, to seal said cell,
   wherein, in said cell,
   said first-pole electrode terminal is formed on said first bonding surface of said first outer film,
   said first-pole electrode terminal is exposed outside of said lithium secondary battery and does not overlap with said second outer film,
   said second-pole electrode terminal is formed on said second bonding surface of said second outer film, and
   said second-pole electrode terminal is exposed outside of said lithium secondary battery and does not overlap with said first outer film.

2. The method of claim 1, wherein
said electrolyte precursor layer and said electrolyte layer are a first electrolyte precursor layer and a first electrolyte layer, respectively,
said method for manufacturing the lithium secondary battery further comprises:
   (j) after (f), adding a second electrolyte precursor layer to said second composite body by printing said electrolyte substance with a plane position thereof being aligned with that of said second-pole current collector, and
   in (g), said second-pole active material precursor layer and said second electrolyte precursor layer are simultaneously or separately subjected to a crosslinking process such that said second-pole active material precursor layer and said second electrolyte precursor layer are transformed into said second-pole active material layer and a second electrolyte layer, respectively.

3. The method of claim 1, wherein
said lithium secondary battery comprises at least two of said cell or two or more parallel cell groups, said first conductive material layer and said second conductive material layer further comprise a first series wiring and a second series wiring, respectively, and said first series wiring and said second series wiring connect two or more said cell or two or more said parallel cell groups in series with each other.

4. The method of claim 1, wherein said lithium secondary battery comprises at least two of said cell or two or more series cell groups, said first conductive material layer and said second conductive material layer further comprise a first parallel wiring and a second parallel wiring, respectively, and said first parallel wiring and said second parallel wiring connect two or more of said cell or two or more said series cell groups in parallel with each other.

5. The method of claim 1, further comprising:

(k) before or after (b) to (d) and before (h), cutting said first outer film so that a part of said first outer film located outside said first application region is removed from said first composite body, such that a portion where said first-pole electrode terminal overlaps said first outer film remains; and (l) before or after (f) and (g) and before (h), cutting said second outer film so that a part of said second outer film located outside said second application region is removed from said second composite body, such that a portion where said second-pole electrode terminal overlaps said second outer film remains.

6. The method of claim 1, wherein in (a), said first conductive material layer is formed by a paste comprising a dispersion of conductor particles being printed on said first bonding surface, in (e), said second conductive material layer is formed by a paste comprising a dispersion of conductor particles being printed on said second bonding surface.

7. The method of claim 1, wherein said first outer film and said second outer film are webs, in (a), a plurality of said first conductive material layers are successively formed on said first outer film in a longitudinal direction of said first outer film, and in (e), a plurality of said second conductive material layers are successively formed on said second outer film in a longitudinal direction of said second outer film.

8. The method of claim 1, wherein, in (h), said first application region and said second application region are applied to each other by surface-pressing or roll-pressing.

9. The method of claim 1, wherein each of said first outer film and said second outer film comprises a barrier layer and a welding layer.

10. The method of claim 1, wherein each of said first outer film and said second outer film has a moisture vapor transmission rate of $10^1$ to $10^{-2}$ g/m$^2$/day.

11. The method of claim 1, wherein at least one of said first outer film and said second outer film has a moisture vapor transmission rate of $10^{-2}$ to $10^{-6}$ g/m$^2$/day.

* * * * *